US012689256B2

(12) United States Patent
Bailey et al.

(10) Patent No.: US 12,689,256 B2
(45) Date of Patent: Jul. 21, 2026

(54) BRUSHLESS MOTOR FOR A POWER TOOL

(71) Applicant: MILWAUKEE ELECTRIC TOOL CORPORATION, Brookfield, WI (US)

(72) Inventors: Matthew R. Bailey, Racine, WI (US); Keith M. Klosterman, Gurnee, IL (US); Keith Boulanger, Kenosha, WI (US); Jeffrey C. Hessenberger, Neosho, WI (US); Andrew T. Beyerl, Pewaukee, WI (US); Jorge L. Ibarra, Broomfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 141 days.

(21) Appl. No.: 18/499,486

(22) Filed: Nov. 1, 2023

(65) Prior Publication Data

US 2024/0063679 A1     Feb. 22, 2024

Related U.S. Application Data

(63) Continuation of application No. 17/338,791, filed on Jun. 4, 2021, now Pat. No. 11,811,287.
(Continued)

(51) Int. Cl.
  *H02K 3/52*     (2006.01)
  *H02K 7/08*     (2006.01)
  (Continued)

(52) U.S. Cl.
  CPC ............. *H02K 3/522* (2013.01); *H02K 7/083* (2013.01); *H02K 7/145* (2013.01);
  (Continued)

(58) Field of Classification Search
  CPC ........ H02K 3/522; H02K 7/083; H02K 7/145; H02K 11/0094; H02K 11/215;
  (Continued)

(56) References Cited

U.S. PATENT DOCUMENTS

| | | | |
|---|---|---|---|
| 3,979,615 A | 9/1976 | Neff | |
| 4,677,329 A | 6/1987 | Secoura | |

(Continued)

FOREIGN PATENT DOCUMENTS

| | | | |
|---|---|---|---|
| CN | 1103738 A | 6/1995 | |
| CN | 1622428 A | 6/2005 | |

(Continued)

OTHER PUBLICATIONS

International Search Report and Written Opinion for Application No. PCT/US2021/035829 dated Nov. 5, 2021 (12 pages).
(Continued)

*Primary Examiner* — Christopher M Koehler
*Assistant Examiner* — Viswanathan Subramanian
(74) *Attorney, Agent, or Firm* — Michael Best & Friedrich LLP

(57) ABSTRACT

Power tools described herein include a housing, a brushless direct current (DC) motor, a non-conductive terminal mount, and a plurality of terminals. The housing has a motor housing portion, a handle portion, and a battery pack interface. The brushless DC motor is located within the motor housing portion and has a rotor and a stator. The non-conductive terminal mount is located on an outer peripheral surface of the stator and includes an angled surface. The angled surface is not substantially parallel to a longitudinal axis of the motor. The plurality of terminals is mounted on the angled surface of the terminal mount. Each of the terminals is angled in a first direction such that the terminals are not substantially parallel to the longitudinal axis of the motor.

19 Claims, 39 Drawing Sheets

Related U.S. Application Data

(60) Provisional application No. 63/050,166, filed on Jul. 10, 2020, provisional application No. 63/036,035, filed on Jun. 8, 2020, provisional application No. 63/035,273, filed on Jun. 5, 2020.

(51) Int. Cl.

| | | |
|---|---|---|
| *H02K 7/14* | (2006.01) |
| *H02K 11/00* | (2016.01) |
| *H02K 11/215* | (2016.01) |
| *H02K 21/16* | (2006.01) |
| *B25D 11/06* | (2006.01) |

(52) U.S. Cl.
CPC ....... *H02K 11/0094* (2013.01); *H02K 11/215* (2016.01); *H02K 21/16* (2013.01); *B25D 11/064* (2013.01); *B25D 2250/095* (2013.01); *H02K 2211/03* (2013.01)

(58) Field of Classification Search
CPC .... H02K 21/16; H02K 2211/03; H02K 1/146; H02K 5/15; H02K 1/276; H02K 5/1732; H02K 11/33; H02K 29/08; B25D 11/064; B25D 2250/095; B25D 11/00; B25F 5/00
See application file for complete search history.

(56) References Cited

U.S. PATENT DOCUMENTS

| | | | |
|---|---|---|---|
| 4,720,646 | A | 1/1988 | Torimoto |
| 4,893,041 | A | 1/1990 | Snider et al. |
| 4,982,124 | A | 1/1991 | Cummings et al. |
| 5,008,577 | A | 4/1991 | Wang |
| 5,057,661 | A | 10/1991 | Banner |
| 5,095,239 | A | 3/1992 | Wang |
| 5,175,458 | A | 12/1992 | Lemmer et al. |
| 5,717,270 | A | 2/1998 | Lau et al. |
| 5,806,169 | A | 9/1998 | Trago et al. |
| 5,828,147 | A | 10/1998 | Best et al. |
| 5,895,990 | A | 4/1999 | Lau |
| 6,470,984 | B1 | 10/2002 | Nakajima et al. |
| 6,894,410 | B2 | 5/2005 | Kobayashi et al. |
| 6,933,636 | B2 | 8/2005 | Miya et al. |
| 7,126,242 | B2 | 10/2006 | Williams et al. |
| 7,202,581 | B2 | 4/2007 | Sasaki et al. |
| 7,430,796 | B2 | 10/2008 | Baumgartner et al. |
| 7,464,455 | B2 | 12/2008 | Du et al. |
| 7,476,996 | B2 | 1/2009 | Makiuchi et al. |
| 7,545,063 | B2 | 6/2009 | Yoshida et al. |
| 7,579,732 | B2 | 8/2009 | Yamaguchi et al. |
| 7,626,303 | B2 | 12/2009 | Watanabe et al. |
| 7,705,505 | B2 | 4/2010 | Kataoka et al. |
| 7,714,470 | B2 | 5/2010 | Kataoka et al. |
| 8,102,138 | B2 | 1/2012 | Sekine et al. |
| 8,339,001 | B2 | 12/2012 | Ghodsi-Khameneh et al. |
| 8,482,172 | B2 | 7/2013 | Sasaki et al. |
| 8,674,578 | B2 | 3/2014 | Aono et al. |
| 9,079,603 | B2 | 7/2015 | Isshiki et al. |
| 9,154,009 | B2 | 10/2015 | Alemu |
| 9,819,241 | B2 | 11/2017 | Smith et al. |
| 10,056,806 | B2 | 8/2018 | Hatfield et al. |
| 2001/0006312 | A1 | 7/2001 | Sheeran et al. |
| 2002/0185930 | A1 | 12/2002 | Furuya et al. |
| 2006/0063403 | A1 | 3/2006 | Kataoka et al. |
| 2007/0004249 | A1 | 1/2007 | Uchiyama et al. |
| 2007/0252454 | A1 | 11/2007 | Hayashi et al. |
| 2008/0036315 | A1 | 2/2008 | Makiuchi et al. |
| 2008/0265695 | A1 | 10/2008 | Yoshida et al. |
| 2009/0021095 | A1 | 1/2009 | Tatematsu et al. |
| 2009/0026859 | A1 | 1/2009 | Kinoshita et al. |
| 2009/0039720 | A1 | 2/2009 | Tsukashima et al. |
| 2009/0121566 | A1 | 5/2009 | Ishizeki et al. |
| 2009/0140596 | A1 | 6/2009 | Kaiser et al. |
| 2009/0189476 | A1 | 7/2009 | Takizawa et al. |
| 2009/0256439 | A1 | 10/2009 | Inoue et al. |
| 2009/0324435 | A1 | 12/2009 | Sears et al. |
| 2010/0148615 | A1 | 6/2010 | Sasaki et al. |
| 2010/0156208 | A1 | 6/2010 | Schäflein et al. |
| 2010/0253160 | A1 | 10/2010 | Jones et al. |
| 2011/0006625 | A1 | 1/2011 | Fujii et al. |
| 2011/0080062 | A1 | 4/2011 | Noh et al. |
| 2012/0319512 | A1 | 12/2012 | Nakagawa |
| 2013/0313921 | A1 | 11/2013 | Hoffman et al. |
| 2017/0288499 | A1 | 10/2017 | Beyerl et al. |
| 2018/0041088 | A1 | 2/2018 | Smith et al. |
| 2018/0294688 | A1 | 10/2018 | Smith et al. |
| 2018/0323681 | A1 | 11/2018 | Hatfield et al. |
| 2019/0044415 | A1 | 2/2019 | Hatfield et al. |
| 2019/0319506 | A1 | 10/2019 | Reu |
| 2020/0091793 | A1 | 3/2020 | Smith et al. |
| 2020/0177034 | A1 | 6/2020 | Beyerl et al. |

FOREIGN PATENT DOCUMENTS

| | | | |
|---|---|---|---|
| CN | 1862925 | A | 11/2006 |
| CN | 1302602 | C | 2/2007 |
| CN | 1941555 | A | 4/2007 |
| CN | 101153793 | A | 4/2008 |
| CN | 101232215 | A | 7/2008 |
| CN | 201266867 | Y | 7/2009 |
| CN | 101901661 | A | 12/2010 |
| DE | 8026597 | U1 | 1/1981 |
| DE | 3625109 | A1 | 2/1988 |
| DE | 3632646 | A1 | 3/1988 |
| DE | 3918350 | A1 | 2/1990 |
| DE | 4013391 | C2 | 5/1992 |
| DE | 4110474 | A1 | 10/1992 |
| DE | 10045471 | A1 | 4/2002 |
| DE | 202007014169 | U1 | 2/2008 |
| DE | 202007013483 | U1 | 3/2009 |
| DE | 202008003624 | U1 | 9/2009 |
| DE | 112008001219 | T5 | 3/2010 |
| DE | 102013205913 | A1 | 10/2014 |
| EP | 519163 | A1 | 12/1992 |
| EP | 1016199 | B1 | 11/2001 |
| EP | 1168576 | A1 | 1/2002 |
| EP | 1191665 | B1 | 3/2002 |
| EP | 1441433 | A1 | 7/2004 |
| EP | 1656726 | B1 | 5/2006 |
| EP | 1748534 | A2 | 1/2007 |
| EP | 1780872 | A2 | 5/2007 |
| EP | 1727261 | B1 | 10/2007 |
| EP | 2091132 | A2 | 8/2009 |
| EP | 3340440 | A1 | 6/2018 |
| GB | 551570 | A | 8/1979 |
| GB | 2189352 | A | 10/1987 |
| GB | 2240222 | A | 7/1991 |
| JP | S4858475 | A | 8/1973 |
| JP | S54184403 | U | 12/1979 |
| JP | 58002125 | Y2 | 1/1983 |
| JP | 61149944 | U | 9/1986 |
| JP | 63039437 | A | 2/1988 |
| JP | 4049826 | A | 2/1992 |
| JP | H07177694 | A | 7/1995 |
| JP | H09201001 | A | 7/1997 |
| JP | 10201160 | A | 7/1998 |
| JP | 2001145289 | A | 5/2001 |
| JP | 2001145325 | A | 5/2001 |
| JP | 2002209359 | A | 7/2002 |
| JP | 2005229677 | A | 8/2005 |
| JP | 2005229703 | A2 | 8/2005 |
| JP | 2005304278 | A | 10/2005 |
| JP | 2005341640 | A | 12/2005 |
| JP | 2006333587 | A | 12/2006 |
| JP | 2007060900 | A | 3/2007 |
| JP | 2007116818 | A | 5/2007 |
| JP | 2007192070 | A | 8/2007 |
| JP | 2007318885 | A | 12/2007 |
| JP | 2007325481 | A | 12/2007 |
| JP | 2008118792 | A | 5/2008 |
| JP | 2008148497 | A | 6/2008 |
| JP | 2008236973 | A2 | 10/2008 |
| JP | 2008272870 | A | 11/2008 |

(56) References Cited

FOREIGN PATENT DOCUMENTS

| | | | |
|----|--------------|----|---------|
| JP | 2008312393 | A  | 12/2008 |
| JP | 2009232522 | A  | 10/2009 |
| JP | 2009290922 | A  | 12/2009 |
| JP | 2011015498 | A  | 1/2011  |
| JP | 2016101018 | A  | 5/2016  |
| JP | 2019115176 | A  | 7/2019  |
| KR | 900002641  | B1 | 4/1990  |
| KR | 121637     | Y1 | 10/1998 |
| KR | 136587     | Y1 | 5/1999  |
| KR | 20030089141 | A  | 11/2003 |
| KR | 407631     | B1 | 12/2003 |
| KR | 20040033898 | A  | 4/2004  |
| KR | 20080068437 | A  | 7/2008  |
| WO | WO2006069841 | A1 | 7/2006  |
| WO | WO2009048181 | A1 | 4/2009  |

OTHER PUBLICATIONS

Extended European Search Report for Application No. 21816914.2 dated Jun. 3, 2024 (11 pages).

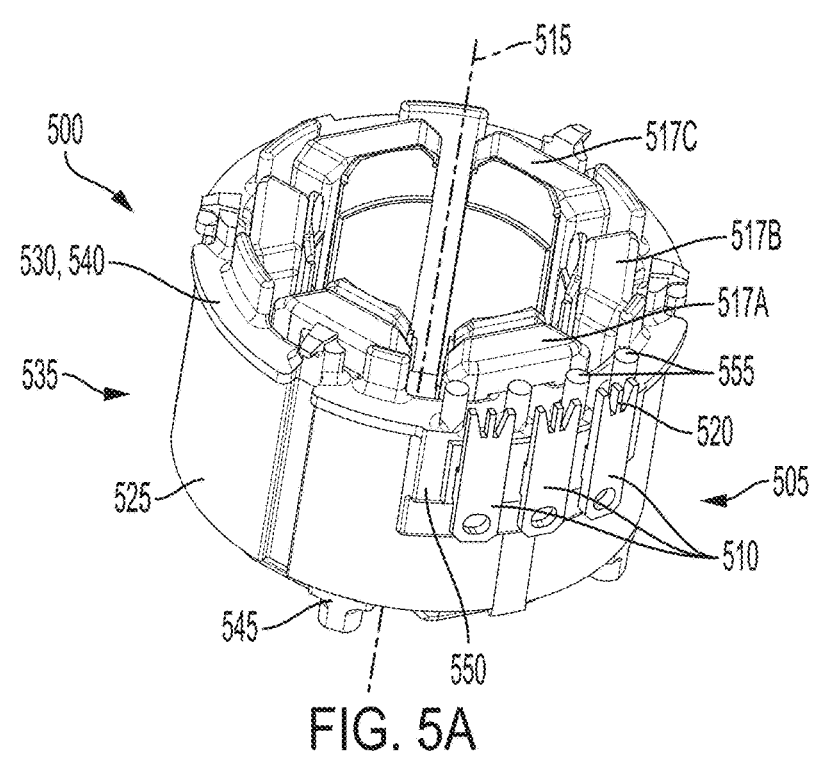
FIG. 5A
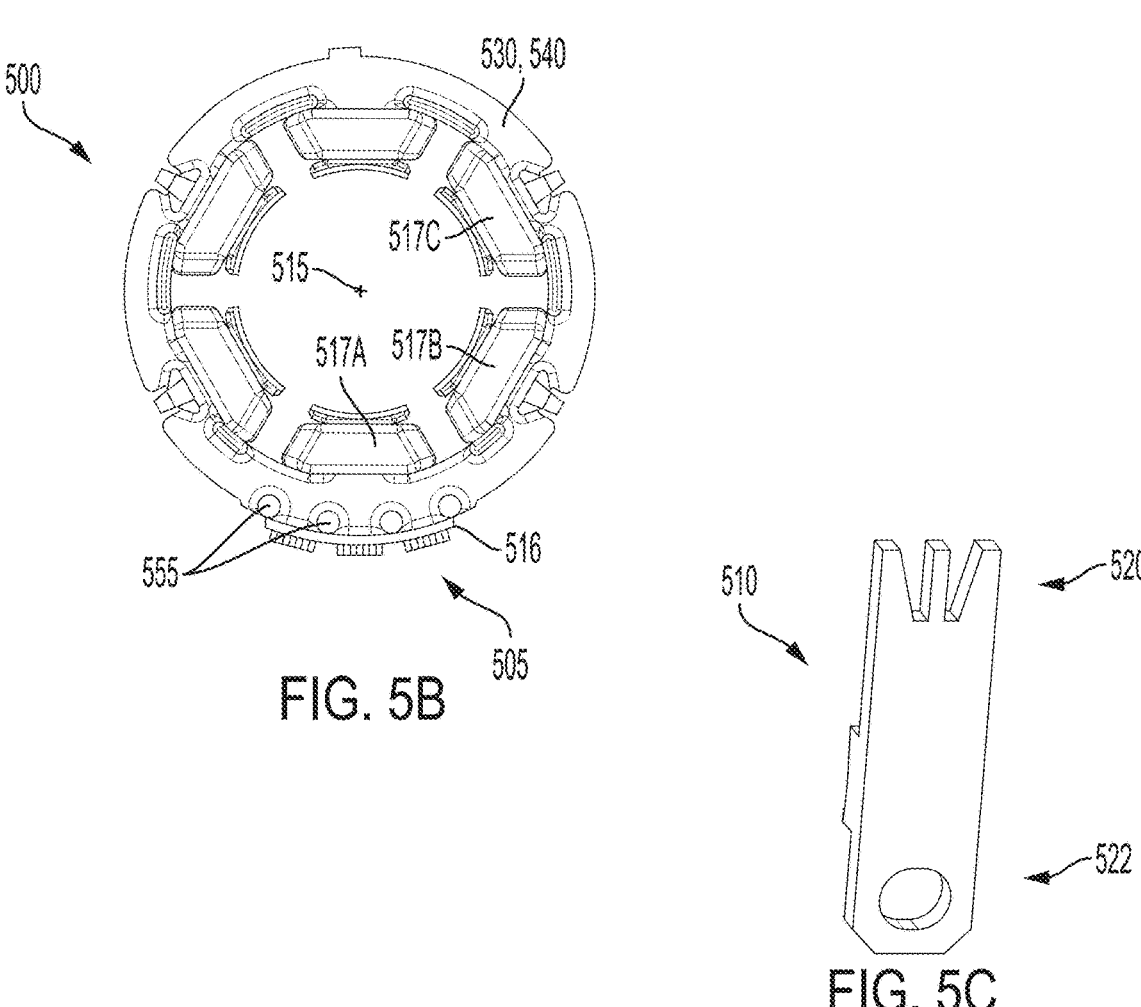
FIG. 5B
FIG. 5C

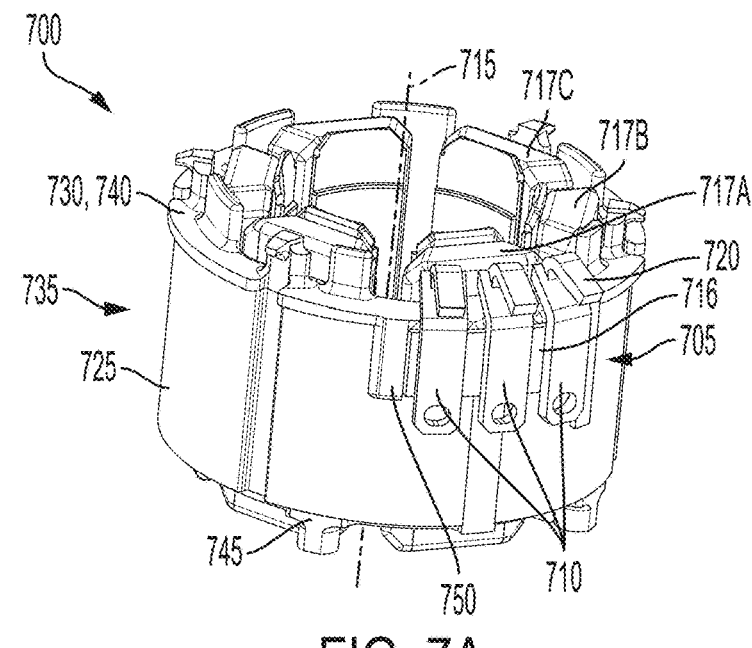
FIG. 7A
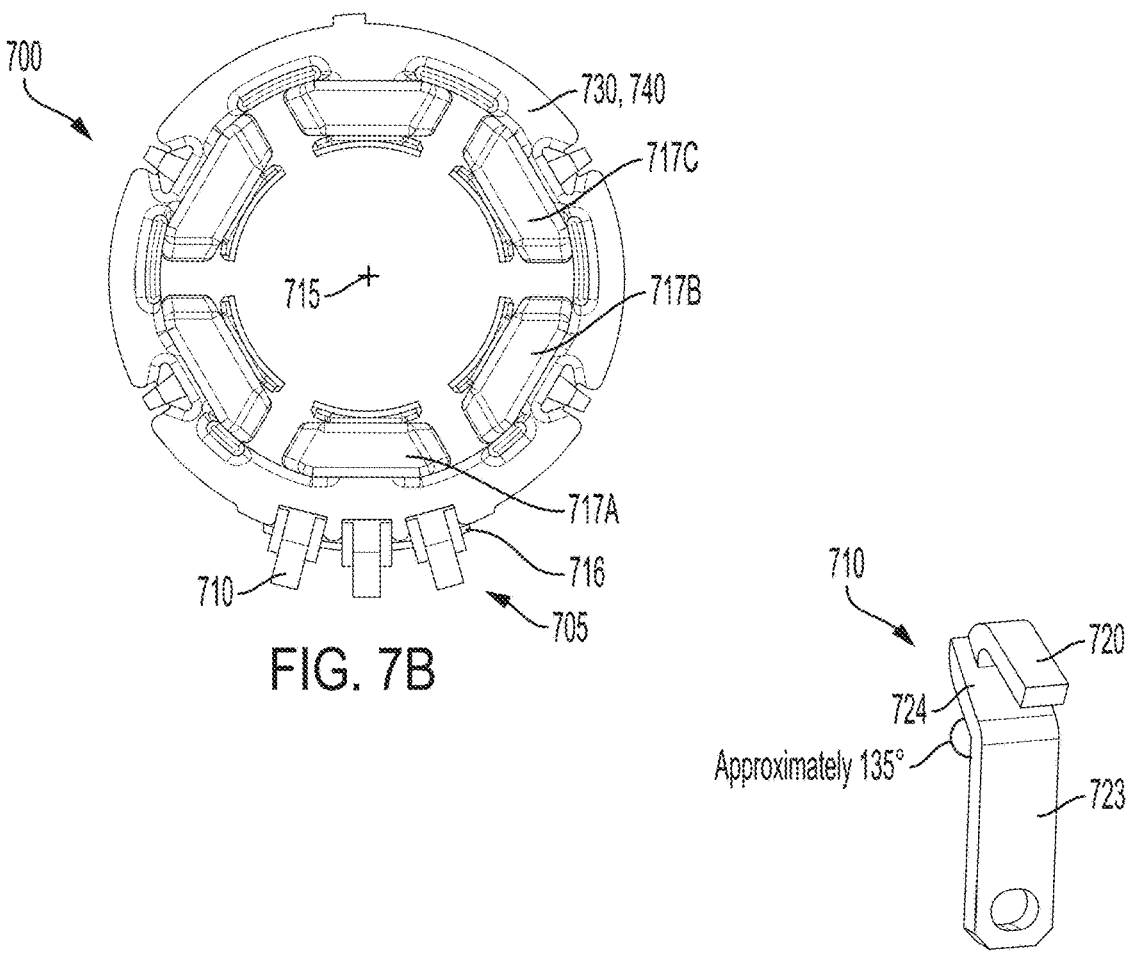
FIG. 7B
Approximately 135°
FIG. 7C

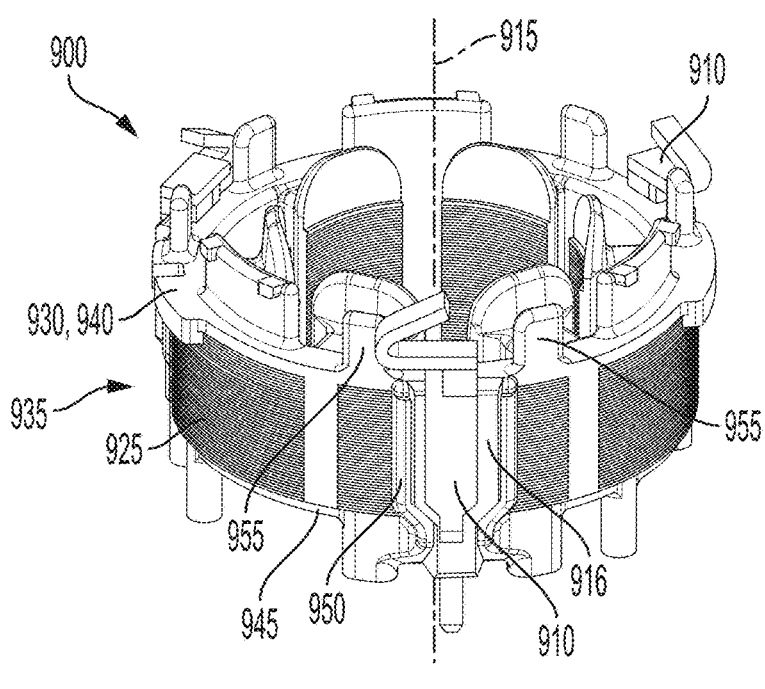
FIG. 9A
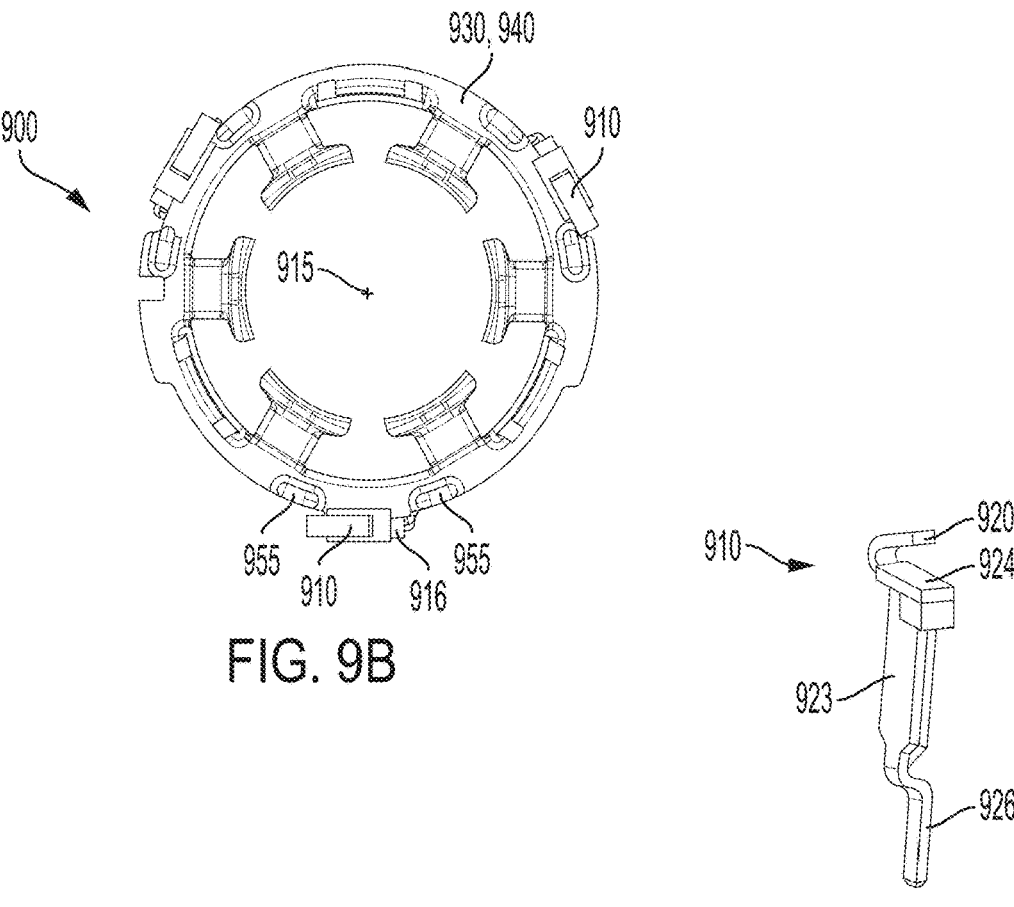
FIG. 9B
FIG. 9C

1000

1015

1010

1030, 1040

1055

1035

1025

1045          1055          1050          1010          1016

1010

1000

1015

1030, 1040

1055

1016

1055          1010

1010

1020

1023

1026

2400

2404          2408          2412          2416          2420

BRUSHLESS MOTOR FOR A POWER TOOL

RELATED APPLICATIONS

This application is a continuation of U.S. patent application Ser. No. 17/338,791, filed on Jun. 4, 2021, which claims priority to U.S. Provisional Patent Application No. 63/035,273, filed on Jun. 5, 2020, U.S. Provisional Patent Application No. 63/036,035, filed on Jun. 8, 2020, and U.S. Provisional Patent Application No. 63/050,166, filed on Jul. 10, 2020, the entire contents of all of which are hereby incorporated by reference.

FIELD

The present disclosure relates to a brushless motor for a power tool.

BACKGROUND

Power tools generally include a motor connected to a power source to power the tool. One such motor is a brushed direct current ("DC") motor. In brushed DC motors, motor brushes make and break electrical connection to the motor due to rotation of the rotor. Conventionally, brushed DC motors were used in power tools for their relative ease of manufacture and low cost.

SUMMARY

Brushed DC motors have several drawbacks when used in power tools. One drawback of brushed DC motors is that the brushes eventually wear out, reducing the longevity of the power tool. Further, because the brushes are making and breaking electrical connection, there may be sparks and electrical noise within the power tool. A brushless DC motor is another type of motor used in power tools. A brushless DC motor uses electronically controlled switches to selectively apply power to coils of a motor to drive a rotor, rather than brushes.

Embodiments of the disclosure are directed to brushless DC motors for a power tool and to power tools incorporating such brushless DC motors. Power tools described herein include a housing, a controller within the housing, and a brushless motor within the housing and controlled by the controller. The brushless motor includes a stator assembly and a rotor assembly. The stator assembly includes a stator core having stator laminations with an annular portion and inwardly extending stator teeth. The rotor assembly includes a rotor core having rotor laminations and defining a central aperture that receives an output shaft.

Power tools described herein include a housing, a brushless direct current (DC) motor, a non-conductive terminal mount, and a plurality of terminals. The housing has a motor housing portion, a handle portion, and a battery pack interface. The battery pack interface is configured to removably receive and support a battery pack. The brushless DC motor is located within the motor housing portion and has a rotor and a stator. The rotor is coupled to a motor shaft arranged to produce an output outside of the housing. The non-conductive terminal mount is located on an outer peripheral surface of the stator and includes an angled surface. The angled surface is not substantially parallel to a longitudinal axis of the motor. The plurality of terminals is mounted on the angled surface of the terminal mount. Each of the terminals is angled in a first direction such that the terminals are not substantially parallel to the longitudinal axis of the motor. A first end of each of the terminals includes a tang loop configured to be electrically and physically connected to a stator coil. A second end of each of the terminals that is opposite the first end is electrically connected to a power source configured to provide power to the stator coil. The first end of each of the terminals is located closer to the longitudinal axis than the respective second end of each terminal.

Power tools described herein include a housing, a brushless DC motor, and a plurality of terminals. The housing has a motor housing portion, a handle portion, and a battery pack interface. The battery pack interface is configured to removably receive and support a battery pack. The brushless DC motor is located within the motor housing portion and has a rotor and a stator. The rotor is coupled to a motor shaft arranged to produce an output outside of the housing. The stator includes a lamination stack and a stator molding that supports the lamination stack to form a molded stator body. The stator molding includes a first axial end portion and a second axial end portion opposite the first axial end portion. The plurality of terminals is located on an outer peripheral surface of the stator. Each of the terminals includes a first portion that is substantially parallel to the longitudinal axis and a second portion extending from the first portion and that is bent in a radial direction of the motor toward a longitudinal axis of the motor and over the first axial end portion of the stator molding.

Power tools described herein include a housing and a brushless DC motor. The housing has a motor housing portion, a handle portion, and a battery pack interface. The battery pack interface is configured to removably receive and support a battery pack. The brushless direct current (DC) motor is located within the motor housing portion and has a rotor and a stator. The rotor is coupled to a motor shaft arranged to produce an output outside of the housing. The rotor includes a plurality of magnets within a rotor stack, each of the magnets has a length along a longitudinal axis of the brushless DC motor. The length of the magnets along the longitudinal axis defines a rotor envelope along the longitudinal axis. The rotor includes a bearing pocket inside of the rotor stack at an axial end of the rotor stack and radially inside a diameter of the magnets. A recessed bearing is located within the bearing pocket. The recessed bearing is located within the rotor envelope and is configured to support the motor shaft.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

FIGS. 5A, 5B, and 5C illustrate a motor stator according to embodiments described herein.

FIGS. 7A, 7B, and 7C illustrate a motor stator according to embodiments described herein.

FIGS. 9A, 9B, and 9C illustrate a motor stator according to embodiments described herein.

DETAILED DESCRIPTION

Figure 1:
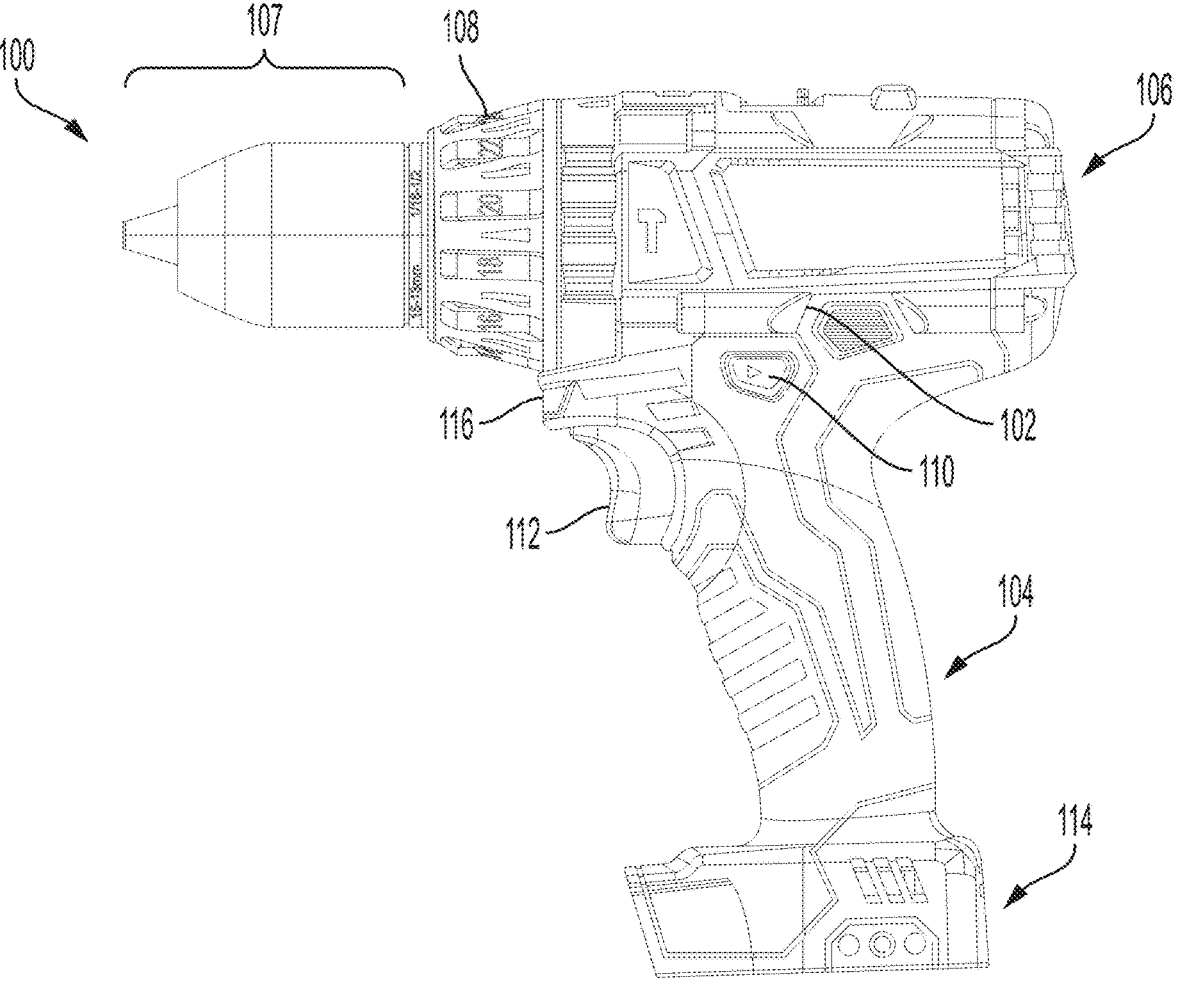
FIG. 1 illustrates a power tool incorporating a brushless DC motor.

FIG. 1 illustrates a power tool 100 incorporating a brushless direct current (DC) motor. In a brushless motor power tool, such as power tool 100, switching elements are selectively enabled and disabled by control signals from a controller to selectively apply power from a power source (e.g., battery pack) to drive a brushless motor. The power tool 100 is illustrated as a brushless hammer drill having a housing 102 with a handle portion 104 and motor housing portion 106. The power tool 100 further includes an output unit 107, torque setting dial 108, forward/reverse selector 110, trigger 112, battery pack interface 114, and light 116. Although FIG. 1 illustrates a hammer drill, in some embodiments, the motors described herein are incorporated into other types of power tools including drills/drivers, impact drivers, impact wrenches, circular saws, reciprocating saws, string trimmers, leaf blowers, vacuums, and the like.

Figure 2:
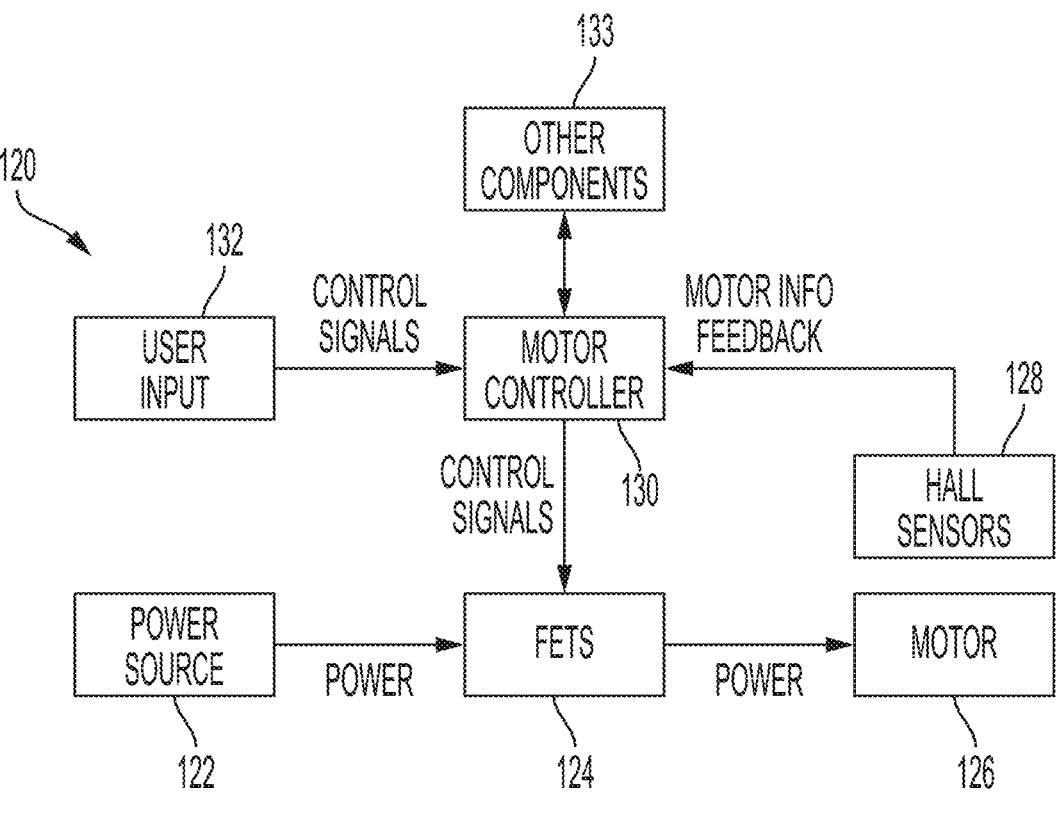
FIG. 2 illustrates a block diagram of a brushless power tool, such as illustrated in FIG. 1.

FIG. 2 illustrates a simplified block diagram 120 of the brushless power tool 100, which includes a power source 122, Field Effect Transistors (FETs) 124, a motor 126, Hall effect sensors 128, a motor controller 130, user input 132, and other components 133 (battery pack fuel gauge, work lights (LEDs), current/voltage sensors, etc.). The power source 122 provides DC power to the various components of the power tool 100 and may be a power tool battery pack that is rechargeable and uses, for instance, lithium ion cell technology. In some instances, the power source 122 may receive AC power (e.g., 120V/60 Hz) from a tool plug that is coupled to a standard wall outlet, and then filter, condition, and rectify the received power to output DC power. Each Hall effect sensor 128 outputs motor feedback information, such as an indication (e.g., a pulse) when a magnet on the rotor rotates across the face of that Hall sensor. Based on the motor feedback information from the Hall sensors 128, the motor controller 130 can determine the position, velocity, and acceleration of the rotor. The motor controller 130 also receives user controls from user input 132, such as by depressing the trigger 112 or shifting the forward/reverse selector 110. In response to the motor feedback information and user controls, the motor controller 130 transmits control signals to control the FETs 124 to drive the motor 126. By selectively enabling and disabling the FETs 124, power from the power source 122 is selectively applied to stator coils of the motor 126 to cause rotation of a rotor. Although not shown, the motor controller 130 and other components of the power tool 100 are electrically coupled to the power source 122 such that the power source 122 provides power thereto.

Various embodiments of the motor 126 are illustrated and described with respect to FIGS. 3A-39. Any terminal design can be used with any motor or stator disclosed herein. For example, terminals disclosed as being located on a single terminal mount may alternatively be individually located around the outer circumference of the stator (e.g., spaced approximately 120° apart), and terminals disclosed as being located around the outer circumference of the stator (e.g., spaced approximately 120° apart) may be alternatively located on a single terminal mount.

FIGS. 3A, 3B, 3C, and 3D illustrate a motor 300 that includes a terminal assembly 305 with a plurality of angled terminals 310. The terminals 310 are angled with respect to a longitudinal axis 315 of the motor 300 such that the terminals 310 are not substantially parallel to the longitudinal axis 315 of the motor 300. In some embodiments, the terminals 310 are angled at an angle of 15° with respect to the longitudinal axis 315 of the motor 300. In other embodiments, the terminals 310 are angled at an angle of between 5° and 90° such that the terminals 310 are again not substantially parallel to the longitudinal axis 315 of the motor 300. The terminals may be mounted on a terminal mount 316 (see FIG. 3C) that may be made of resin, rubber, or another non-conductive material. The terminal mount 316 may include an angled surface on which the terminals 310 are mounted such that the terminals 310 are arranged at the angle of 15° or at the angle of between 5° and 90°. The angled surface may be angled with respect to the longitudinal axis 315 of the motor 300 such that the angled surface is not substantially parallel to the longitudinal axis 315 of the motor 300. In some embodiments, the terminals 310 are bent back to a minimum required angle of safety. In some embodiments, stator coils (i.e., stator windings, wire leads, stator winding leads) 317A-C are soldered, resistance welded, or fused to the one end of the terminals 310. For example, an end of a stator coil 317 is soldered, resistance welded, or fused to a compressed tang loop 320 on a first end of a terminal 310. In some embodiments, a wire connecting the terminal 310 to the power source 122 via the FETs 124 is soldered or otherwise connected to a second end of the terminal 310 that is opposite to the first end of the terminal 310 where the tang loop 320 is located.

The stator coils 317 are energized to produce a magnetic field. The stator coils 317 are electrically connected to corresponding phase wires via the terminals 310. In other words, the phase wires are electrically connected to the stator coils 317. The stator coils 317 are selectively energized by the power source 122 via the FETs 124, for example. In the illustrated embodiment, the stator coils 317 include three phases. The three phases of the stator coils 317 can be connected to each other in a delta, wye, or any other suitable configuration.

Figure 3A:
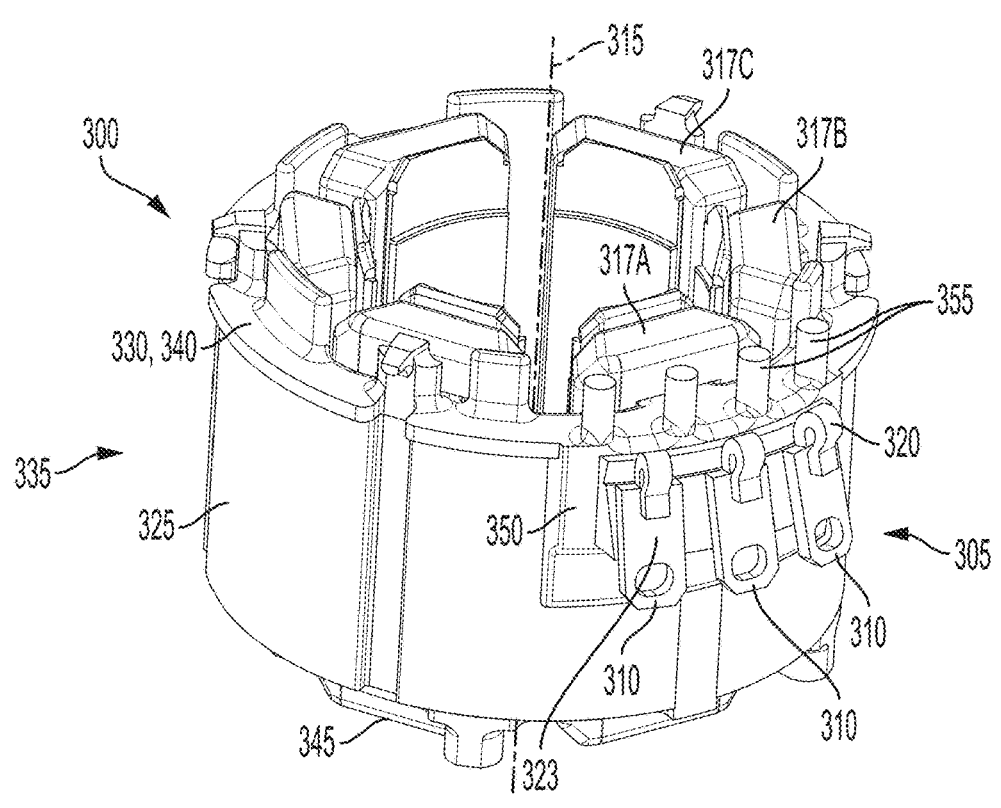
FIGS. 3A, 3B, 3C, and 3D illustrate a motor stator according to embodiments described herein.
Figure 3B:
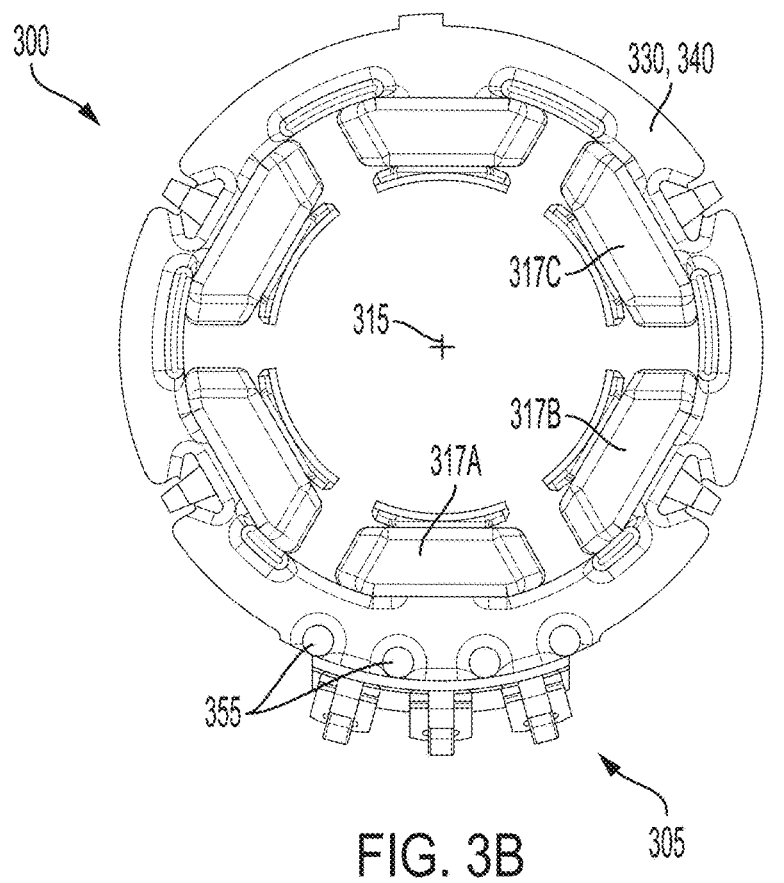
Figure 3C:
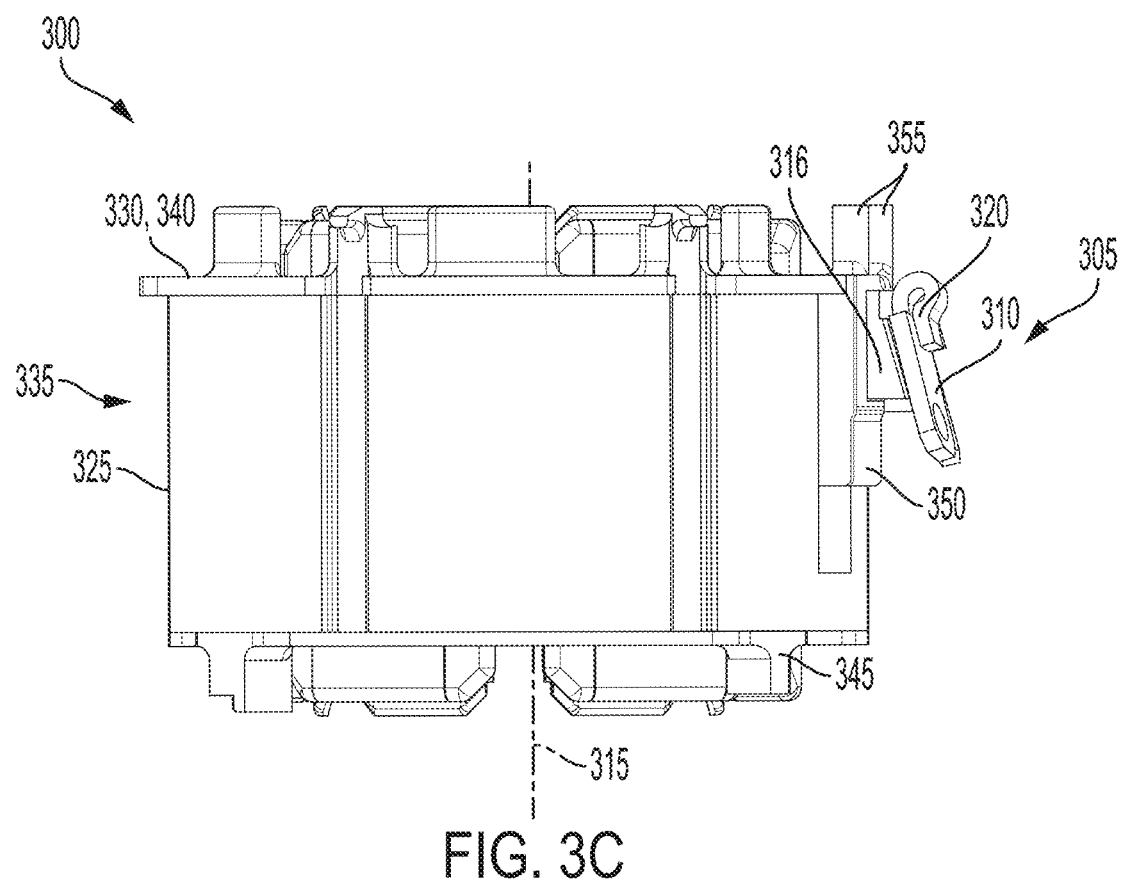
Figure 3D:
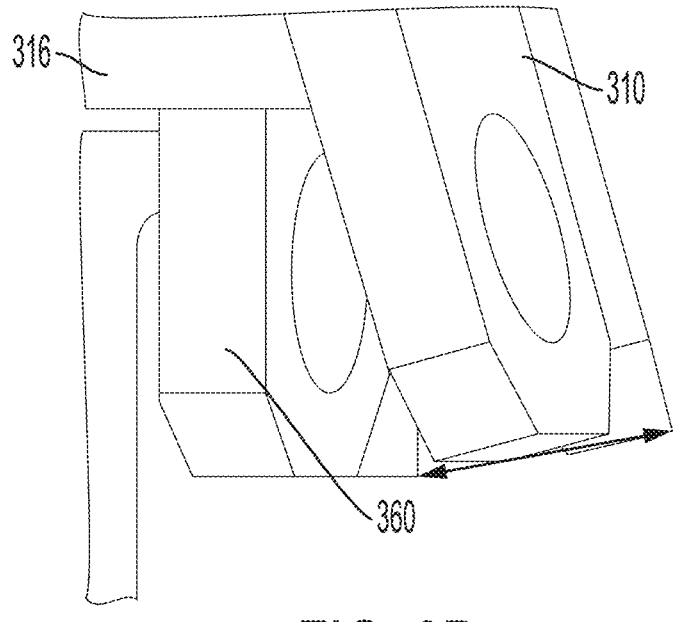
Figure 4A:
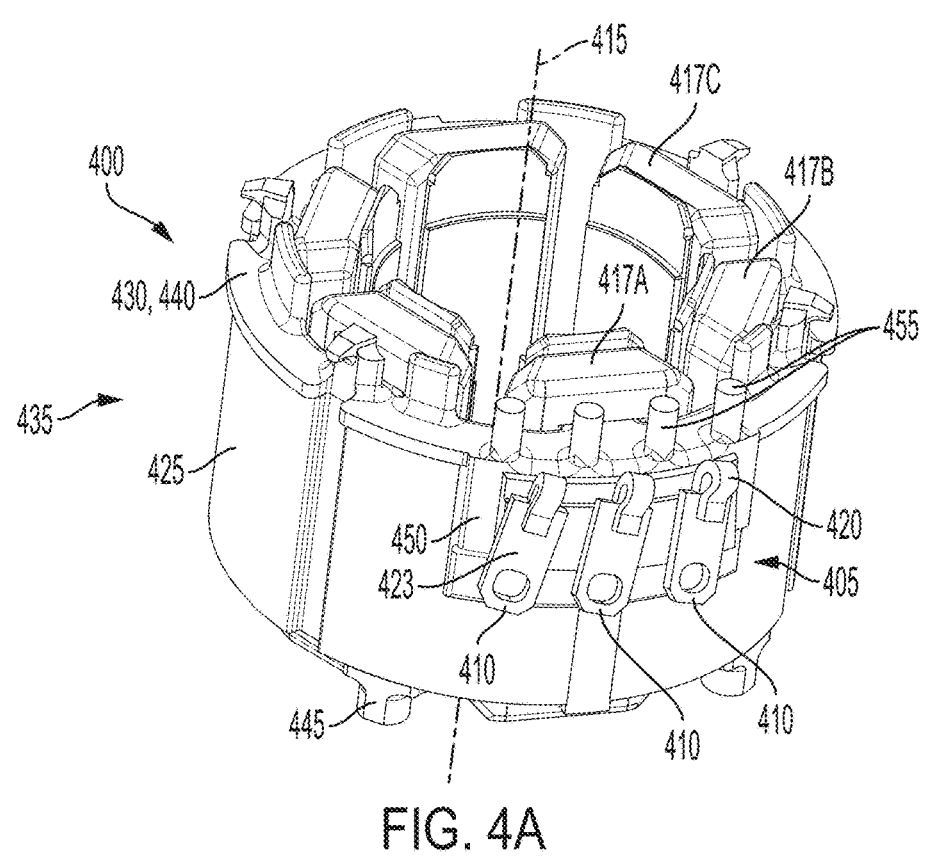
FIGS. 4A, 4B, 4C, and 4D illustrate a motor stator according to embodiments described herein.
Figure 4B:
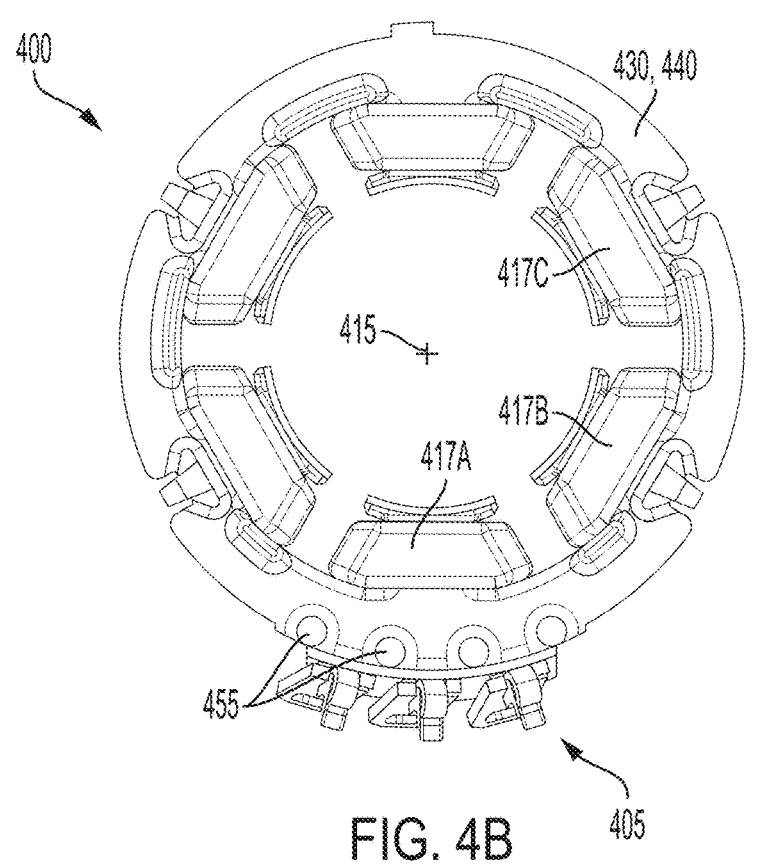
Figure 4C:
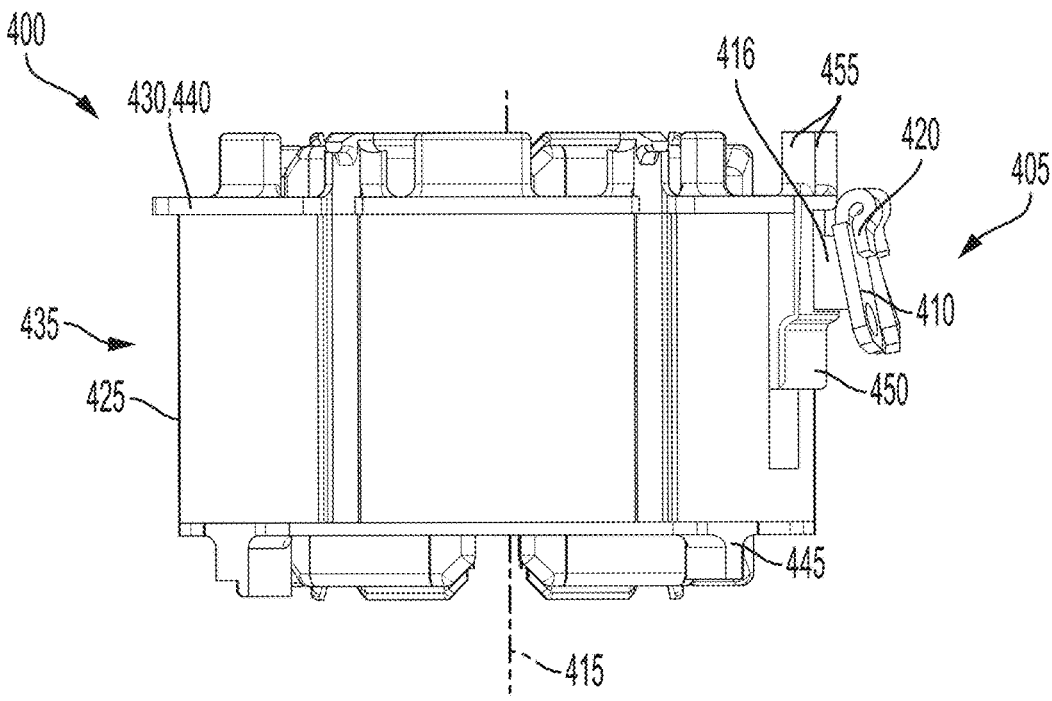
Figure 4D:
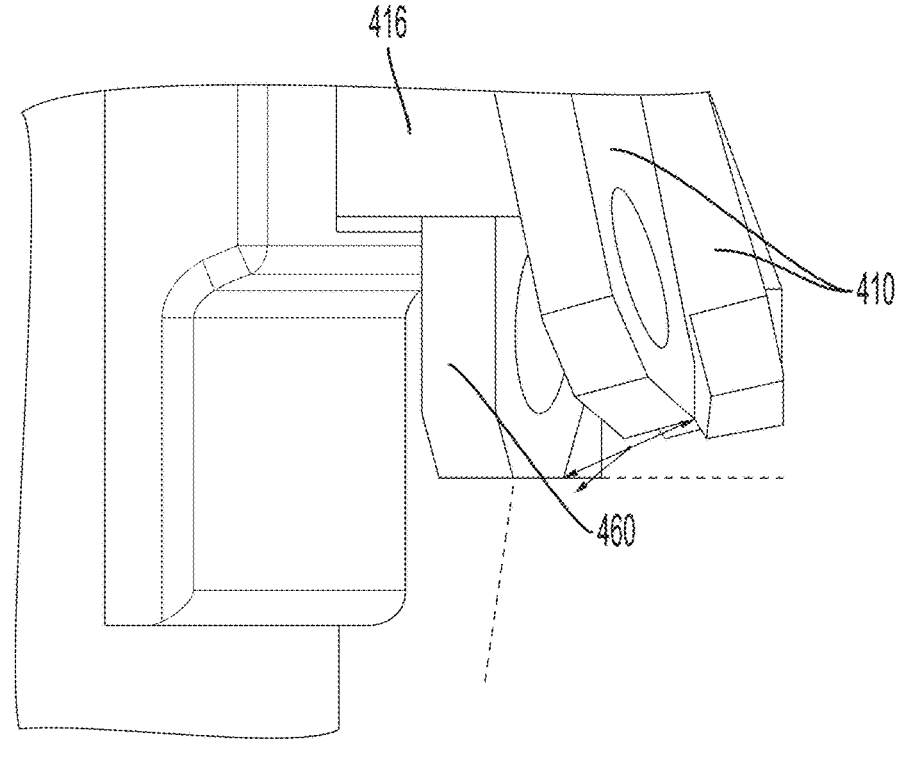

As shown in FIGS. 3A-3C, in some embodiments, the motor 300 includes a lamination stack 325, a stator molding 330 that is molded or holds to the lamination stack 325 to form a molded stator body 335 (FIG. 3A). The stator molding 330 of the molded stator body 335 includes a first axial end portion 340, a second axial end portion 345, and an extending portion 350 extending axially along an outer circumferential/peripheral surface of the lamination stack 325. The extending portion 350 is curved along the outer circumferential surface of the lamination stack 325. In the illustrated embodiment, the extending portion 350 extends from the first axial end portion 340 at least partially between the first axial end portion 340 and the second axial end portion 345. The stator molding 330 includes posts 355 formed extending away from the first axial end portion 340. The posts 355 are wire routing features that aid in the process of winding the stator coils 317 onto the molded stator body 335. FIG. 3D illustrates the positioning of the angled terminal 310 compared to a parallel terminal 360 that may be used in alternate situations.

FIGS. 4A-4D illustrate another embodiment of a motor 400 like the motor 300 described above, with like features shown with like reference numerals plus "100," unless explained differently below. FIGS. 4A, 4B, 4C, and 4D illustrate a motor 400 that includes a terminal assembly 405 with a plurality of terminals 410 that are angled and skewed. The terminals 410 are angled with respect to the longitudinal axis 415 of the motor 400 such that the terminals 410 are not substantially parallel to the longitudinal axis 415 of the motor 400 in multiple dimensions (e.g., both tilted and twisted/skewed). The terminals 410 are angled to not be substantially parallel to the longitudinal axis 415 in both a radial direction (as in FIGS. 3A-3C), as well as angled along an outer surface of the lamination stack 425. In some embodiments, the terminals 410 are angled at an angle of 15° with respect to the longitudinal axis 415 of the motor 400 along both dimensions. In other embodiments, the terminals 410 are angled at an angle of between 5° and 90° such that the terminals 410 are again not substantially parallel to the longitudinal axis 415 of the motor 400 along both dimensions. In other words, each of the terminals 410 may be additionally angled in a second direction (different from a first direction in which the terminals 310 of FIGS. 3A-3D are angled) and about an axis parallel to the longitudinal axis 415.

FIGS. 5A-5C illustrate another embodiment of a motor 500 like the motor 300 described above, with like features shown with like reference numerals plus "200," unless explained differently below. FIGS. 5A, 5B, and 5C illustrate a motor 500 that includes a plurality of terminals 510 that do not include a tang (e.g., a tang 320, 420 that would fold over a main portion 323, 423 of the terminal 310, 410 as shown in FIGS. 3A-4D). Instead, the terminals 510 includes a V-notch 520 at a first end for connecting the motor windings and a flat power connection portion 522 for receiving power wires. In some embodiments, the motor windings are wrapped around the V-notch 520 and then, for example, soldered, welded, or fused to the terminal 510. In some embodiments, the terminals 510 are bent in the radial direction of the motor 500 over the insulating member (i.e., a first axial end portion 540 of a stator molding 530) at the end of the motor 500, for example, in a similar manner as shown in FIGS. 7A and 7C.

Figure 6A:
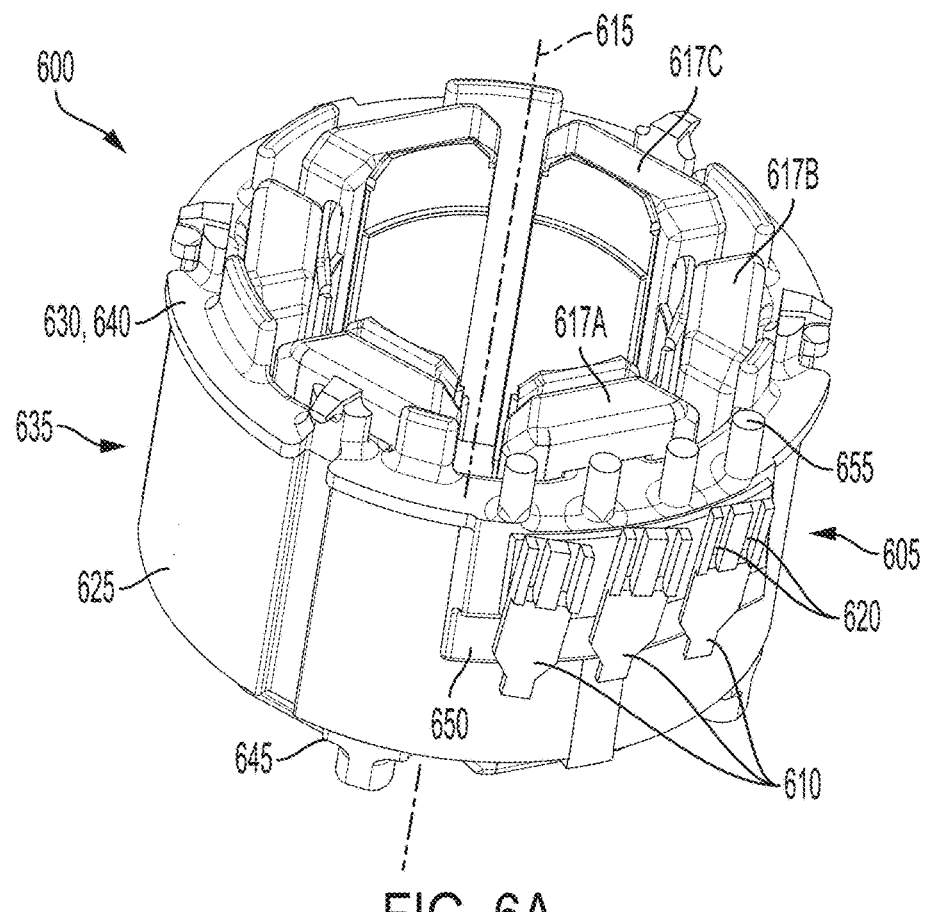
FIGS. 6A and 6B illustrate a motor stator according to embodiments described herein.
Figure 6B:
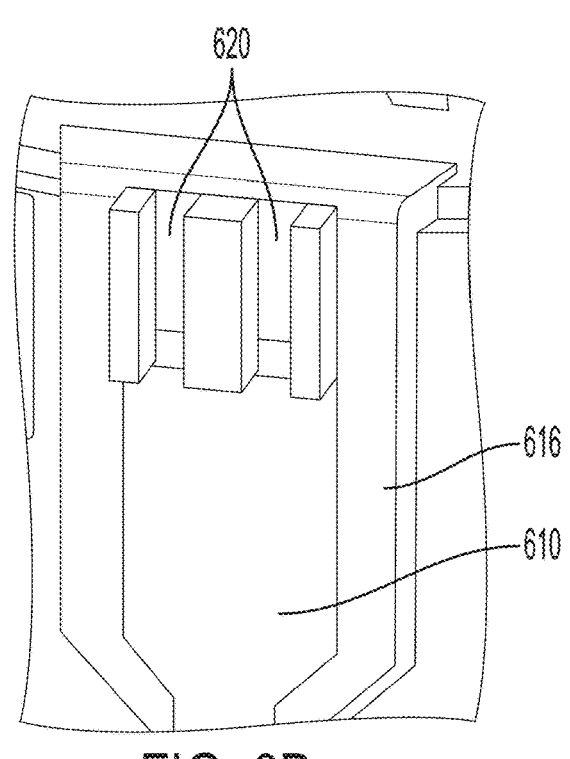

FIGS. 6A and 6B illustrate another embodiment of a motor 600 like the motor 300 described above, with like features shown with like reference numerals plus "300," unless explained differently below. FIGS. 6A and 6B illustrate a motor 600 that includes a plurality of terminals 610 that do not include a tang (e.g., a tang 320, 420 that would fold over a main portion 323, 423 of the terminal 310, 410 as shown in FIGS. 3A-4D). Instead, the terminals 610 include two slots 620 at a first end for connecting the motor windings. In some embodiments, the motor windings are pressed into the slots 620 and then, for example, soldered, welded, or fused. The terminals 610 each include two slots 620 for receiving, for example, four passes of a motor winding. As shown in FIG. 6A, the terminals 610 may be angled and/or tilted/skewed in a similar manner as described in other embodiments disclosed herein.

FIGS. 7A, 7B, and 7C illustrate another embodiment of a motor 700 like the motor 300 described above, with like features shown with like reference numerals plus "400," unless explained differently below. FIGS. 7A, 7B, and 7C illustrate a motor 700 that includes a plurality of terminals 710 that do not include a tang 320, 420 that would fold over a main portion 323, 423 of the terminal 310, 410 as shown in FIGS. 3A-4D. Instead, the terminals 710 include a tang 720 folded over a second portion 724 that extends at an approximate 45° angle to the longitudinal axis 715 of the motor 700. The terminals 710 in FIGS. 7A-7C include three portions. A main or first portion 723 is parallel to the longitudinal axis 715 of the motor 700. A second portion 724, extending at approximately a 135° angle with respect to the first portion 723, is bent in the radial direction of the motor 700. In other words, the second portion 724 extends at approximately a 45° angle with respect to a flat portion of a first axial end portion 740 of the motor 700. A third portion 720 is a tang. A motor winding wire can be wound around the tang 720, and the tang 720 can be folded over the second portion 724 of the terminal 710.

Figures 8A, 8B, 8C:
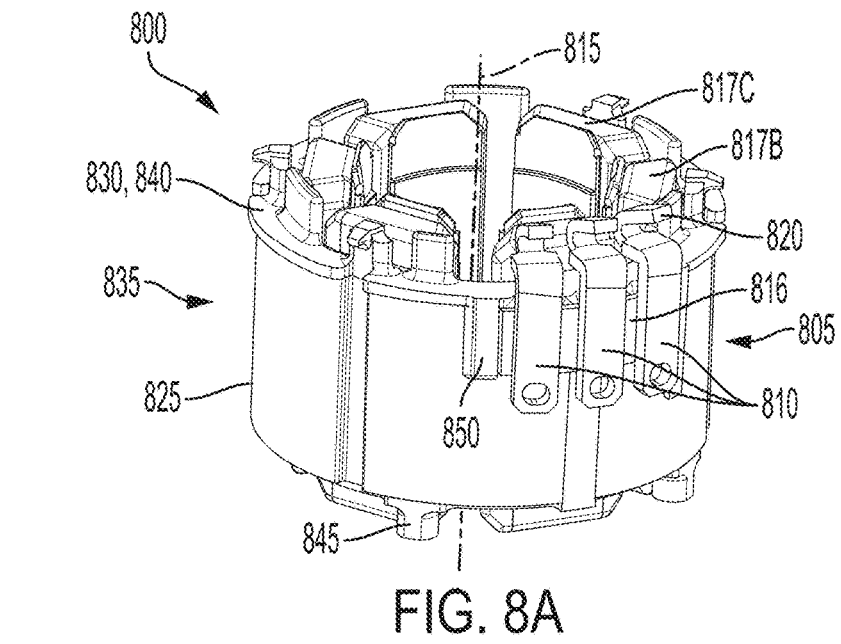
FIGS. 8A, 8B, and 8C illustrate a motor stator according to embodiments described herein.

FIGS. 8A, 8B, and 8C illustrate another embodiment of a motor 800 like the motor 300 described above, with like features shown with like reference numerals plus "500," unless explained differently below. FIGS. 8A, 8B, and 8C illustrate a motor 800 that includes a plurality of terminals 810 that do not include a tang 320, 420 that would fold over a main portion 323, 423 of the terminal 310, 410 as shown in FIGS. 3A-4D. Instead, the terminals include a tang 820 folded over a second portion 824 that is perpendicular to the longitudinal axis 815 of the motor 800. The terminals 810 in FIGS. 8A-8C include three portions. A first portion 823 is parallel to the longitudinal axis 815 of the motor 800. A second portion 824, perpendicular to the first portion 823 and parallel to a flat portion of a first axial end portion 840 of the motor 800, is bent in the radial direction of the motor 800. A third portion 820 is a tang 820. A motor winding wire can be wound around the tang 820, and the tang 820 can be folded over the second portion 824 of the terminal 810.

FIGS. 9A, 9B, and 9C illustrate another embodiment of a motor 900 like the motor 300 described above, with like features shown with like reference numerals plus "600," unless explained differently below. FIGS. 9A, 9B, and 9C illustrate a motor 900 that includes a plurality of terminals 910 that do not include a tang 320, 420 that would fold over a main portion 323, 423 of the terminal 310, 410 as shown in FIGS. 3A-4D. Instead, the terminals 910 include a tang 920 folded over a second portion 924 (i.e., tangential to the longitudinal axis 915 of the motor 900). The terminals 910 in FIGS. 9A-9C include three portions. A first portion 923 is parallel to the longitudinal axis 915 of the motor 900. A second portion 924, perpendicular to the first portion 923 and tangential to the longitudinal axis 915 of the motor 900, is bent tangentially with respect to the outer diameter of the motor 900 (i.e., tangential to the circumference of a first axial end portion 940 of the motor 900). A third portion 920 is a tang 920. A motor winding wire can be wound around the tang 920, and the tang 920 can be folded over the second portion 924 of the terminal 910. The terminals 910 also include a power wire connecting portion 926 as shown in FIG. 9C. The power wire connecting portion 926 may be parallel to the first portion 923 but may be located in a different plane. A power wire that is electrically connected to the FETs 124 may be soldered or otherwise connected to the power wire connecting portion 926 to provide power to the motor coils via the terminals 910. As shown in FIG. 9A, in some embodiments, the terminal 910 may be mounted on the terminal mount 916 such that a portion of the terminal 910 (e.g., the power wire connecting portion 926) protrudes through a hole in the terminal mount 916.

As shown in FIGS. 9A and 9B, the terminals 910 are mounted separately on terminal mounts 916 spaced at approximately 120° around the circumference/outer peripheral surface of the motor 900. However, as explained above, in other embodiments, the terminals 910 are located on a single terminal mount 916 as shown in other previous embodiments. Similarly, the terminals shown in other embodiments as being located on a single terminal mount may be located separately around the circumference of the motor in a similar manner as shown in FIGS. 9A and 9B.

Figure 10A:
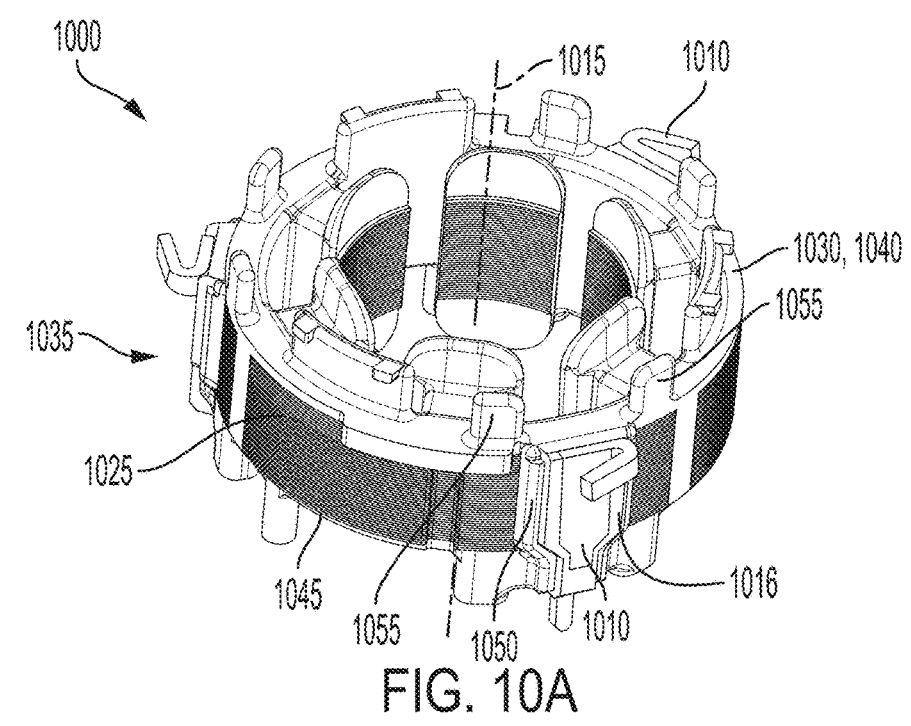
FIGS. 10A, 10B, and 10C illustrate a motor stator according to embodiments described herein.
Figure 10B:
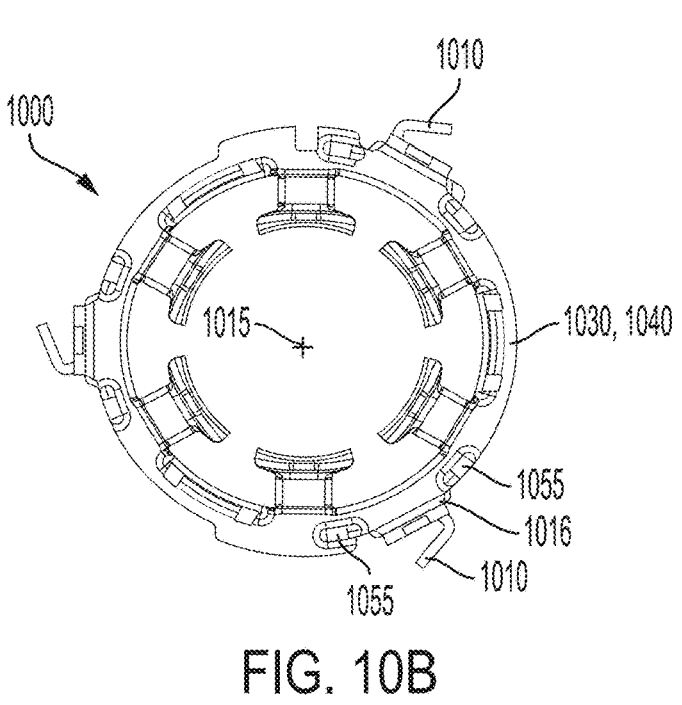
Figure 10C:
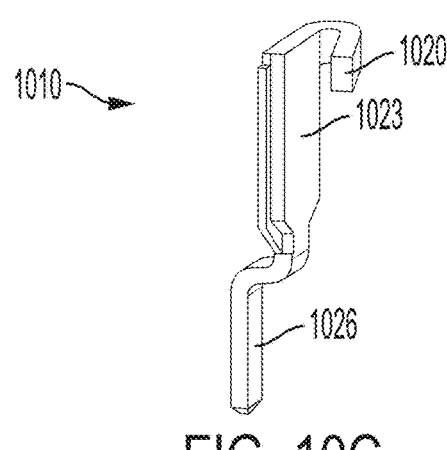

FIGS. 10A, 10B, and 10C illustrate another embodiment of a motor 1000 like the motor 300 described above, with like features shown with like reference numerals plus "700," unless explained differently below. FIGS. 10A, 10B, and 10C illustrate a motor 1000 that includes a plurality of terminals 1010. Each terminal includes a tang 1020 that is oriented tangentially with respect to the outer diameter of the motor 1000 and the stator. The tang 1020 is folded over a main portion 1023 of the terminal 1010 that is parallel to the longitudinal axis 1015 of the motor 1000. A motor winding wire can be wound around the tang 1020, and the tang 1020 can be folded over the terminal 1010 tangentially with respect to the outer diameter of the motor 1000 and the stator. The motor 1000 is similar to the motor 900 of FIGS. 9A and 9B because both motors 900 and 1000 have terminals 910, 1010 distributed separately around the circumference/outer peripheral surface of the motor 900, 1000. As shown in FIG. 10A, in some embodiments, the terminal 1010 may be mounted on the terminal mount 1016 such that a portion of the terminal 1010 (e.g., the power wire connecting portion 1026) protrudes through a hole in the terminal mount 1016.

Figure 11A:
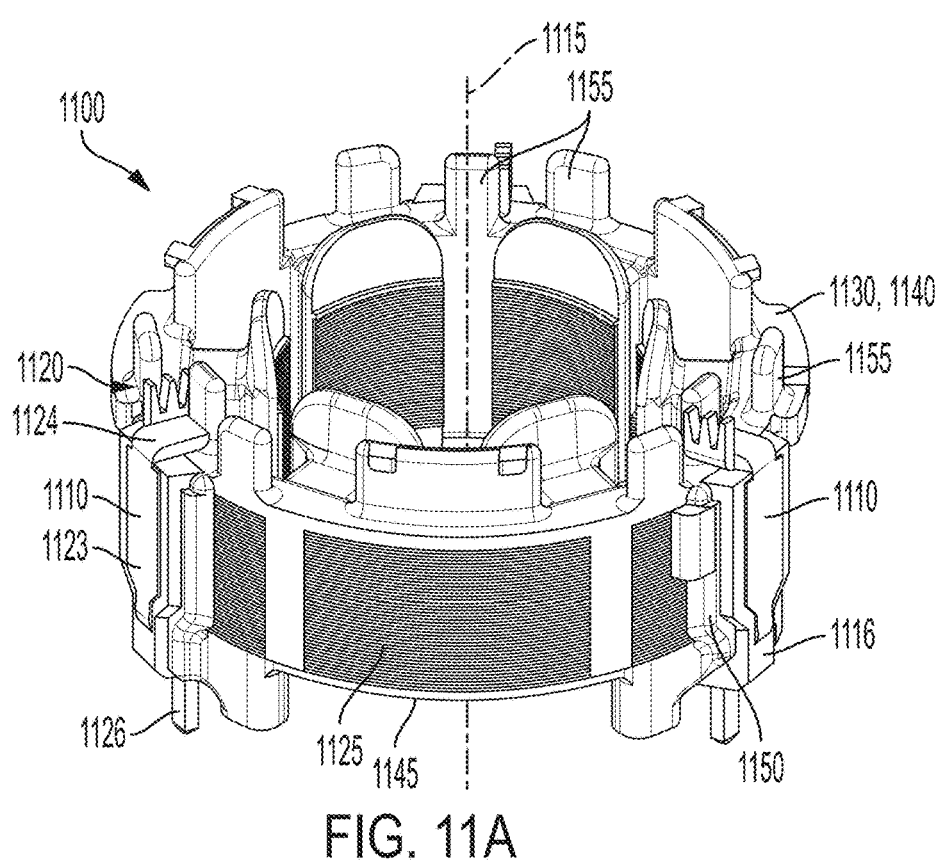
FIGS. 11A and 11B illustrate a motor stator according to embodiments described herein.
Figure 11B:
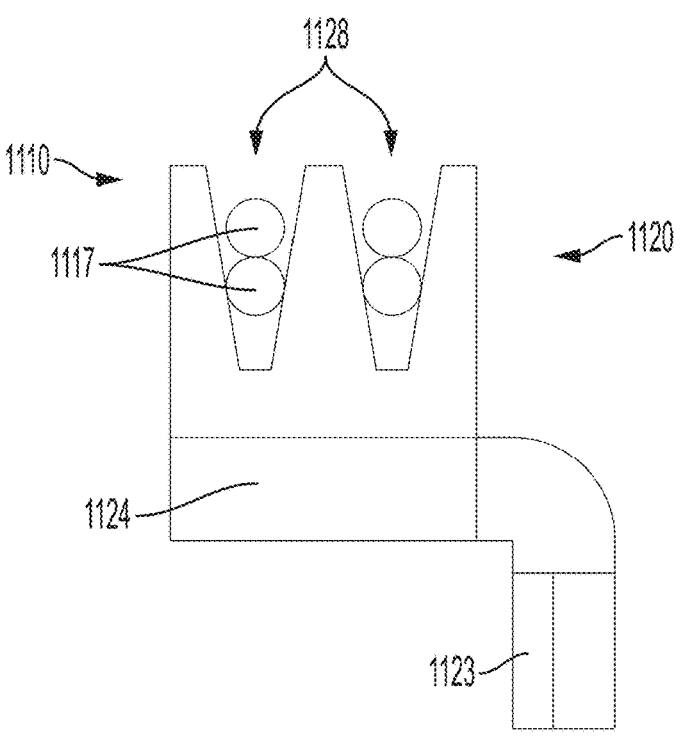

FIGS. 11A and 11B illustrate another embodiment of a motor 1100 like the motor 300 described above, with like features shown with like reference numerals plus "800," unless explained differently below. FIGS. 11A and 11B illustrate a motor 1100 that includes a plurality of terminals 1110 that do not include a tang 1020 (e.g., a tang 1020 that would fold over a main portion 1023 of the terminal 1010 as shown in FIGS. 10A-10C). Instead, the terminals 1110 include a radial V-notch 1120. The terminals 1110 in FIGS. 11A and 11B include three portions. A first portion 1123 is parallel to the longitudinal axis 1115 of the motor 1100. A second portion 1124, perpendicular to the first portion 1123, is bent in the radial direction of the motor 1100. A third portion 1120 includes a V-notch 1120 oriented radially with respect to the motor 1100. The V-notch 1120 extends approximately perpendicularly from the second portion 1124 and approximately parallel to the longitudinal axis 1115 of the motor 1100. The V-notch 1120 includes two slots 1128 for receiving, for example, four passes of a motor winding 1117 as shown in FIG. 11B. In some embodiments, the motor windings 1117 are pressed or fused into the V-notch 1120 in the radial direction. In some embodiments, the V-notch portion 1120 is folded over the second portion 1124 of the terminal 1110. The illustrated motor 1100 includes the terminals 1110 arranged 120° apart from one another and mounted on individual and separate non-conductive mounts 1116 similar to the embodiments shown in FIGS. 9A-10C. As shown in FIG. 11A, in some embodiments, the terminal 1110 may be mounted on the terminal mount 1116 such that a portion of the terminal 1110 (e.g., a power wire connecting portion 1126) protrudes through a hole in the terminal mount 1116.

Figure 12A:
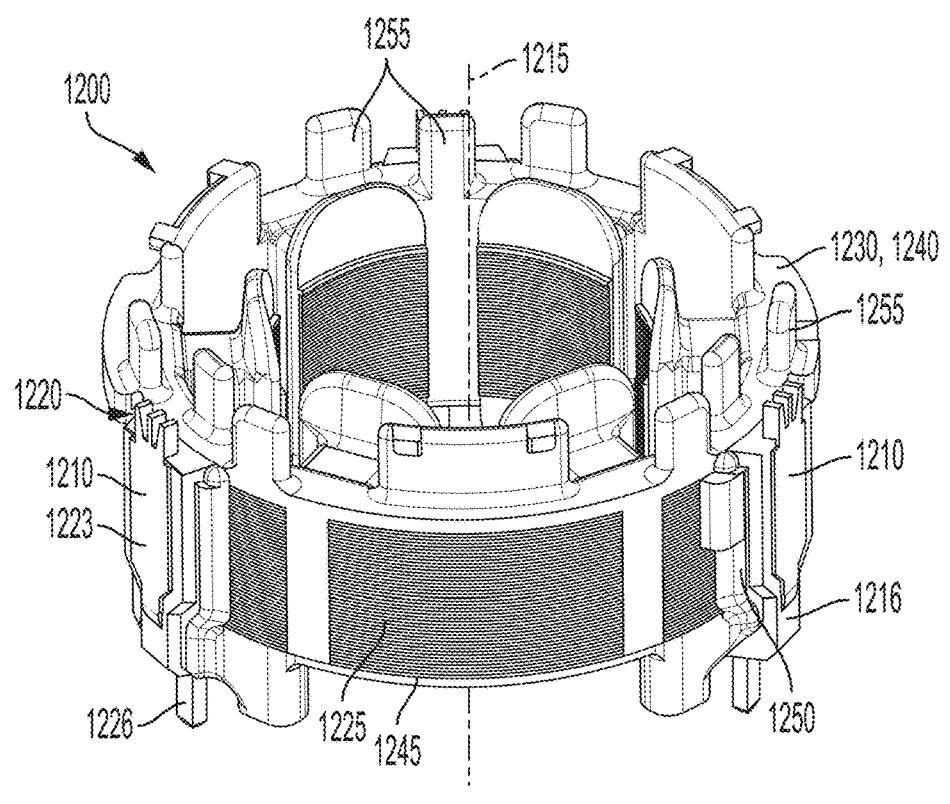
FIGS. 12A and 12B illustrate a motor stator according to embodiments described herein.
Figure 12B:
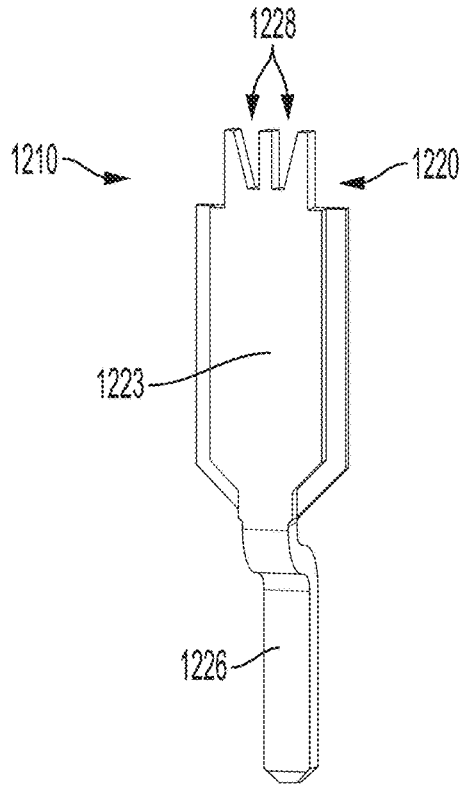

FIGS. 12A and 12B illustrate another embodiment of a motor 1200 like the motor 300 described above, with like features shown with like reference numerals plus "900," unless explained differently below. FIGS. 12A and 12B illustrate a motor 1200 that includes a plurality of terminals 1210 that do not include a tang 1020 (e.g., a tang 1020 that would fold over a main portion 1023 of the terminal 1010 as shown in FIGS. 10A-10C). Instead, the terminals 1210 include an axial V-notch 1220 at a first end of a main portion 1223 of the terminal 1210 for connecting the motor windings and a flat power connection portion 1226 for receiving power wires. The axial V-notch 1220 extends parallel to the longitudinal axis 1215 of the motor 1200 from the main portion 1223 and in the same plane as the main portion 1223. In some embodiments, the motor windings are wrapped around the V-notch 1220 and then, for example, soldered or welded. The V-notch 1220 includes two slots 1228 for receiving, for example, four passes of a motor winding (in a similar manner as that shown in FIG. 11B). In some embodiments, the terminals 1210 are bent in the radial direction of the motor 1200 over the insulating member/first axial end portion 1240 at the end of the motor stator. In some embodiments, the motor windings are pressed or fused into the V-notch 1220. The illustrated motor 1200 includes the terminals arranged 120° apart from one another and mounted on individual and separate non-conductive mounts 1216 similar to the embodiments shown in FIGS. 9A-11B. As shown in FIG. 12A, in some embodiments, the terminal 1210 may be mounted on the terminal mount 1216 such that a portion of the terminal 1210 (e.g., a power wire connecting portion 1226) protrudes through a hole in the terminal mount 1216.

Figure 13A:
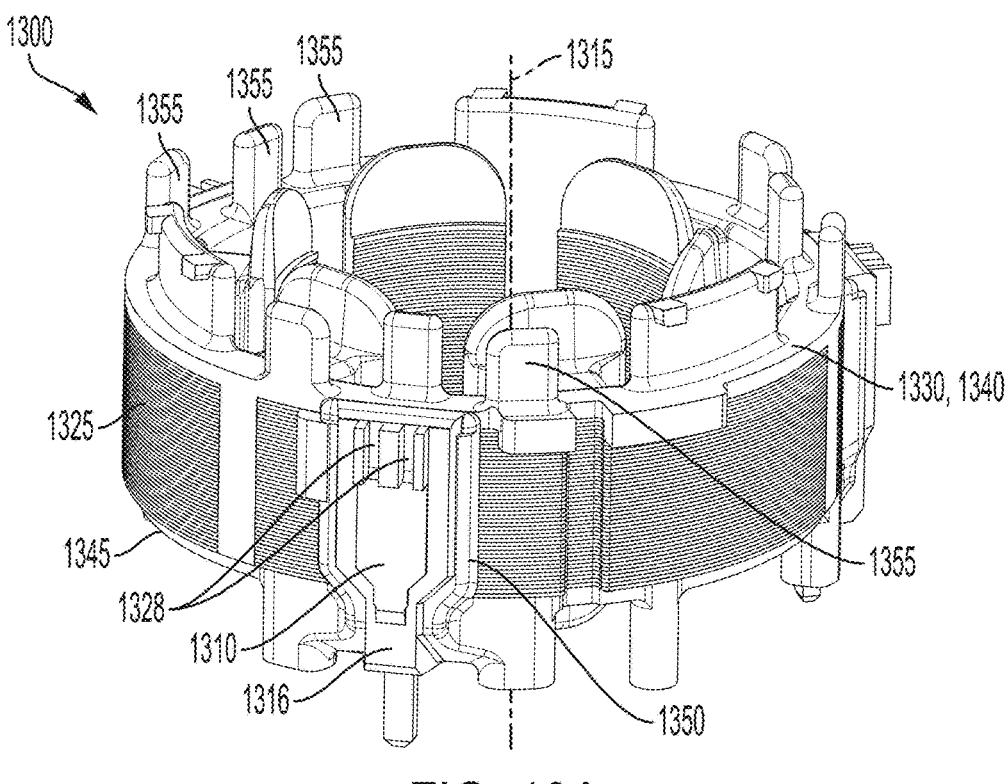
FIGS. 13A and 13B illustrate a motor stator according to embodiments described herein.
Figure 13B:
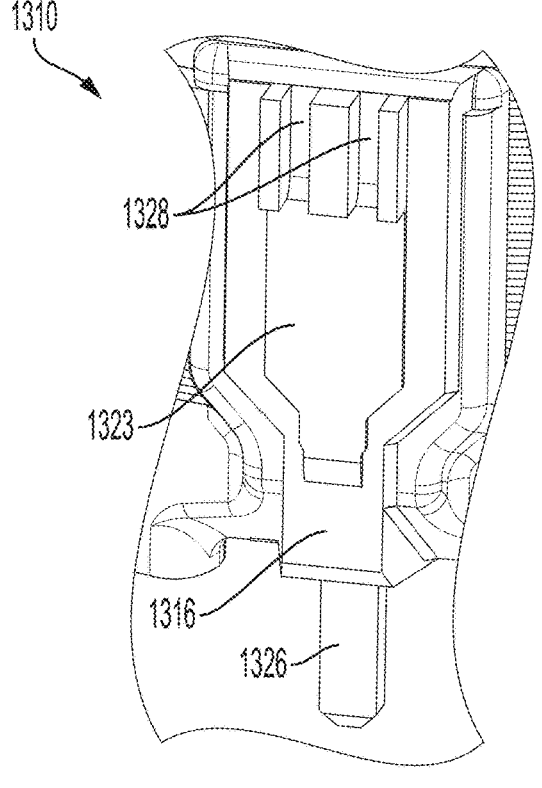

FIGS. 13A and 13B illustrate another embodiment of a motor 1300 like the motor 300 described above, with like features shown with like reference numerals plus "1000," unless explained differently below. FIGS. 13A and 13B illustrate a motor 1300 that includes a plurality of terminals 1310 that do not include a tang 1020 (e.g., a tang 1020 that would fold over a main portion 1023 of the terminal 1010 as shown in FIGS. 10A-10C). Instead, the terminals 1310 include two slots 1328 at a first end of a main portion 1323 of the terminal 1310 for connecting the motor windings. In some embodiments, the motor windings are pressed into the slots 1328 and then, for example, soldered or welded. The terminals 1310 includes two slots 1328 for receiving, for example, four passes of a motor winding. The illustrated motor 1300 includes the terminals arranged 120° apart from one another and mounted on individual and separate non-conductive mounts 1316 similar to the embodiments shown in FIGS. 9A-12B. As shown in FIGS. 13A and 13B, in some embodiments, the terminal 1310 may be mounted on the terminal mount 1316 such that a portion of the terminal 1310 (e.g., a power wire connecting portion 1326) protrudes through a hole in the terminal mount 1316.

Figure 14A:
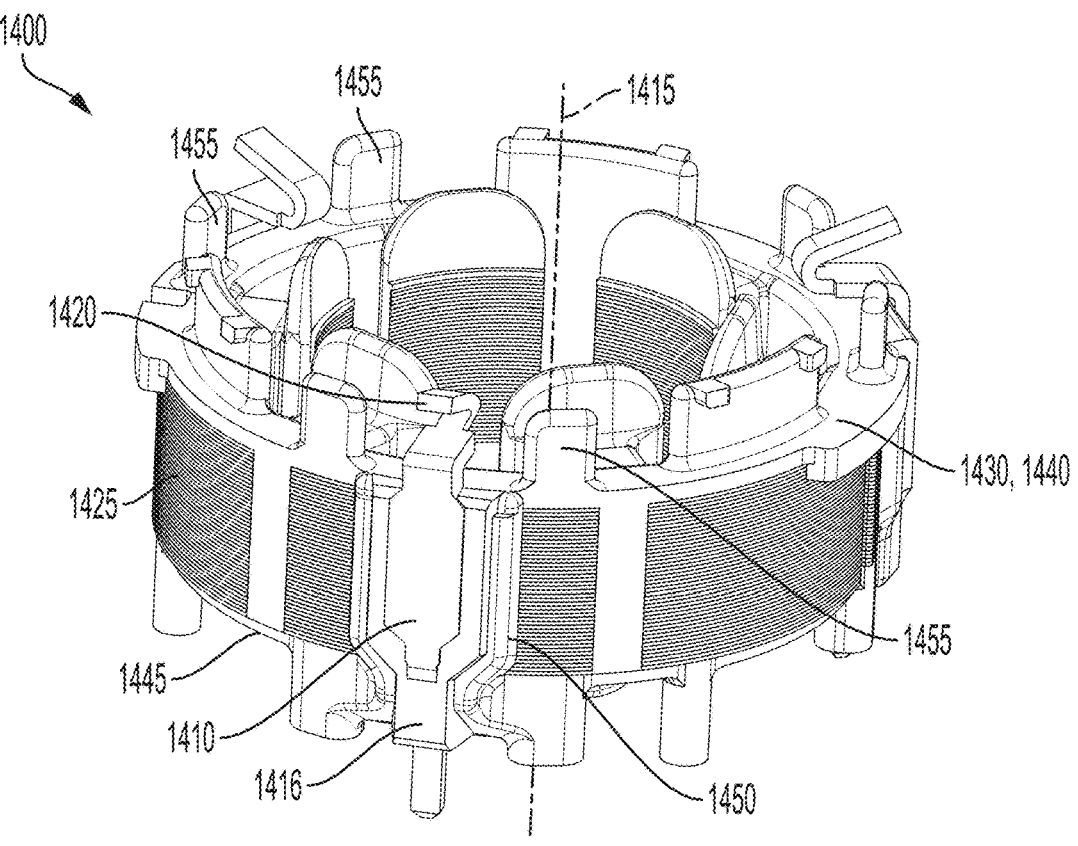
FIGS. 14A and 14B illustrate a motor stator according to embodiments described herein.
Figure 14B:
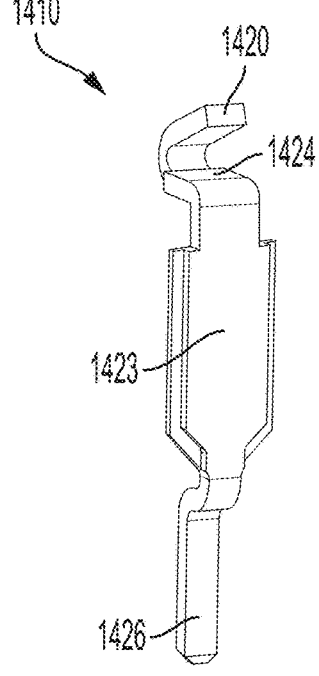

FIGS. 14A and 14B illustrate another embodiment of a motor 1400 like the motor 300 described above, with like features shown with like reference numerals plus "1100," unless explained differently below. FIGS. 14A and 14B illustrate a motor 1400 that includes a plurality of terminals 1410 that do not include a tang 320, 420 that would fold over a main portion 323, 423 of the terminal 310, 410 as shown in FIGS. 3A-4D. Instead, the terminals 1410 include a tang 1420 folded over a second portion 1424 that is approximately perpendicular to the longitudinal axis 1415 of the motor 1400). The terminals 1410 in FIGS. 14A-14B include three portions. A first portion 1423 is approximately parallel to the longitudinal axis 1415 of the motor 1400. A second portion 1424, approximately perpendicular to the first portion 1423, is bent in the radial direction of the longitudinal axis 1415 of the motor 1400. A third portion 1420 is a tang 1420. A motor winding wire can be wound around the tang 1420, and the tang 1420 can be folded over the second portion 1424 of the terminal 1410. The illustrated motor 1400 includes the terminals 1410 arranged 120° apart from one another and mounted on individual and separate non-conductive mounts 1416 similar to the embodiments shown in FIGS. 9A-13B. As shown in FIG. 14A, in some embodiments, the terminal 1410 may be mounted on the terminal mount 1416 such that a portion of the terminal 1410 (e.g., a power wire connecting portion 1426) protrudes through a hole in the terminal mount 1416.

Figure 15:
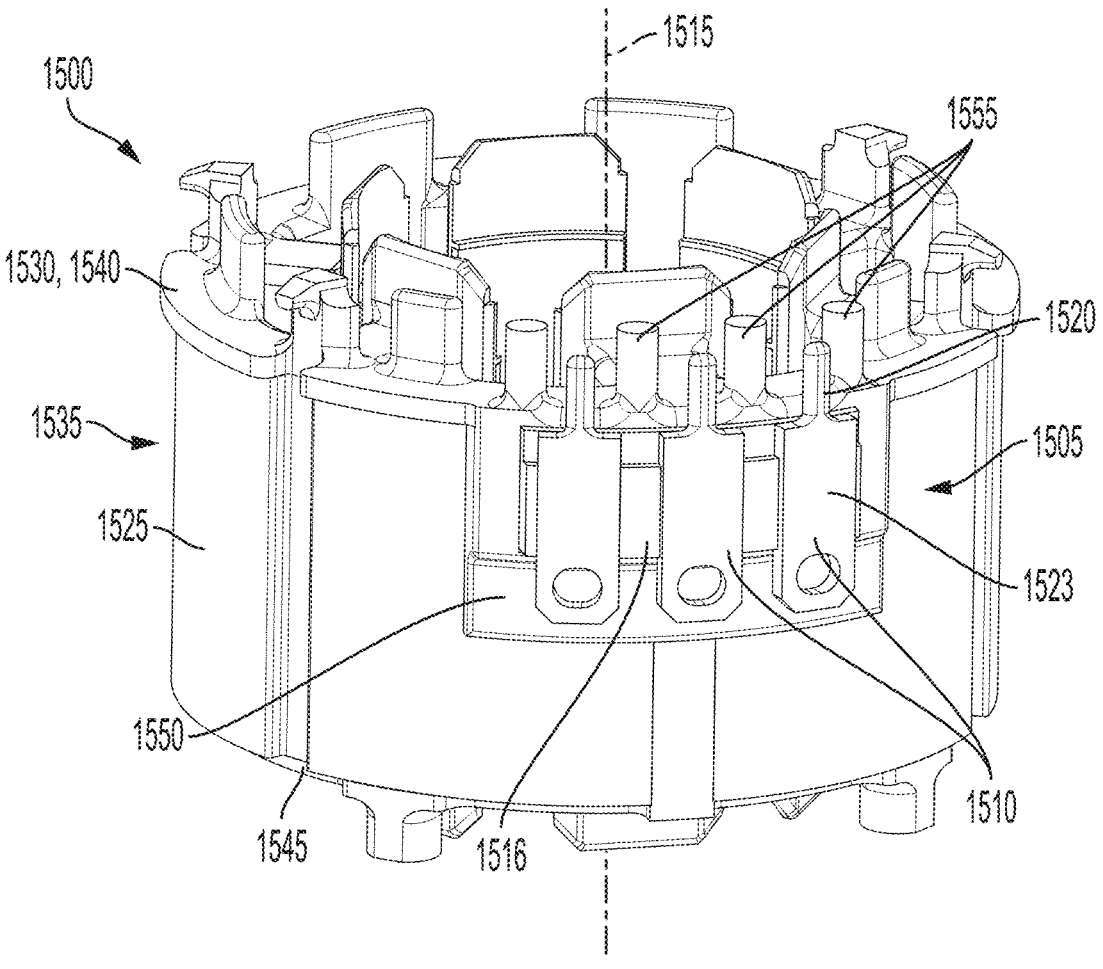
FIG. 15 illustrates a motor stator according to embodiments described herein.

FIG. 15 illustrates another embodiment of a motor 1500 like the motor 300 described above, with like features shown with like reference numerals plus "1200," unless explained differently below. FIG. 15 illustrates a motor 1500 that includes a terminal assembly 1505 including a plurality of terminals 1510 that do not include a tang 320, 420 as shown in FIGS. 3A-4D. Instead, the terminals 1510 include a terminal post 1520 extending from a first end of the terminal 1510 approximately parallel to the longitudinal axis 1515 of the motor 1500 and in the same plane as the main portion 1523 of the terminal 1510. The terminals 1510 in FIG. 15 include two portions. A main portion 1523 is approximately parallel to the longitudinal axis 1515 of the motor 1500. A second portion 1520 is the terminal post 1520. A motor winding wire can be wound around the terminal post 1520 and ultrasonically welded to the terminal post 1520, for example, using a sonotrode. A power wire can be soldered or otherwise connected to a second end of the main portion 1523 of the terminal 1510.

Figure 16:
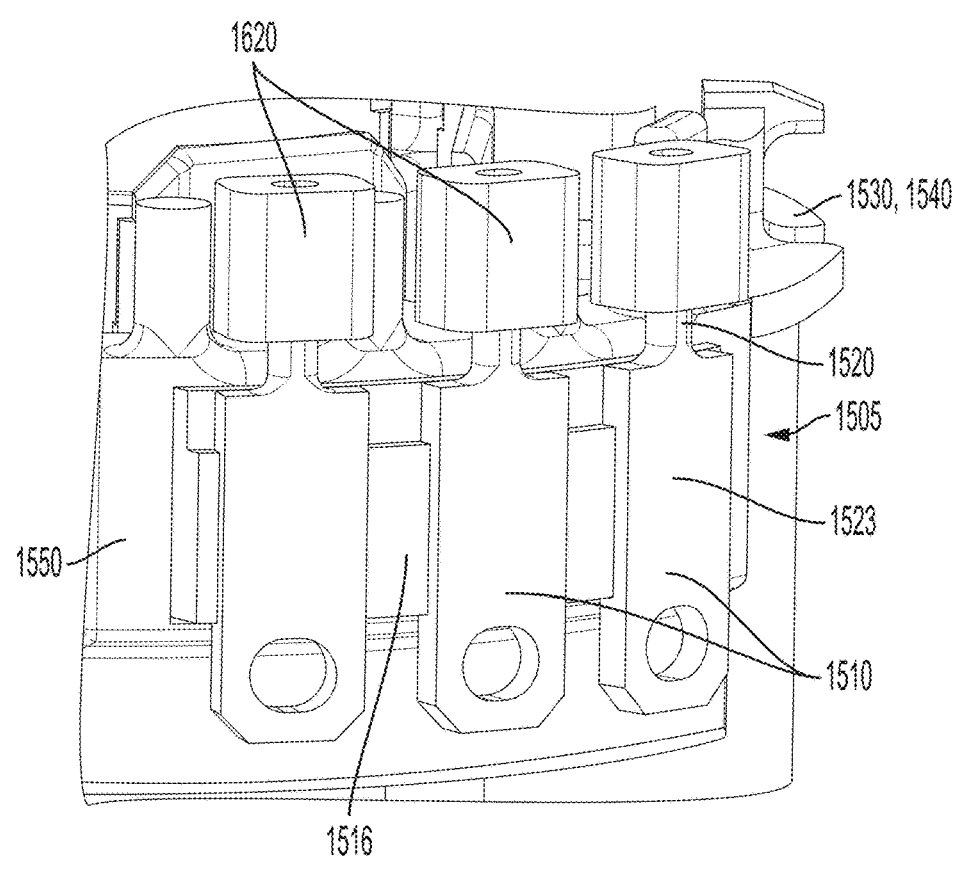
FIG. 16 illustrates a zoomed-in view of a terminal assembly of the motor stator of FIG. 15 according to one alternate embodiment.

FIG. 16 illustrates a zoomed-in view of the terminal assembly 1505 of the motor 1500 of FIG. 15 according to an alternate embodiment. Like features of the alternate embodiment of FIG. 16 are labeled with like reference numerals as FIG. 15. In FIG. 16, the terminal posts 1520 are fitted with pressed-on and fused terminal caps 1620 to connect the motor winding wire to the terminal posts 1520. For example, motor winding wires are fused to a top end of the terminal caps 1620 that is an end further from the main portion 1523 of the terminals 1510.

Figure 17:
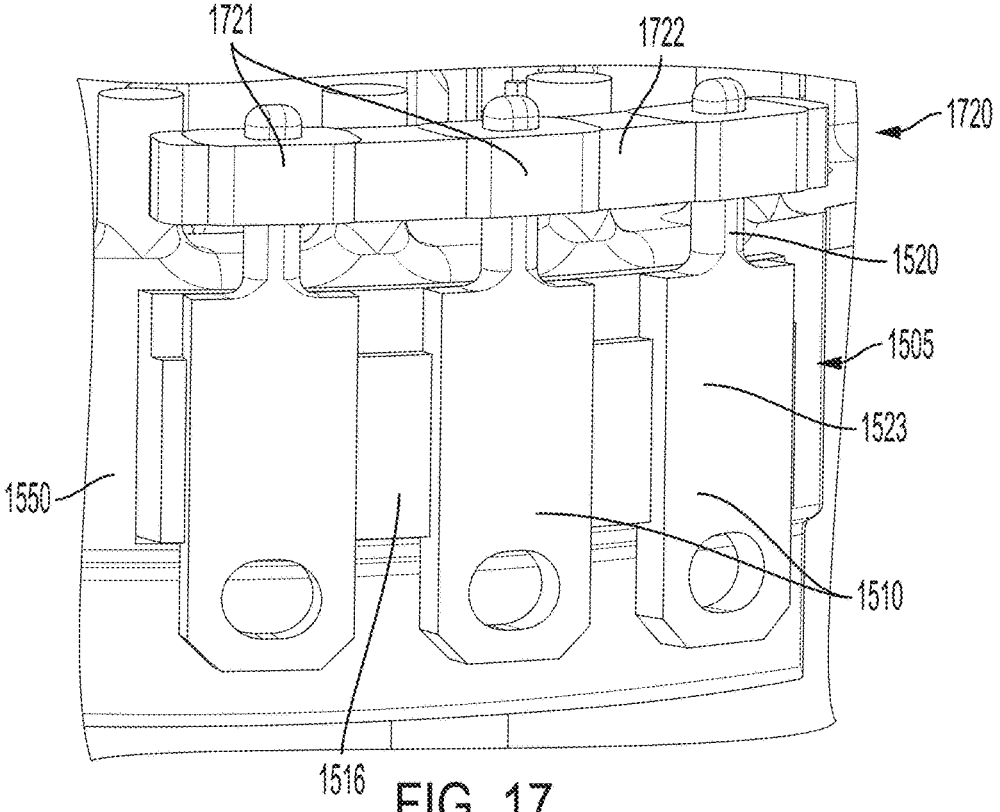
FIG. 17 illustrates a zoomed-in view of another terminal assembly of the motor stator of FIG. 15 according to another alternate embodiment.

FIG. 17 illustrates a zoomed-in view of the terminal assembly 1505 of the motor 1500 of FIG. 15 according to another alternate embodiment. Like features of the alternate embodiment of FIG. 17 are labeled with like reference numerals as FIG. 15. In FIG. 17, the terminal posts 1520 are fitted with a pressed-on and fused terminal block cap 1720 to connect the motor winding wire to the terminal posts 1520. For example, motor winding wires are fused to a top end of conductive portions 1721 of the terminal block cap 1720 that is an end further from the main portion 1523 of the terminals 1510. Insulating/non-conductive, phenolic portions 1722 of the terminal block cap 1720 may be located between the conductive portions 1721 and outside of the conductive portions 1721 as shown in FIG. 17. In some embodiments, the terminal posts 1520 may protrude through holes in the terminal block cap 1720 as shown in FIG. 17.

FIGS. 18-23 illustrate another embodiment of a stator assembly 1810 for a motor like the motors 300-1500 described above. As indicated previously herein, the electric motor may be used in various different tools, such as power tools (e.g., rotary hammers, pipe threaders, cutting tools, etc.), outdoor tools (e.g., trimmers, pole saws, blowers, etc.), and other electrical devices (e.g., motorized devices, etc.).

Figure 18:
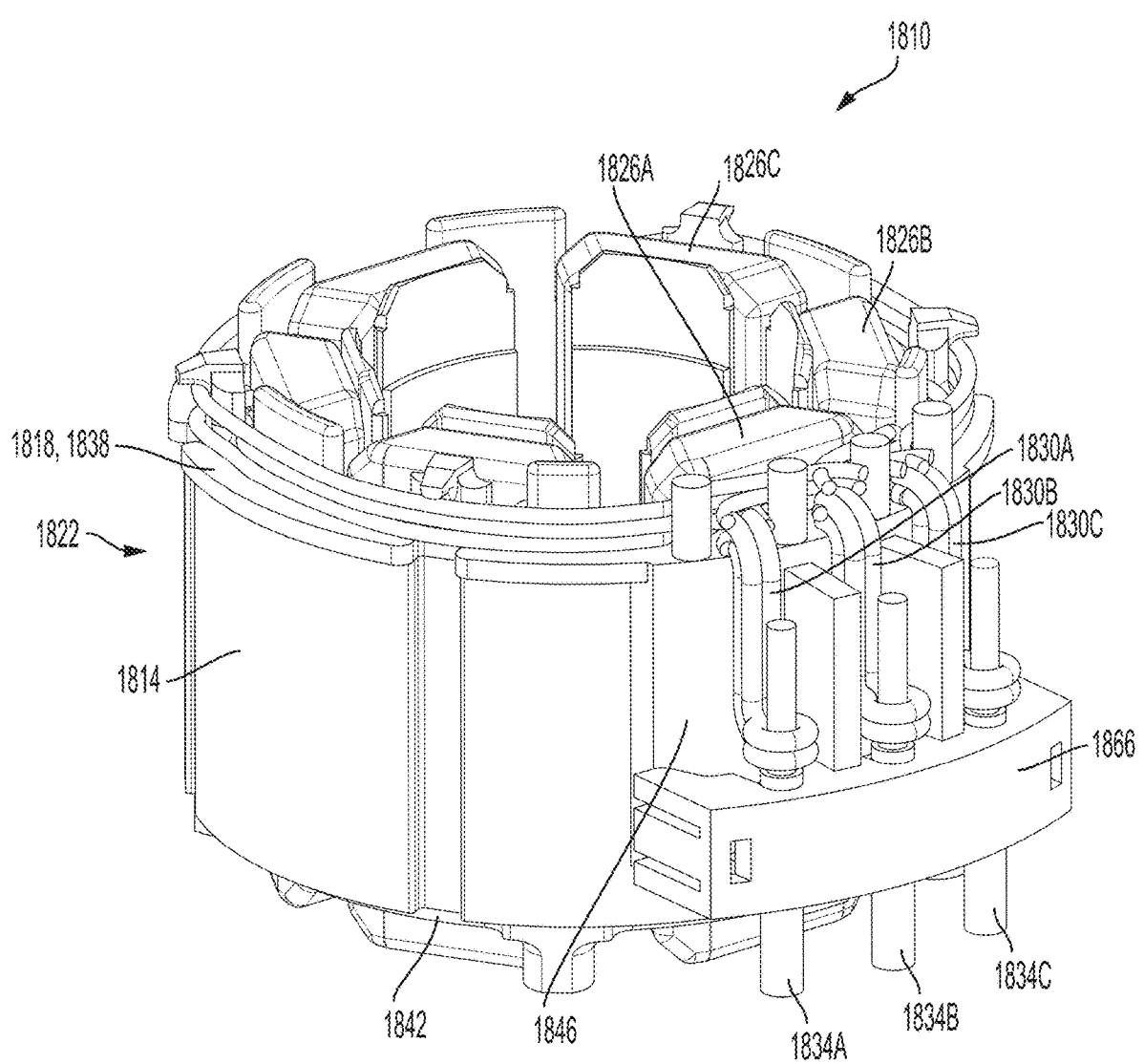
FIG. 18 is perspective view of a stator assembly according to one example embodiment.
Figure 19:
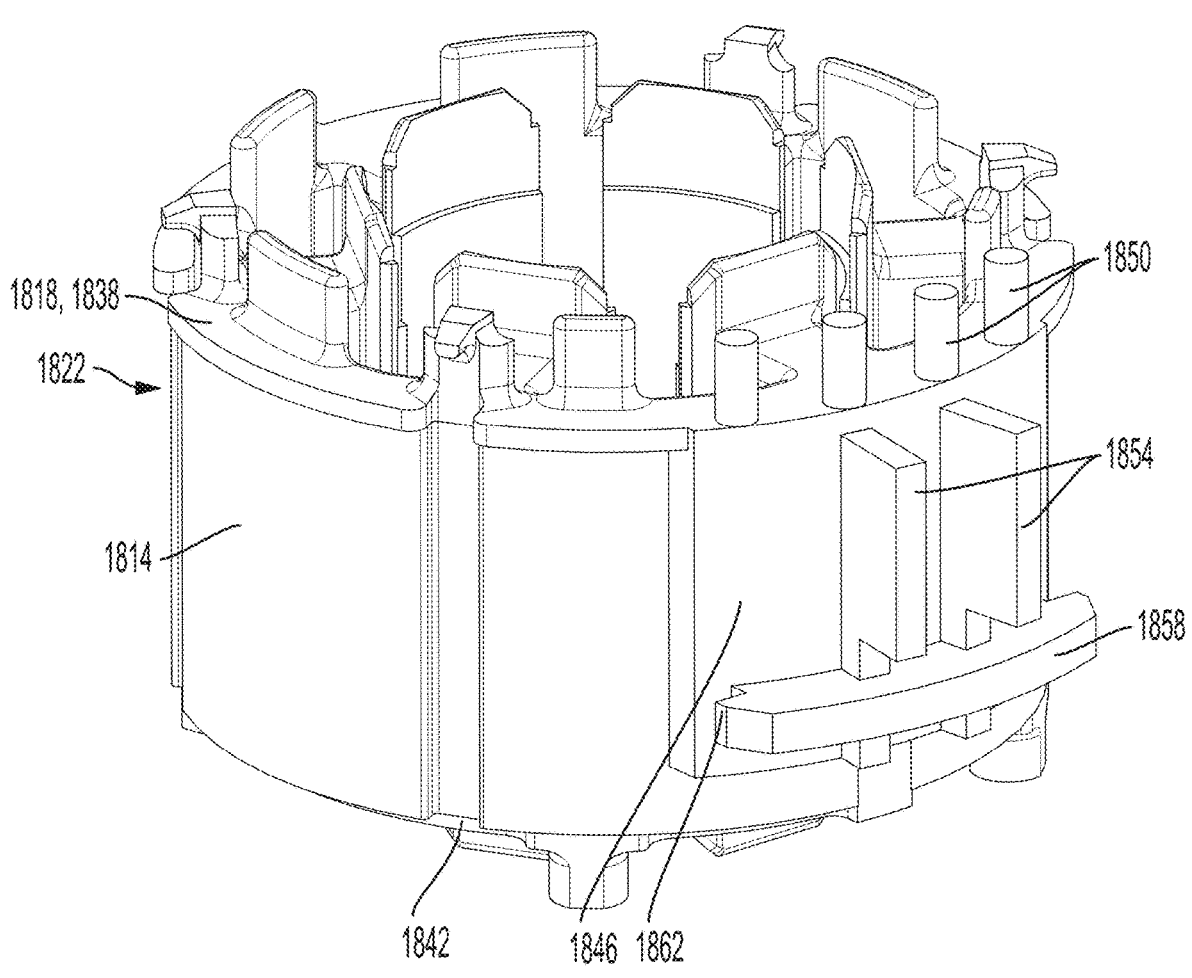
FIG. 19 is a perspective view of a molded stator body of the stator assembly of FIG. 18.

With reference to FIG. 18, the stator assembly 1810 includes a lamination stack 1814, a stator molding 1818 that is molded to the lamination stack 1814 to form a molded stator body 1822 (see FIG. 19). The stator assembly 1810 further includes stator windings 1826A, 1826B, 1826C that are energized to produce a magnetic field. The stator windings 1826A-1826C include wireloops 1830A, 1830B, 1830C (i.e., wire leads, stator winding leads) that are electrically connected to corresponding phase wires 1834A, 1834B, 1834C (i.e., power wires that provide power to the stator windings 1826A-1826C via the FETs 124). In other words, the phase wires 1834A-1834C are directly electrically connected to the stator windings 1826A-1826C. The stator windings 1826A-1826C are selectively energized by a motor controller 130, for example (see FIG. 2). In the illustrated embodiment, the stator windings 1826A-1826C are three phases. The three phases of the stator windings 1826A-1826C can be connected to each other in a delta, wye, or any other suitable configuration. As such, the stator assembly 1810 eliminates the need for a separate terminal block/assembly for the phase wire connection to the stator windings 1826A-1826C. This results in a lower overall cost, lower bill of materials count, and a simpler injection mold tooling.

With reference to FIGS. 18 and 19, the stator molding 1818 of the molded stator body 1822 includes a first axial end portion 1838, a second axial end portion 1842, and a connection portion 1846 extending axially along an outer circumferential surface of the lamination stack 1814. The connection portion 1846 is curved along the outer circumferential surface of the lamination stack 1814. In the illustrated embodiment, the connection portion 1846 extends at least partially between the first axial end portion 1838 and the second axial end portion 1842. The stator molding 1818 includes posts 1850 formed extending away from the first axial end portion 1838. The posts 1850 are wire routing features that aid in the process of winding the stator windings 1826A-1826C onto the molded stator body 1822.

With continued reference to FIG. 19, the stator molding 1818 includes spacers 1854 formed on the connection portion 1846. The spacers 1854 create separation between the wireloops 1830A-1830C and phase wires 1834A-1834C, and help guide and position wireloops 1830A-1830C. In some embodiments, the spacers 1854 create a separation distance between adjacent stator windings that is twice the size of the stator winding connections. In other embodiments, the spacers 1854 create a separation distance between adjacent stator winding connections that is four times the size of a stator winding connection. The stator molding 1818 also includes a wire trap 1858 to hold the phase wires 1834A-1834C in place and to act as a strain relief. The wire trap 1858 also includes snap-fit fingers 1862 on opposite ends thereof that are configured to interface with a separate clip 1866 (FIG. 23).

Figure 20:
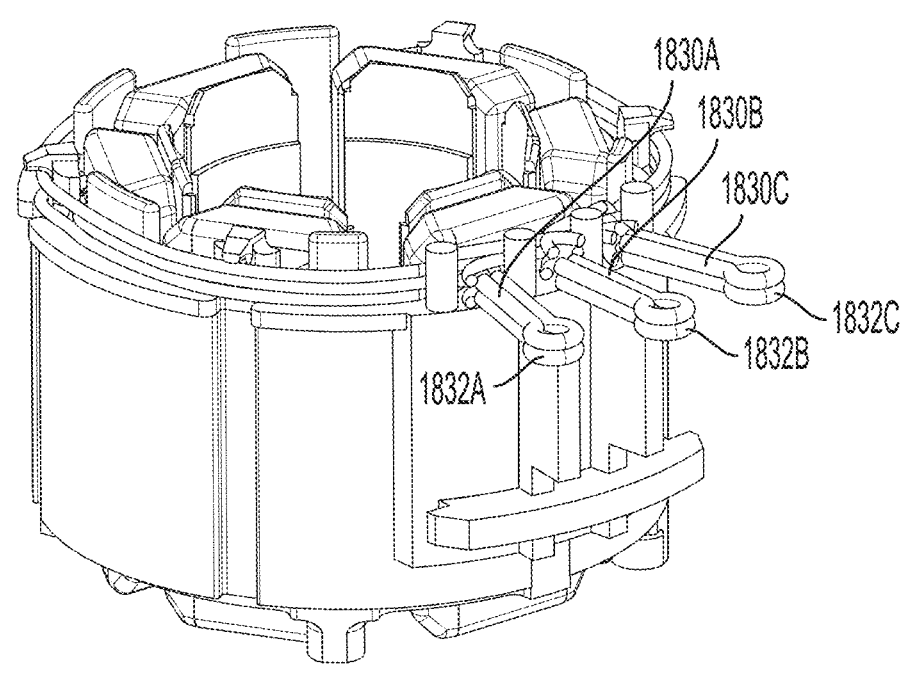
FIG. 20 is a perspective view of stator windings wound onto the molded stator body of FIG. 19.
Figure 21:
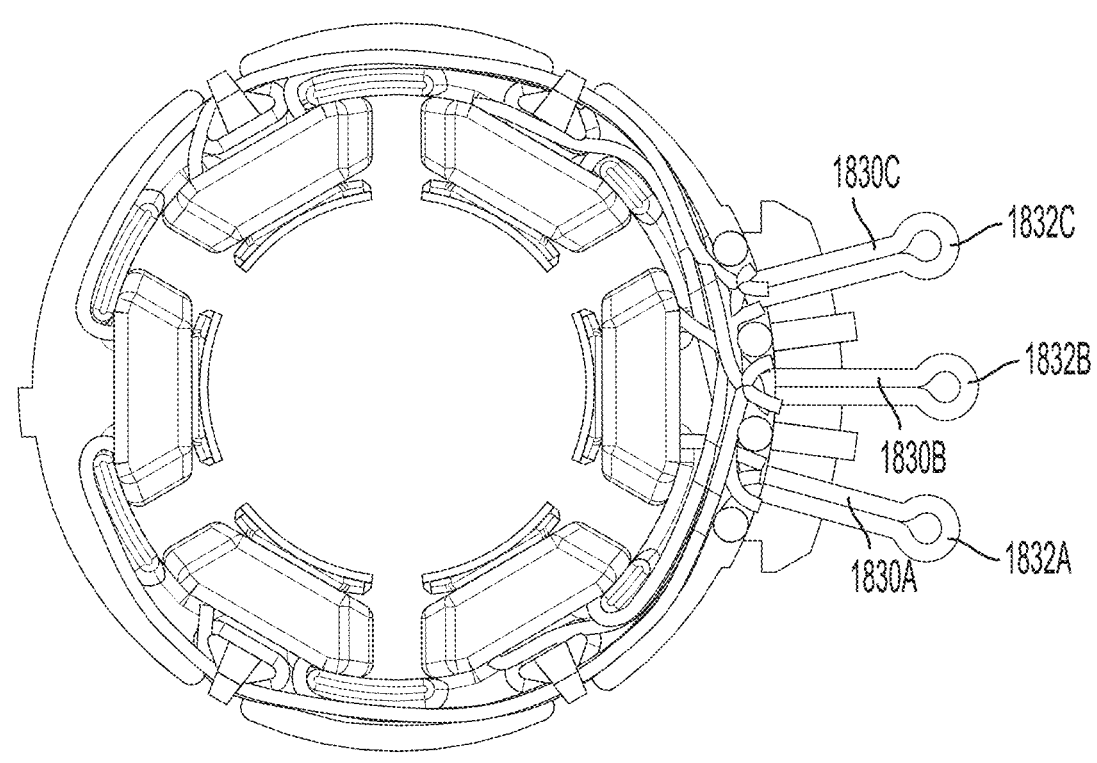
FIG. 21 is a top view of the stator windings of FIG. 20.

With reference to FIGS. 20-21, the stator windings 1826A-1826C are wound onto the molded stator body 1822 using a precision winder. During the winding process, the wireloops 1830A-1830C are formed as part of the stator windings 1826A-1826C. In some embodiments, the stator winding leads are routed to a feature (e.g., a post) on the winding machine fixture to create the wireloop 1830A-1830C. In the illustrated embodiment of FIG. 20, the wireloops 1830A-1830C include respective eyelets 1832A-1832C formed in the magnet wire that are configured to accept the phase wires 1834A-1834C. The diameter of the eyelets 1832A-1832C may vary depending on, for example, the diameter of the phase wires 1834A-1834C. At this point in the manufacturing process, the wireloops 1830A-1830C extend radially outward from the stator molding 1818. In-line wire stripping may remove the magnet wire coating at the wireloop 1830A-1830C in order to prepare the coil leads for later soldering steps. In alternative embodiments, an alternate wire enamel removal step is utilized. Specifically, if in-line magnet wire stripping is not capable of removing material on only the wireloops 1830A-1830C, after winding, a separate operation is completed to fuse or resistance weld the wireloops 1830A-1830C into the shape shown in FIG. 20. The fusing operation would burn-off the magnet wire enamel and bond the wires together into a connected unit at each phase wire connection point.

Figure 22:
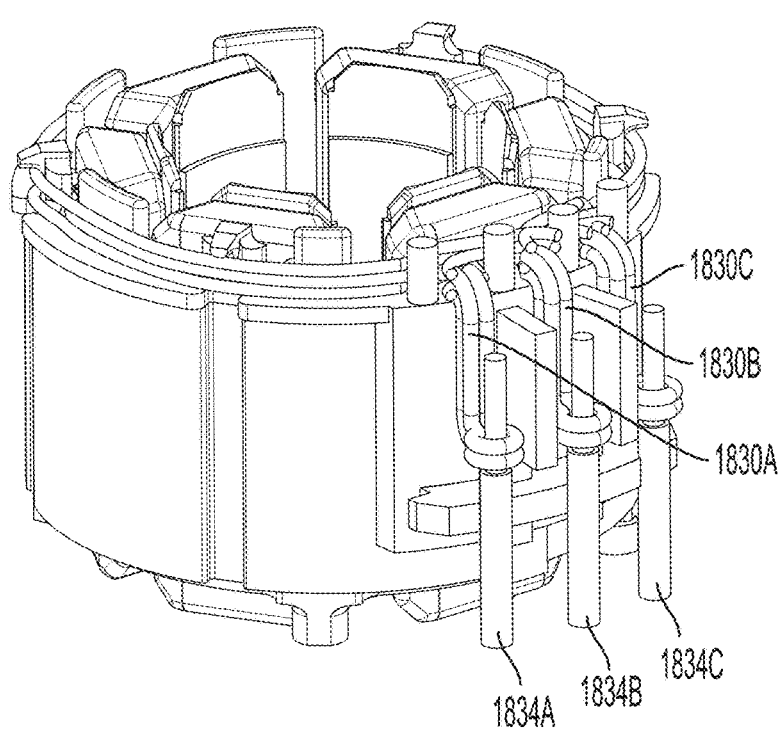
FIG. 22 is a perspective view of phase wires coupled to the stator windings of FIG. 20.

With reference to FIG. 22, the wireloops 1830A-1830C are then connected to the phase wires 1834A-1834C. The wireloops 1830A-1830C are bent into the position shown in FIG. 22, and the phase wires 1834A-1834C are inserted into the corresponding eyelets 1832A-1832C. The phase wires 1834A-1834C and the wireloops 1830A-1830C are then soldered together to establish a proper electrical connection.

Figure 23:
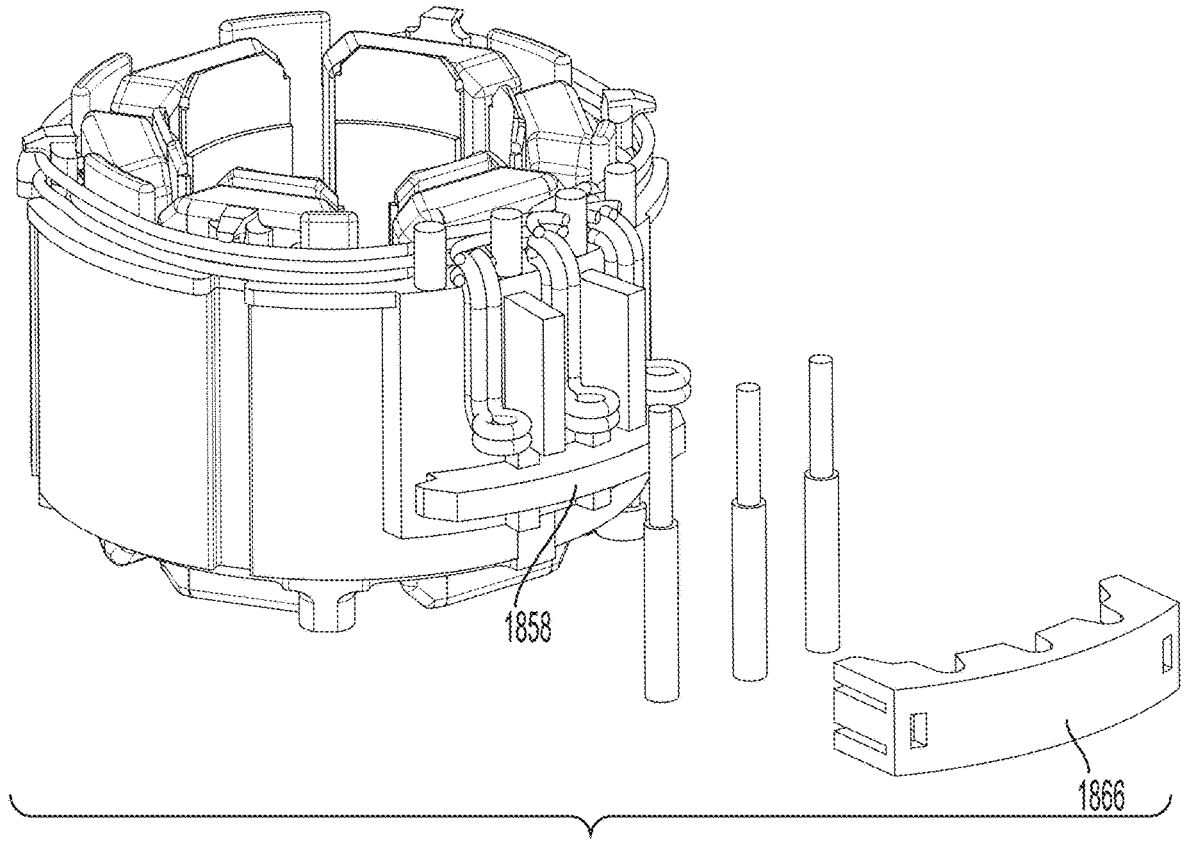
FIG. 23 is an exploded view of the stator assembly of FIG. 18.

With reference to FIG. 23, the phase wires 1834A-1834C are secured to the stator molding 1818 by the clip 1866. Specifically, the clip 1866 is attached to the wire trap 1858 via the fingers 1862 to form a snap-fit connection. The attached clip 1866 and wire trap 1858 cooperate to retain the phase wires 1834A-1834C in position and provide strain relief for the soldered connection between the wireloop 1830A-1830C and the phase wires 1834A-1834C. In some embodiments, the clip 1866 includes guides for the phase wires 1834A-1834C to guide the phase wire routing and position within the tool housing. In other embodiments, the clip 1866 is larger such that it is configured to support both the phase wires 1834A-1834C and the wireloops 1830A-1830C in one, single piece. For example, the clip 1866 could be sized to also partially enclose the eyelets 1832A-1832C.

Figure 24:
FIG. 24 is a flowchart depicting a method of manufacturing a stator assembly for an electric motor according to one embodiment.
Figure 24:
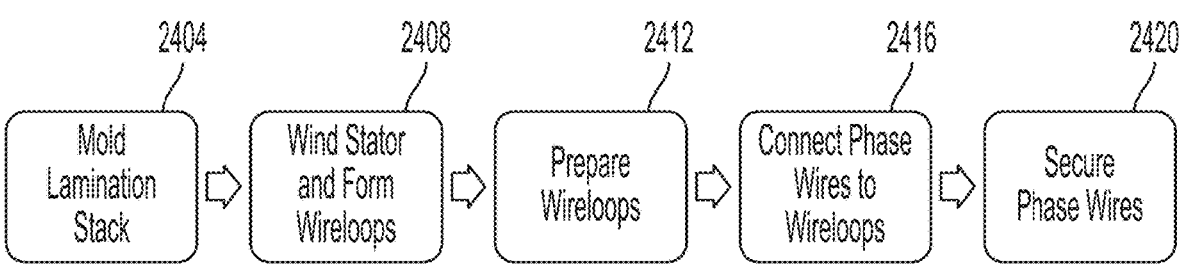

With reference to FIG. 24, a method 2400 of manufacturing a stator assembly 1810 for an electric motor according an embodiment is shown. In general, the illustrated method 2400 includes a step 2404 to create a molded stator body 1822 by molding the stator lamination stack 1814, a step 2408 to wind the stator windings 1826A-1826C onto the molded stator body 1822 and forming the wireloops 1830A-1830C, a step 2412 to prepare the wireloops 1830A-1830C for electrical connection to the phase wires 1834A-1834C. The step 2412 may include bending, fusing, stripping, the wireloops 1830A-1830C. The method 2400 also includes a step 2416 to connect the phase wires 1834A-1834C to the wireloops 1830A-1830C (i.e., create an electrical connection between the phase wires 1834A-1834C and the wireloops 1830A-1830C), and a step 2420 to secure the phase wires 1834A-1834C to the stator assembly 1810 with, for example, a clip 1866.

Figure 25:
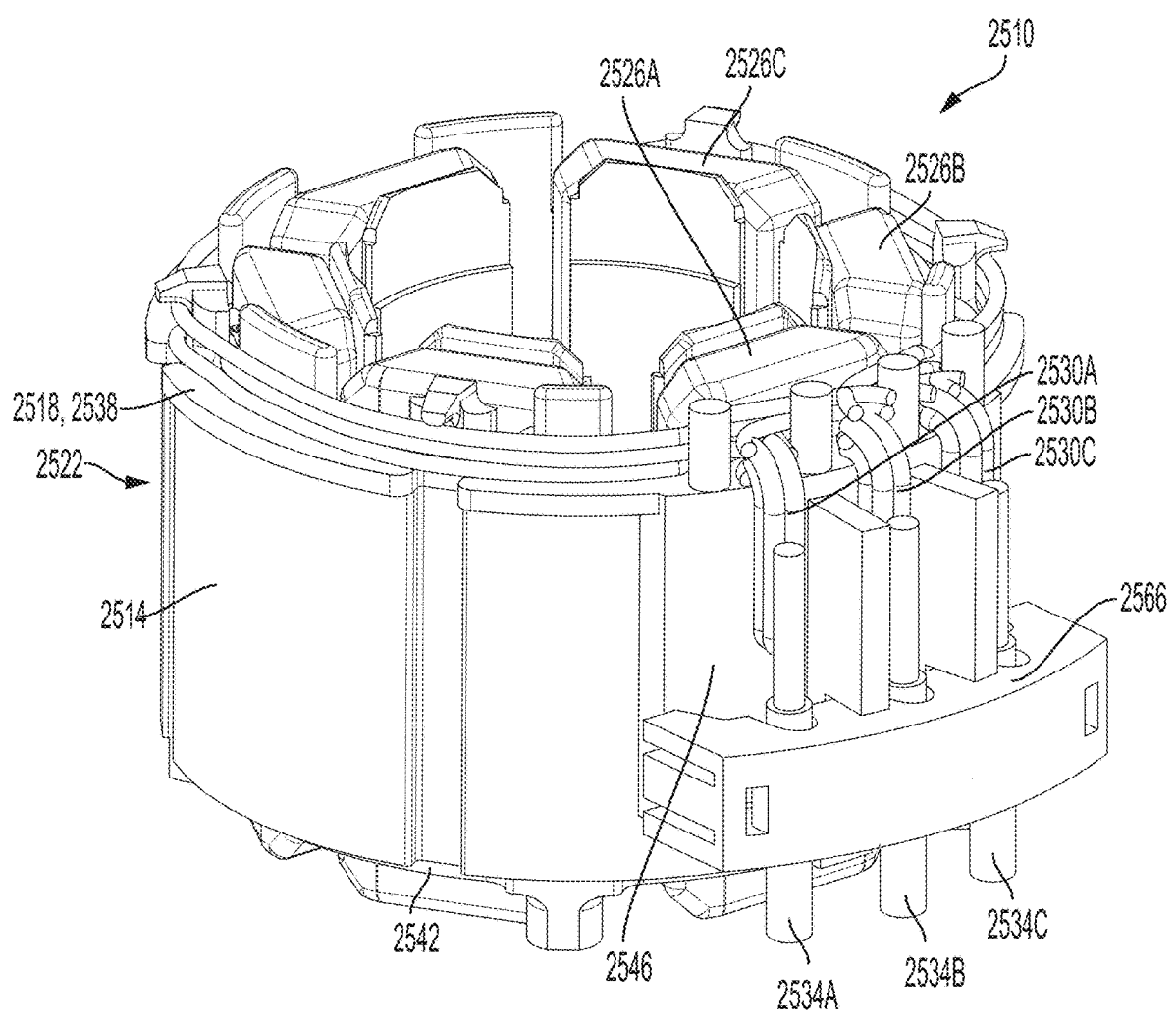
FIG. 25 is a perspective view of a stator assembly according to another example embodiment.
Figure 26:
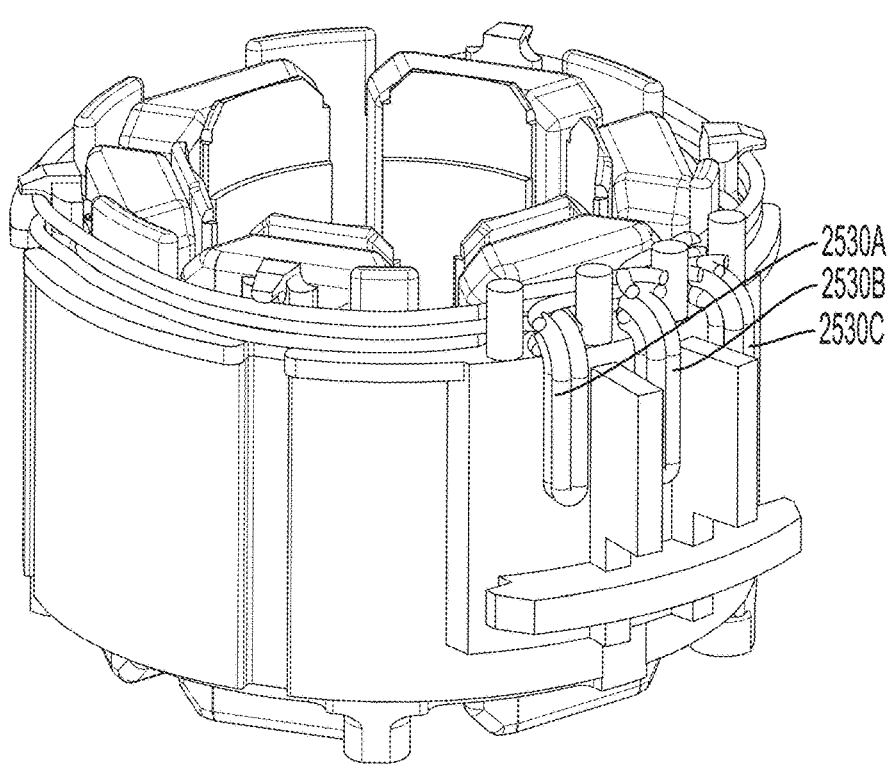
FIG. 26 is a perspective view of stator windings of the stator assembly of FIG. 25.
Figure 27:
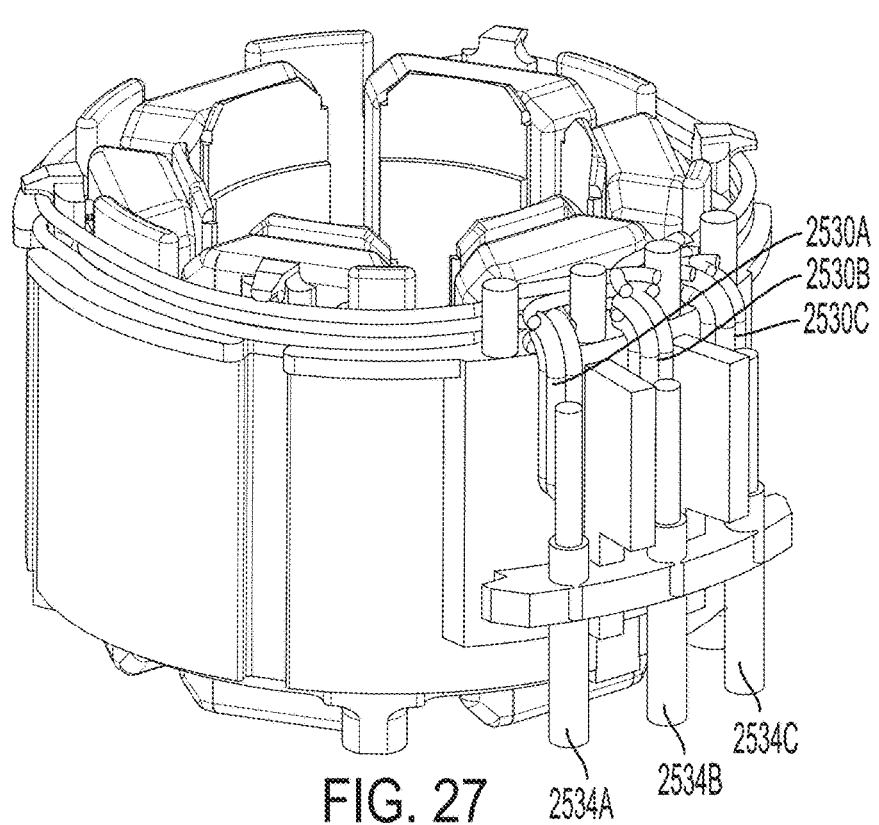
FIG. 27 is a perspective view of phase wires coupled to the stator windings of FIG. 26.

With reference to FIGS. 25-27, another embodiment of a stator assembly 2510 like the stator assembly 1810 described above is shown, with like features shown with like reference numerals plus "700," unless explained differently below. The wireloops 2530A, 2530B, 2530C of the stator assembly 2510 do not include eyelets 32A-32C, and the phase wires 2534A, 2534B, 2534C are soldered or fused directly to the wireloops 2530A-2530C. Such an arrangement may reduce the overall size of the stator assembly 2510.

With reference to FIG. 26, the wireloops 2530A-2530C are routed to a feature (e.g., post) (not shown) formed on the stator molding 2518 in order to form the initial wireloops 2530A-2530C (with or without eyelet). The feature may be formed of plastic and molded as part of the stator molding 2518 and then removed from the stator molding 2518 after the winding of the stator windings 2526A-2526C is complete. Multiple wraps of coil lead may be required to make a robust connection point and may also depend on the size of the magnet wire used. In some embodiments, a 1.3 mm diameter wire has a single wrap and in other embodiments a 0.5 mm diameter wire has two or three wraps to create the wireloops 2530A-2530C.

With reference to FIG. 27, the phase wires 2534A-2534C are directly soldered to the wireloops 2530A-2530C. A fusing or resistance welding process may also be used either before or after bending the wireloops 2530A-2530C into position. The stator assembly 2510 may include a clip 2566 that is large enough to secure the phase wires 2534A-2534C and the wireloops 2530A-2530C. In other embodiments, a second clip may be provided to support the phase wire and wireloop connections.

Figure 28:
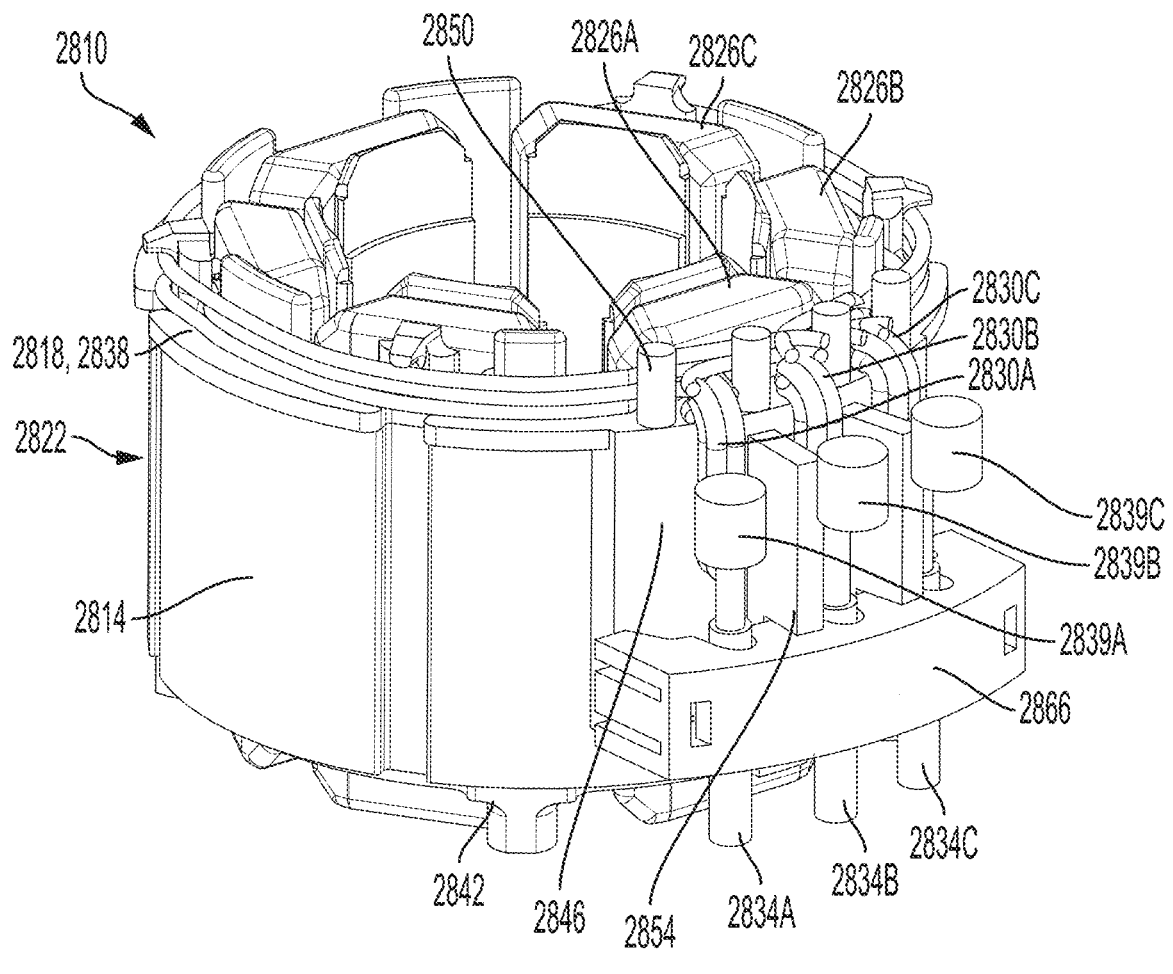
FIG. 28 is a perspective view of a stator assembly according to another example embodiment.

With reference to FIG. 28, another embodiment of a stator assembly 2810 like the stator assembly 1810 described above is shown, with like features shown with like reference numerals plus "1000," unless explained differently below. The stator assembly 2810 of FIG. 28 is similar to the stator assembly 2510 shown in FIGS. 25-27 except that the wireloops 2830A, 2830B, 2830C and the phase wires 2834A, 2834B, 2834C are secured to and electrically connected to each other using terminals 2839A, 2839B, 2839C (e.g., splice terminals such as 2D crimp AMPLIVAR™ splice terminals). FIG. 28 illustrates the terminals 2839A-2839C schematically. In some embodiments, the terminals 2839A-2839C are splice terminals configured to have an open side to receive a wireloop 2830A, 2830B, 2830C and a phase wire 2834A, 2834B, 2834C. Sides of terminals 2839A-2839C are then crimped together, for example, using a crimping tool, to secure and electrically connect the wireloop 2830A, 2830B, 2830C and the phase wire 2834A, 2834B, 2834C. In some embodiments, the terminals 2839A-2839C include a serrated interior surface with burrs (i.e., many shallow teeth), for example, to better secure the wireloop 2830A, 2830B, 2830C and the phase wire 2834A, 2834B, 2834C and/or to pierce insulation included on the phase wire 2834A, 2834B, 2834C.

In some embodiments, the clip 2866 is a snap-fit clip that includes guides for securing the phase wires 2834A, 2834B, 2834C and providing strain relief for the phase wires 2834A, 2834B, 2834C. In some embodiments, the clip 2866 is larger than the clip 2866 show in FIG. 28 and may support and/or accommodate both the phase wires 2834A, 2834B, 2834C and the wireloops 2830A, 2830B, 2830C on the outer peripheral surface of the stator assembly 2810. In other embodiments, a second clip may be provided to support wireloops 2830A, 2830B, 2830C. In some embodiments, the larger clip described above or the second clip described above (i.e., a clip that supports and/or accommodates the phase wire and wireloop connections) may serve as a potting boat to be filled with epoxy for ingress protection and vibration isolation and support.

Figure 29A:
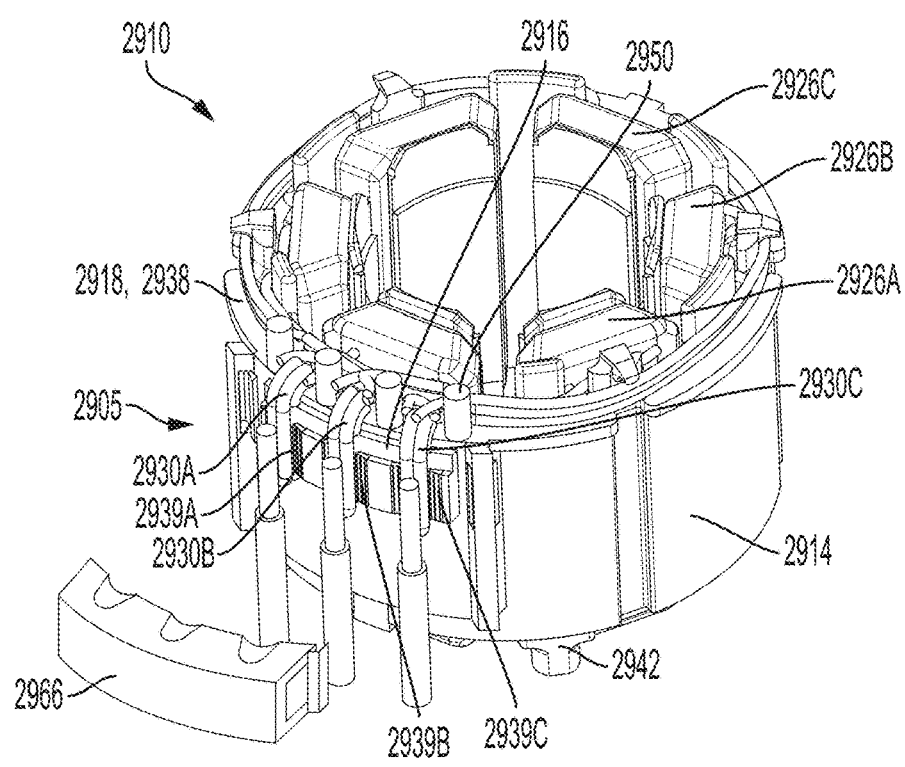
FIGS. 29A, 29B, and 29C are perspective views of a stator assembly according to yet other example embodiments.
Figure 29B:
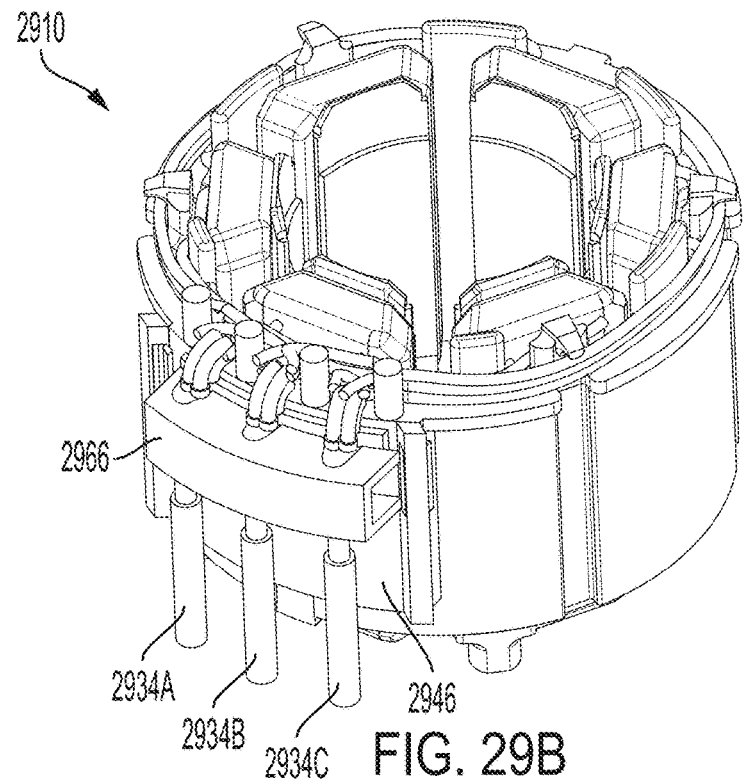

With reference to FIGS. 29A-29B, another embodiment of a stator assembly 2910 like the stator assembly 2810 described above is shown, with like features shown with like reference numerals plus "100," unless explained differently below. The stator assembly 2910 of FIG. 29 is similar to the stator assembly 2810 shown in FIG. 28 except that the wireloops 2830A, 2830B, 2830C and the phase wires 2834A, 2834B, 2834C are secured to and electrically connected to each other using serrated terminals 2939A, 2939B, 2939C mounted on a terminal mount 2916 of a terminal assembly 2905 on the outer peripheral surface of the stator assembly 2910. In some embodiments, the terminals 2939A-2939C include a serrated surface with burrs (e.g., many shallow teeth), for example, to better secure the wireloop 2930A, 2930B, 2930C and the phase wire 2934A, 2934B, 2934C to each other and/or to pierce insulation included on the phase wire 2934A, 2934B, 2934C. FIG. 29A illustrates the stator assembly 2910 with a clip 2966 removed while FIG. 28B illustrates the stator assembly 2810 with the clip 2966 secured to the stator assembly 2910. In some embodiments, the wireloops 2930A, 2930B, 2930C and the phase wire 2934A, 2934B, 2934C may be additionally or alternatively soldered together, fused together, or the like.

Figure 29C:
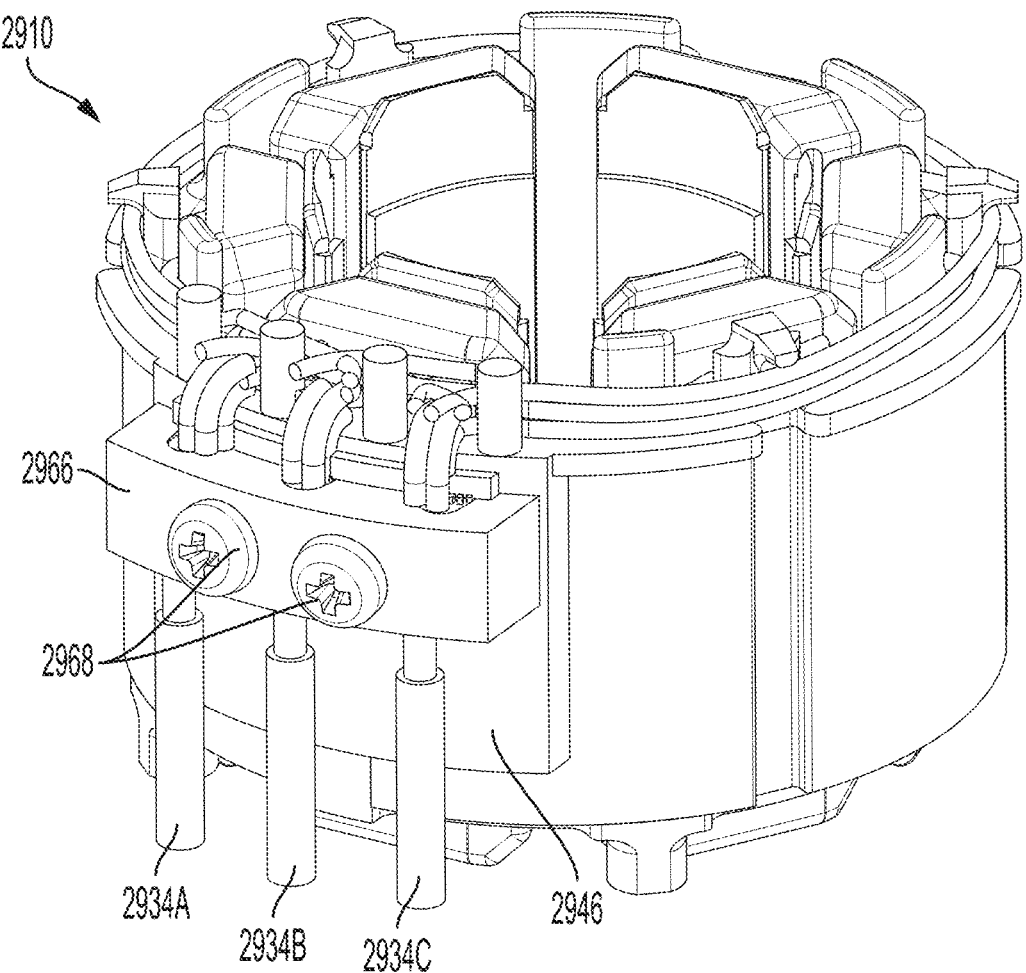

As illustrated in FIGS. 29A-29B, in some embodiments, the stator assembly 2910 may not include the spacers 2854 on the connection portion 2846 of FIG. 28. Additionally, FIGS. 29A-29B illustrate a different clip 2966 than the clip 2866 of FIG. 28. The clip 2966 may be the second clip described above with respect to FIG. 28 that supports and/or accommodates the phase wire and wireloop connections rather than supporting and/or accommodating the phase wires 2834A, 2834B, 2834C as shown in FIG. 28. As shown in FIG. 29C, in some embodiments, the clip 266 is secured to the stator assembly 2910 using one or more fasteners 2968 such as screws. In some embodiments, both clips 2866 and 2966 may be used on any of the stator assemblies disclosed herein. Along similar lines, in some embodiments, a stator assembly may include a larger clip that provides the combined functionality of each of the clips 2866 and 2966.

Figure 30A:
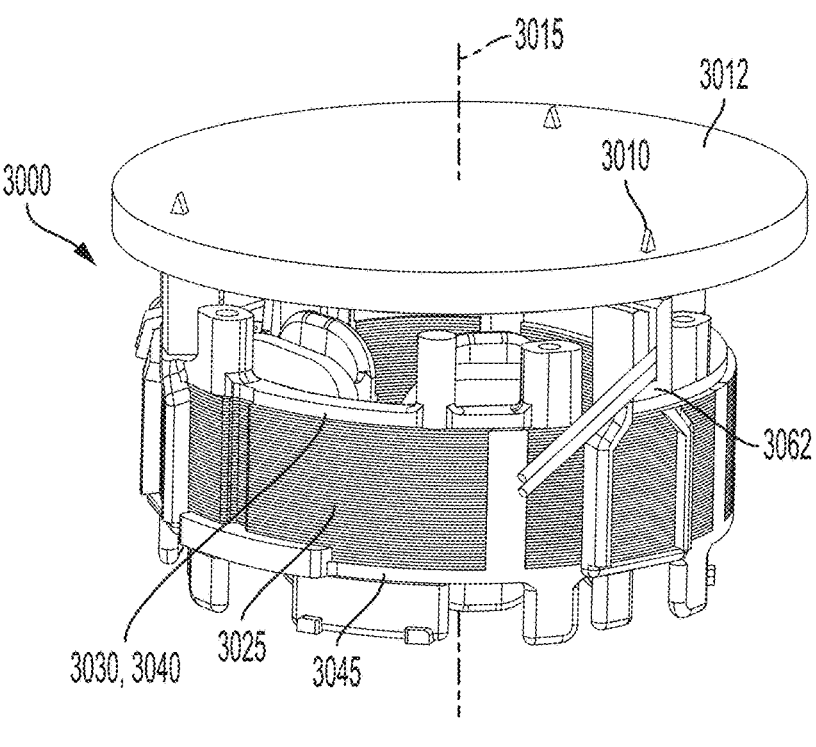
FIGS. 30A and 30B illustrate a motor stator according to embodiments described herein.
Figure 30B:
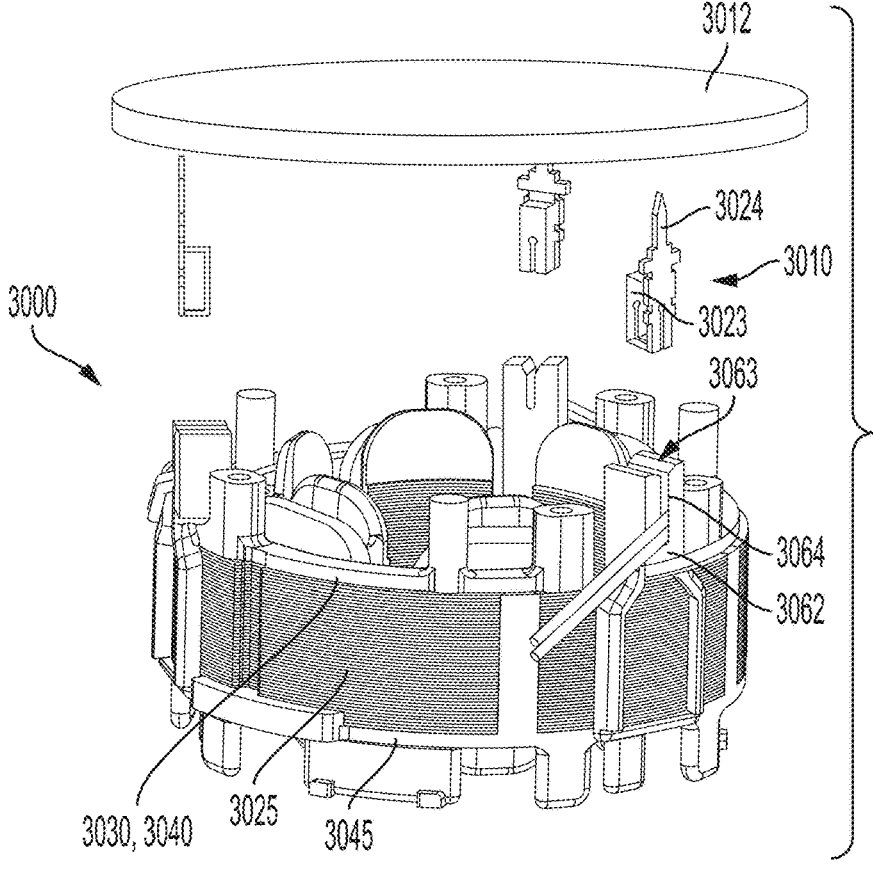

FIGS. 30A and 30B illustrate another embodiment of a motor 3000 like the motor 300 described above, with like features shown with like reference numerals plus "2700," unless explained differently below. FIGS. 30A and 30B illustrate a motor 3000 that includes a plurality (e.g., three) of terminals 3010 (e.g., insulation displacement crimp (IDC) terminals such as MAG-MATE™ IDC terminals). The terminals 3010 may provide an electrical connection between the stator windings 3026A-3026C and a printed circuit board (PCB) 3012. The terminals 3010 are positioned at an insulating member/first axial end portion 3040 at an end of the motor 3000 (i.e., not over the outer circumferential surface of the stator lamination stack 3025).

As shown in FIGS. 30A and 30B, the insulating member/first axial end portion 3040 may include protrusions 3062 that protrude approximately parallel to a motor axis 3015 away from the lamination stack 3025. Each protrusion 3062 may include a hole 3063 and/or one or more slots 3064 configured to receive the terminal 3010 and stator windings 3026A-3026C (see exploded perspective view of FIG. 30B). A first portion 3023 of the terminals 3010 may be configured to receive the stator windings 3026A-3026C and may be configured to be crimped to electrically and physically connect the first portion 3023 of the terminal 3010 to the stator windings 3026A-3026C. A second portion 3024 of the terminals 3010 may be configured to be inserted into a through-hole in the PCB 3012 and may be configured to be soldered to the PCB 3012 to provide an electrical and physical connection between the terminals 3010 and the PCB 3012.

Although the PCB 3012 is shown as being a complete circle in FIGS. 30A and 30B, in some embodiments, the PCB 3012 includes a through-hole in its center, for example, to allow a shaft of the motor to pass into or through a plane defined by a surface of the PCB 3012. In some embodiments, the PCB 3012 is not circular and may be a different shape, and may or may not include a through-hole in its center. In some embodiments, the PCB 3012 includes the Hall sensors 128, the FETs 124, and/or the motor controller 130 described previously herein with respect to FIG. 2. In some embodiments, the FETs 124 and/or the motor controller 130 may be located on other PCBs within the power tool 100 (e.g., within the handle 104 and/or in a foot of the power tool 100 near the battery pack interface 114). When the motor 3000 is placed inside the motor housing portion 106 of the power tool 100, the PCB 3012 may be located on a front side of the motor 3000 (i.e., between the motor 3000 and the output unit 107) or the PCB 3012 may be located on a rear side of the motor 3000 such that the motor 3000 is between the output unit 107 and the PCB 3012.

Figure 31A:
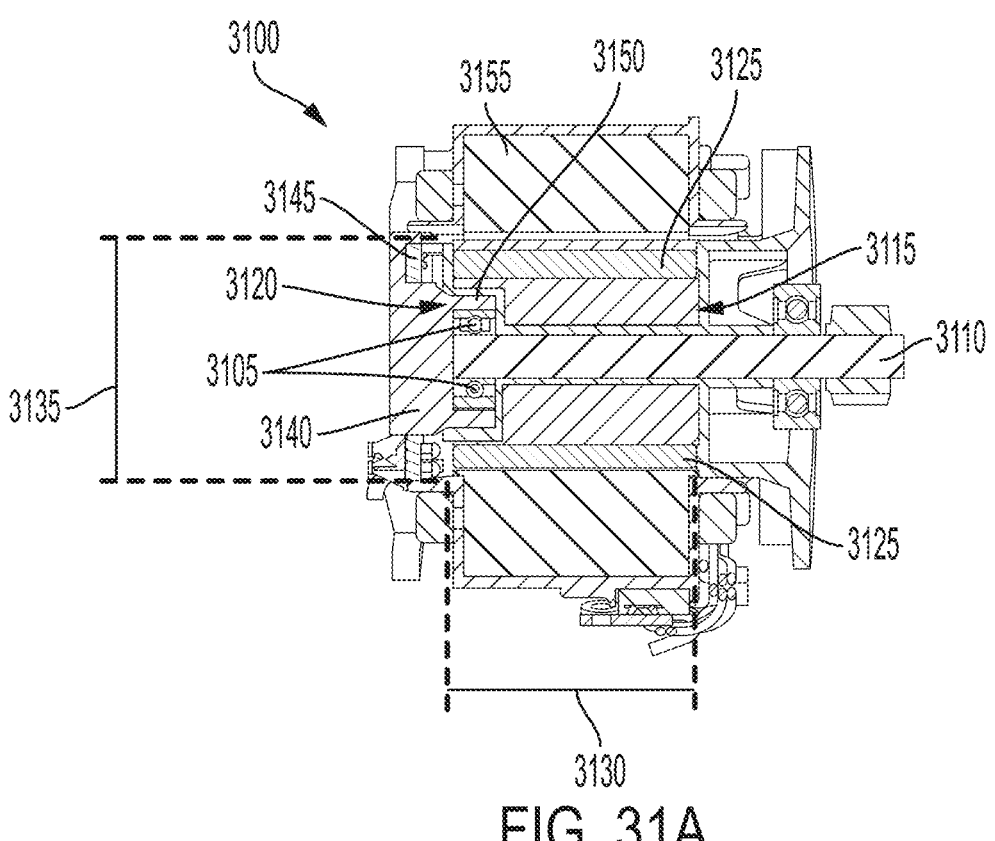
FIGS. 31A and 31B illustrate a motor according to embodiments described herein.
Figure 31B:
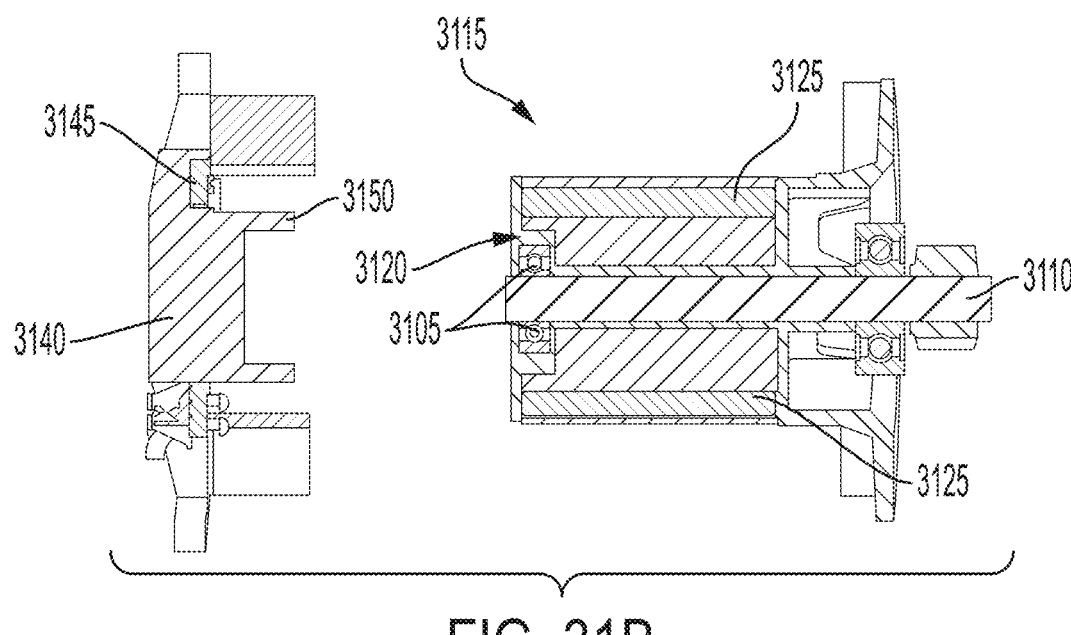

FIGS. 31A and 31B illustrate a motor 3100 that includes a recessed bearing 3105 with a rotor inner diameter press. A rotor shaft 3110 is molded or pressed into a rotor stack 3115. The recessed bearing 3105 is pressed onto the shaft 3110 into a pocket 3120 inside of the rotor stack 3115. As a result, the recessed bearing 3105 is within the length of rotor magnets 3125 (i.e., within the length of a rotor envelope 3130), which saves space within a power tool housing and may allow the power tool 100 to be more compact than power tools with motors that do not include a recessed bearing 3105. In some embodiments, the pocket 3120 that receives the recessed bearing 3105 fits within a diameter 3135 of the rotor magnets 3125. A Hall board bearing retainer cap 3140 reaches into the bearing pocket 3120 and onto the recessed bearing 3105 using, for example, a slipfit. For example, the slipfit may include a protruding portion 3150 (e.g., a protruding ring or portion of a protruding ring) that is configured to slipfit between an outer surface of the recessed bearing 3105 and an inner surface of the pocket 3120. In some embodiments, a Hall board 3145 secured to or integrated within the retainer cap 3140 is a doughnut-shaped PCB that may have similar characteristics as the PCB 3012 and its alternate designs as described above with respect to FIGS. 30A and 30B. FIG. 31B illustrates an exploded side cut-away view of the motor 3100 with the retainer cap 3140 removed from the motor 3100 and with a stator assembly 3155 of FIG. 31A removed.

Figure 32A:
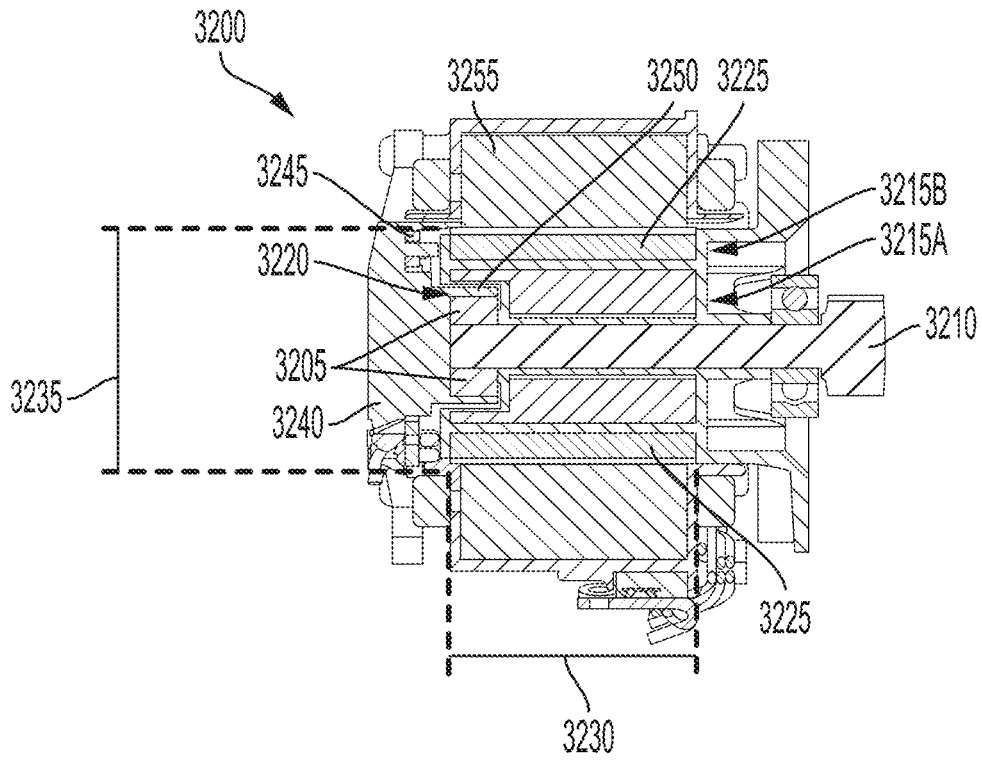
FIGS. 32A and 32B illustrate a motor according to embodiments described herein.
Figure 32B:
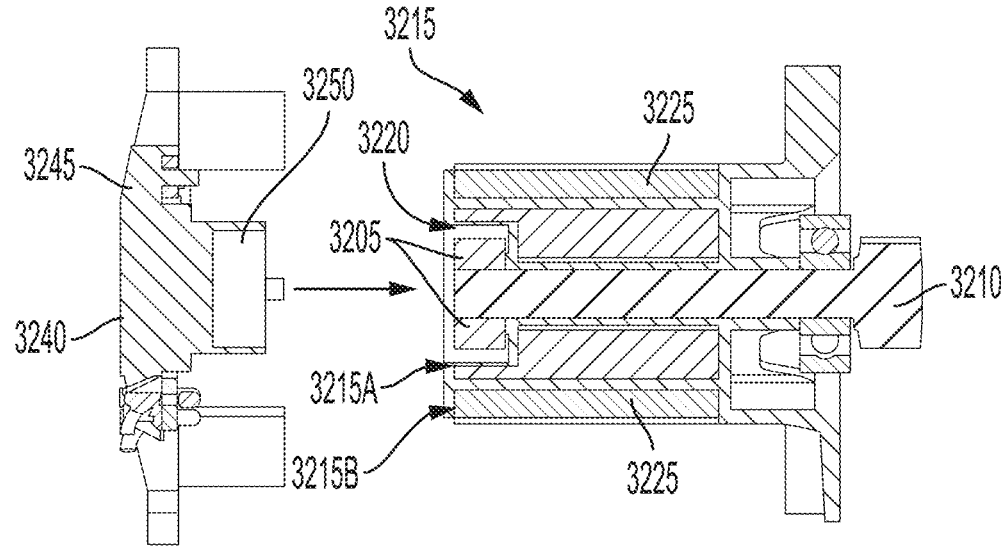

FIGS. 32A and 32B illustrate another embodiment of a motor 3200 like the motor 3100 described above, with like features shown with like reference numerals plus "100," unless explained differently below. FIGS. 32A and 32B illustrate a motor 3200 that includes a recessed bearing 3205 with a rotor inner diameter press (e.g., similar to the motor 3100 of FIGS. 31A and 31B). Compared to the motor 3100 that includes a single rotor lamination 3115, the motor 3200 includes two different notched laminations 3215A and 3215B (e.g., an inner lamination 3215A and an outer lamination 3215B) that are molded and pressed together to create a recessed bearing rotor lamination stack 3215. In some embodiments, a heat stake is soldered down prior to assembling the motor. In some embodiments, clearance room for a Hall board mount (e.g., 0.5 mm) is provided inside the rotor pocket 3220. Similar to the motor 3100 of FIGS. 31A and 31B, the recessed bearing 3205 is within the length of the rotor magnets 3125 or rotor envelope 3130, which saves space within a power tool housing and may allow the power tool 100 to be more compact than power tools with motors that do not include a recessed bearing 3205.

Figures 33A, 33B:
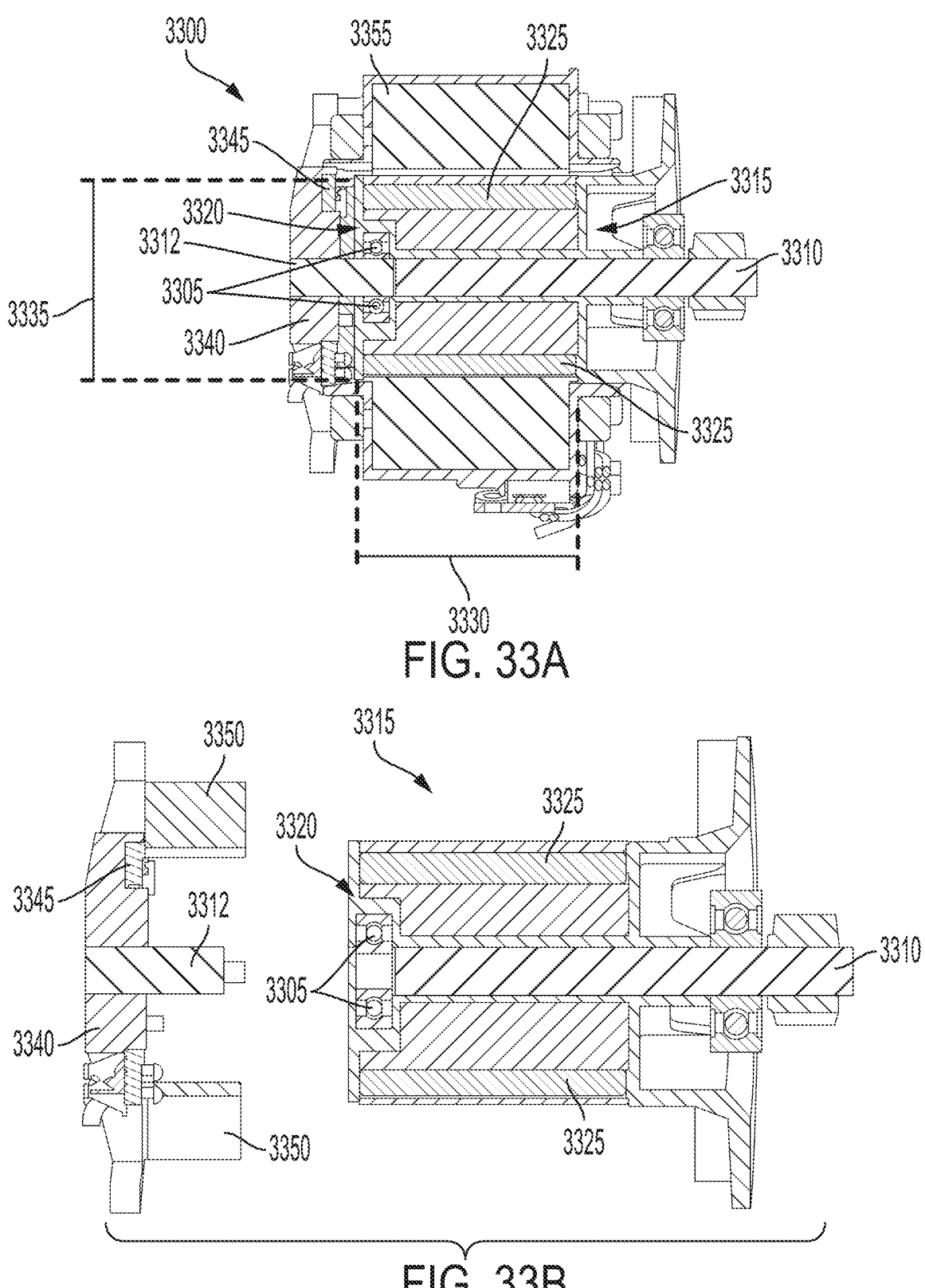
FIGS. 33A and 33B illustrate a motor according to embodiments described herein.

FIGS. 33A and 33B illustrate another embodiment of a motor 3300 like the motor 3100 described above, with like features shown with like reference numerals plus "200," unless explained differently below. FIGS. 33A and 33B illustrate a motor 3200 that includes a recessed bearing 3305 with a rotor outer diameter press as opposed to the rotor inner diameter press of the motor 3100 of FIGS. 31A and 31B. The rotor shaft 3310 is molded or pressed into the rotor stack 3315, but, unlike the rotor shaft 3110 of FIGS. 31A and 31B, the rotor shaft 3310 does not protrude completely through the rotor stack 3315. Recessed bearing 3305 is molded into the opposite of the pinion end of the rotor stack 3315. A second shaft 3312 is pressed into a Hall board cap 3340 and is configured to pilot into the injection molded bearing 3305 in the rotor 3315. Similar to the bearing 3105, 3205 of FIGS. 31A-32B, the recessed bearing 3305 is within the length of the rotor magnets 3325 or rotor envelope 3330, which saves space within a power tool housing and may allow the power tool 100 to be more compact than power tools with motors that do not include a recessed bearing 3305.

The Hall board cap 3340 reaches into or around the outer surface of the rotor stack 3315 using, for example, a slipfit. For example, the slipfit may include a protruding portion 3350 (e.g., a protruding ring or portions of a protruding ring) that is configured to slipfit between an outer surface of the rotor stack 3315 an inner surface of the stator 3355. FIG. 33B illustrates an exploded side cut-away view of the motor 3300 with the Hall board cap 3340 removed from the motor 3300 and with a stator assembly 3355 of FIG. 33A removed.

Figure 34A:
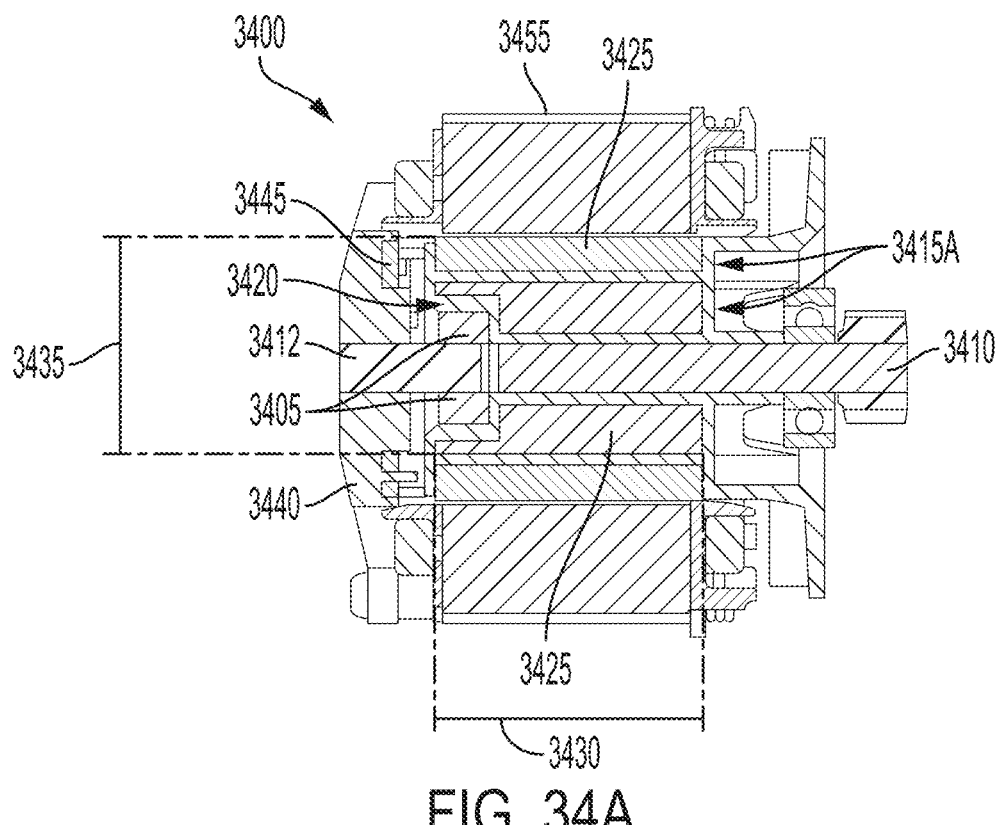
FIGS. 34A and 34B illustrate a motor according to embodiments described herein.
Figure 34B:
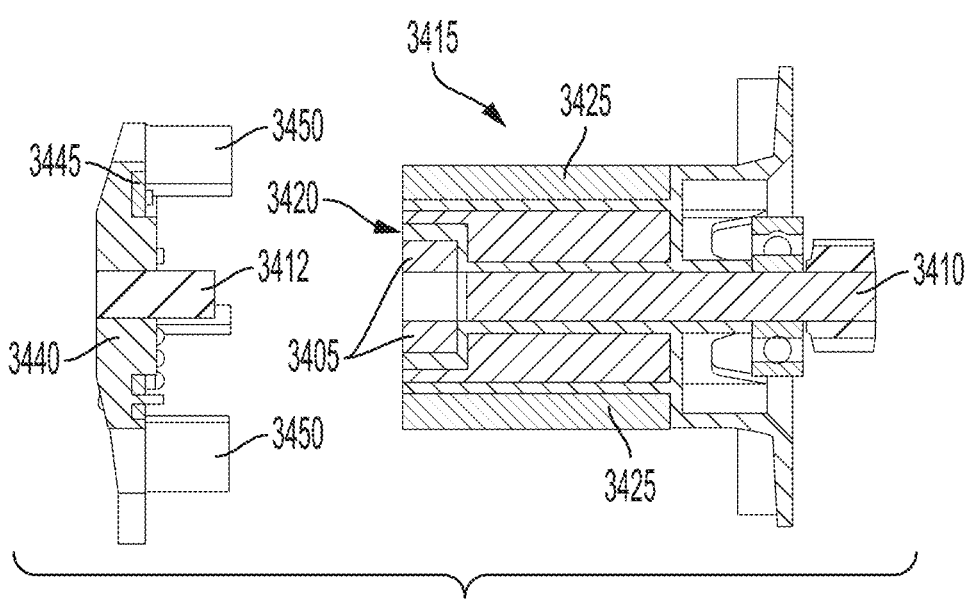

FIGS. 34A and 34B illustrate another embodiment of a motor 3400 like the motor 3300 described above, with like features shown with like reference numerals plus "100," unless explained differently below. FIGS. 34A and 34B illustrate a motor 3400 that includes a recessed bearing 3405 with a rotor outer diameter press similar to the motor 3300 of FIGS. 33A and 33B. However, unlike to motor 3300 and like the motor 3200 of FIGS. 32A and 32B, the motor 3400 includes two different notched laminations 3415A and 3415B (e.g., an inner lamination 3415A and an outer lamination 3415B) that are molded and pressed together to create a recessed bearing rotor lamination stack 3415. In some embodiments, a heat stake is soldered down prior to assembling the motor. In some embodiments, clearance room for a Hall board mount (e.g., 0.5 mm) is provided inside the rotor pocket 3420. Similar to the motors 3100, 3200, 3300 of FIGS. 31A-33B, the recessed bearing 3405 is within the length of the rotor magnets 3425 or rotor envelope 3430, which saves space within a power tool housing and may allow the power tool 100 to be more compact than power tools with motors that do not include a recessed bearing 3405.

Figure 35A:
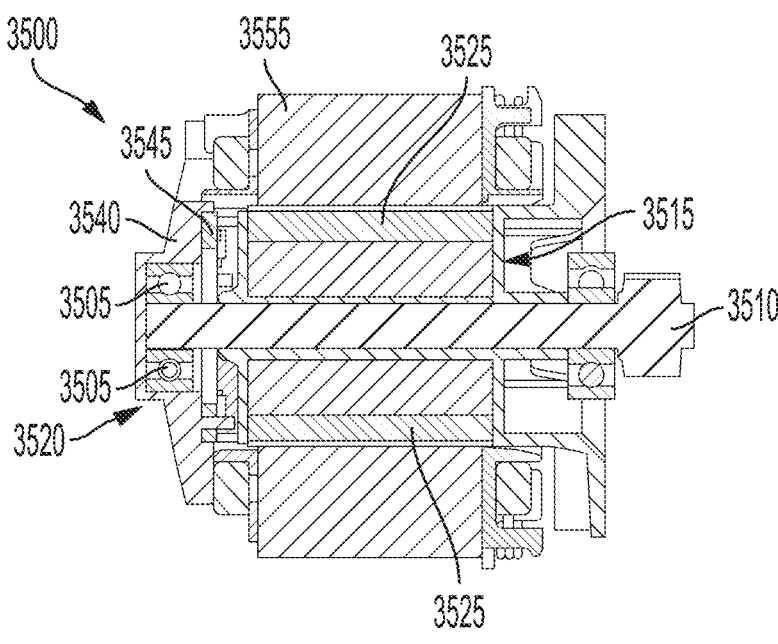
FIGS. 35A and 35B illustrate a motor according to embodiments described herein.
Figure 35B:
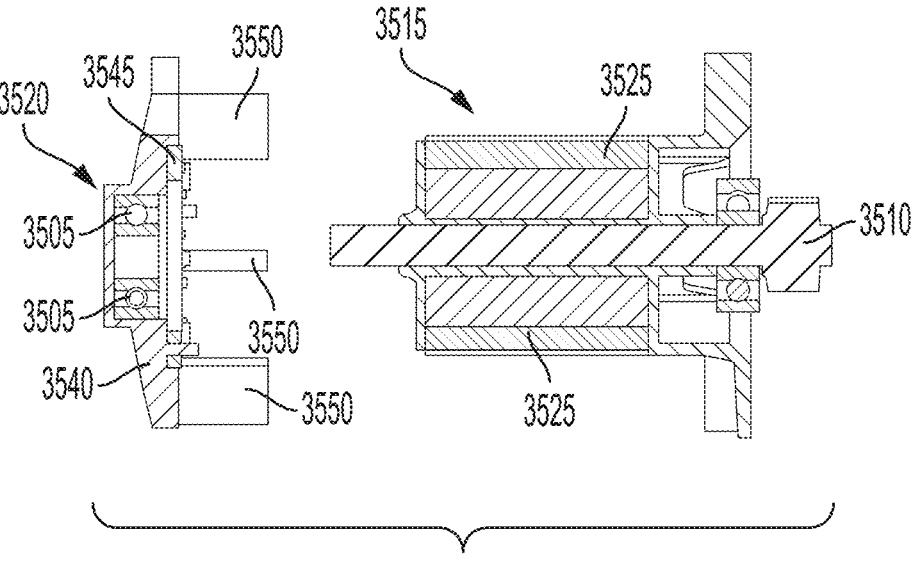

FIGS. 35A and 35B illustrate another embodiment of a motor 3500 like the motor 3100 described above, with like features shown with like reference numerals plus "400," unless explained differently below. FIGS. 35A and 35B illustrate a motor 3500 with an extended bearing mount 3540 with a rotor inner diameter press. The rotor shaft 3510 is molded or pressed into the rotor lamination stack 3515. A bearing 3505 is pressed onto the bearing mount 3540 inside of a back pocket 3520 of the mount 3540. The back bearing 3505 is inner diameter press fit onto the shaft 3510 and insert molded into the bearing mount 3540. In some embodiments, the bearing mount 3540 includes a Hall board 3545 that may be doughnut-shaped as described above with respect to previous embodiments. As shown in FIG. 35A, the motor shaft 3510 may pass through the Hall board 3545 and a portion of the bearing mount 3540 to be supported by the bearing 3505. Also similar to previous embodiments, the bearing mount 3540 may include protrusions 3550 configured to slipfit between an outer surface of the rotor stack 3515 and an inner surface of the stator 3555 to secure the bearing mount 3540 to the motor 3500. The design shown in FIGS. 35A and 35B saves space within a power tool housing and may allow the power tool 100 to be more compact than power tools with motors that do not include a bearing 3505 housed in a bearing mount 3540.

Figure 36:
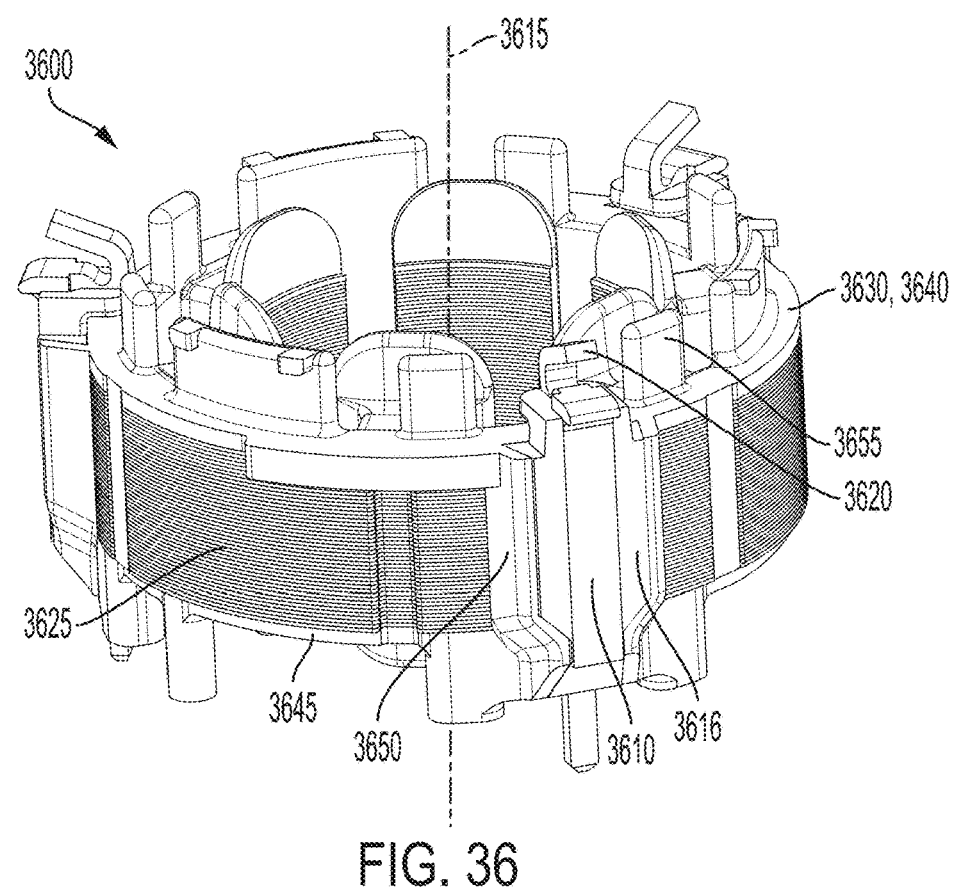
FIG. 36 illustrates a motor stator according to embodiments described herein.
Figure 37:
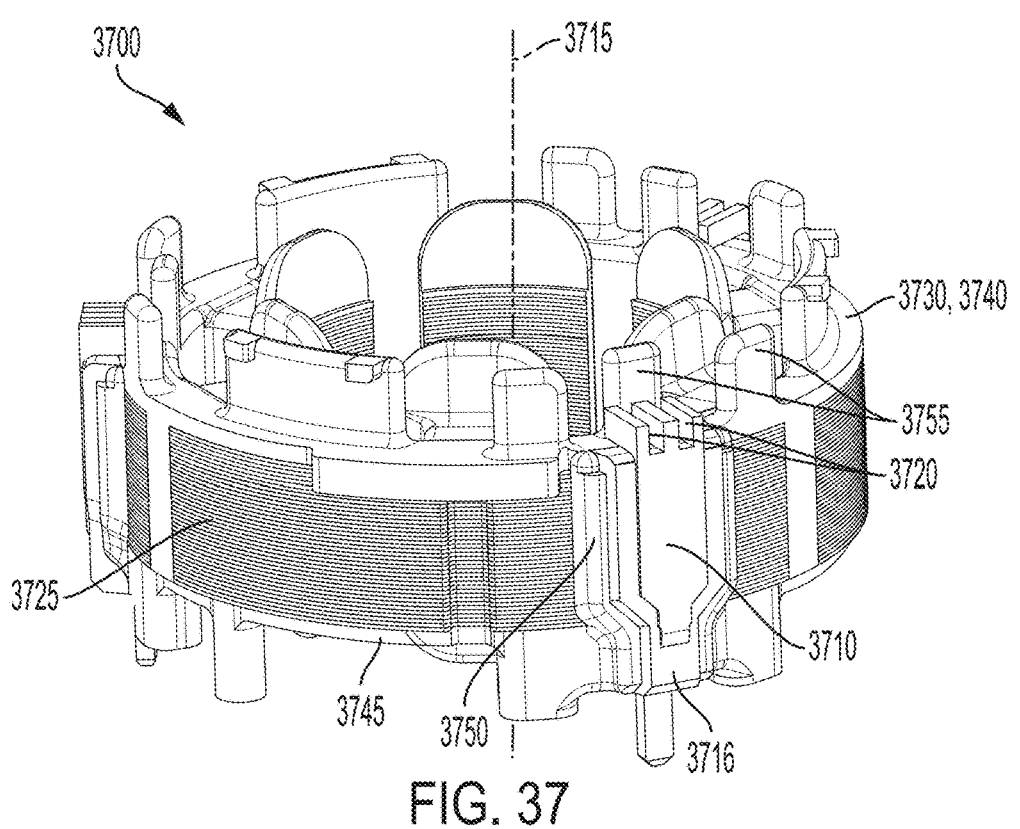
FIG. 37 illustrates a motor stator according to embodiments described herein.
Figure 38:
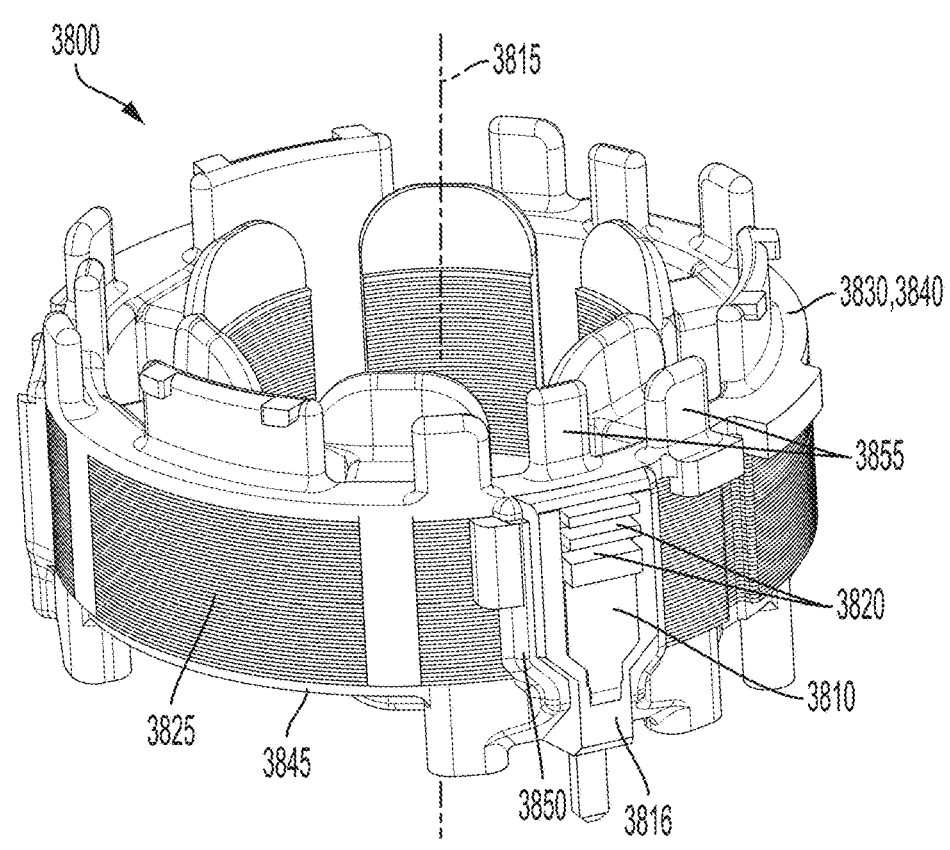
FIG. 38 illustrates a motor stator according to embodiments described herein.

FIGS. 36-38 illustrate other embodiments of motors like the motors 300-1500 described above and shown in FIGS. 3A-15, with like features shown with like reference numerals in the tens and ones digits of the reference numerals but incremented in the hundreds digit according to figure number.

FIG. 36 illustrates an embodiment of a motor 3600 that has terminals 3610 generally similar to those of the motor 1400 of FIGS. 14A and 14B but with slight variations. The explanation of the components of the motor 1400 applies to the like-numbered components of the motor 3600.

FIG. 37 illustrates an embodiment of a motor 3700 that has terminals 3710 similar to those of the motors 1200 and 1300 of FIGS. 12A-13B but with slight variations. The explanation of the components of the motors 1200 and 1300 applies to the like-numbered components of the motor 3700.

FIG. 38 illustrates an embodiment of a motor 3800 that has terminals 3810 generally similar to those of the motor 1300 of FIGS. 13A and 13B but with slight variations. The explanation of the components of the motor 1300 applies to the like-numbered components of the motor 3800. Although the motor 3800 of FIG. 38 shows only one terminal 3810, the motor 3800 may include three total terminals 3810 similar to other embodiments such as the motor 1300 of FIGS. 13A and 13B. The terminals 3810 may be located on a single terminal mount or may be located individually spaced approximately 120° apart, each of which is shown in other embodiments disclosed herein.

Figure 39:
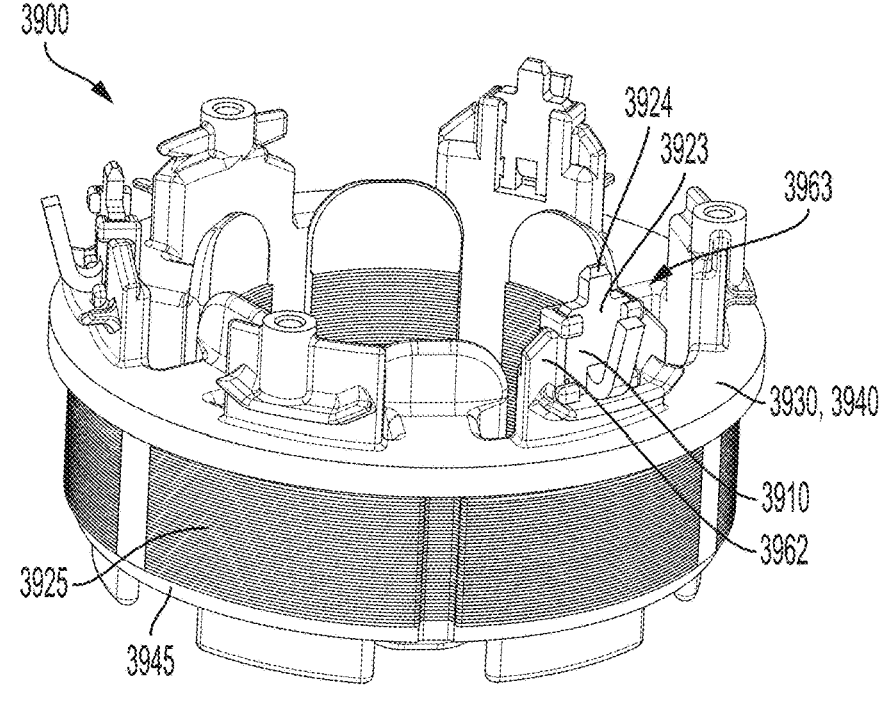
FIG. 39 illustrates a motor stator according to embodiments described herein.

FIG. 39 illustrates another embodiment of a motor 3900 like the motor 3000 described above and shown in FIGS. 30A-30B, with like features shown with like reference numerals plus "900," unless explained differently below. The motor 3900 may be similar to the motor 3000 except that the motor 3900 may use different terminals 3910. For example, the terminals 3910 may include a tang 3920 similar to other terminals described in other embodiments. The tang 3920 may be used to connect the terminal to the motor windings as described previously herein with respect to other embodiments. The explanation of the components of the motor 3000 otherwise applies to the like-numbered components of the motor 3900. For example, a second portion 3924 of the terminals 3910 may be configured to be connected to a PCB similar to the PCB 3012 even though such a PCB is not shown in FIG. 39.

FIGS. 40A-40D illustrate another embodiment of a motor 4000 like the motor 300 described above, with like features shown with like reference numerals plus "3700," unless explained differently below. FIGS. 40A, 40B, 40C, and 40D illustrate a motor 4000 that includes a terminal assembly 4005 with a plurality of terminals 4010 whose main portions 4023 are approximately parallel to the longitudinal axis 4015 of the motor 4000. However, the terminals 4010 may be angled or tilted/skewed in other embodiments similar to other embodiments described herein. The terminals 4010 include multiple tangs 4020A, 4020B, and 4020C that are different than, for example, the tangs 320, 420 of terminals 310, 410 shown in FIGS. 3A-4D. For example, the tangs 4020A and 4020B (e.g., primary tangs) are rotated to be approximately perpendicular to the longitudinal axis 4015 of the motor 4000. The tangs 4020A and 4020B are each bent over a top of a main portion 4023 of the terminal 4010 from a respective side of the main portion 4023 of the terminal 4010. Motor winding wires are fused to the primary tangs 4020A and 4020B. In some embodiments, the motor winding wires are not wrapped around the primary tangs 4020A and 4020B, but rather, the motor winding wires merely pass through/underneath the tangs 4020A and 4020B and are fused to the tangs 4020A and 4020B. Additionally, the terminals 4010 each include a secondary tang 4020C (e.g., a tension tang) that is located below the primary tangs 4020A, 4020B on the main portion 4023 of the terminal 4010. In some embodiments, the secondary tang 4020C is used to provide tension for the motor winding wires, but the motor winding wires are not fused to the secondary tang 4020C. In other words, the motor winding wires are wrapped around the secondary tang 4020C but are not fused to the secondary tang 4020C.

Figure 40A:
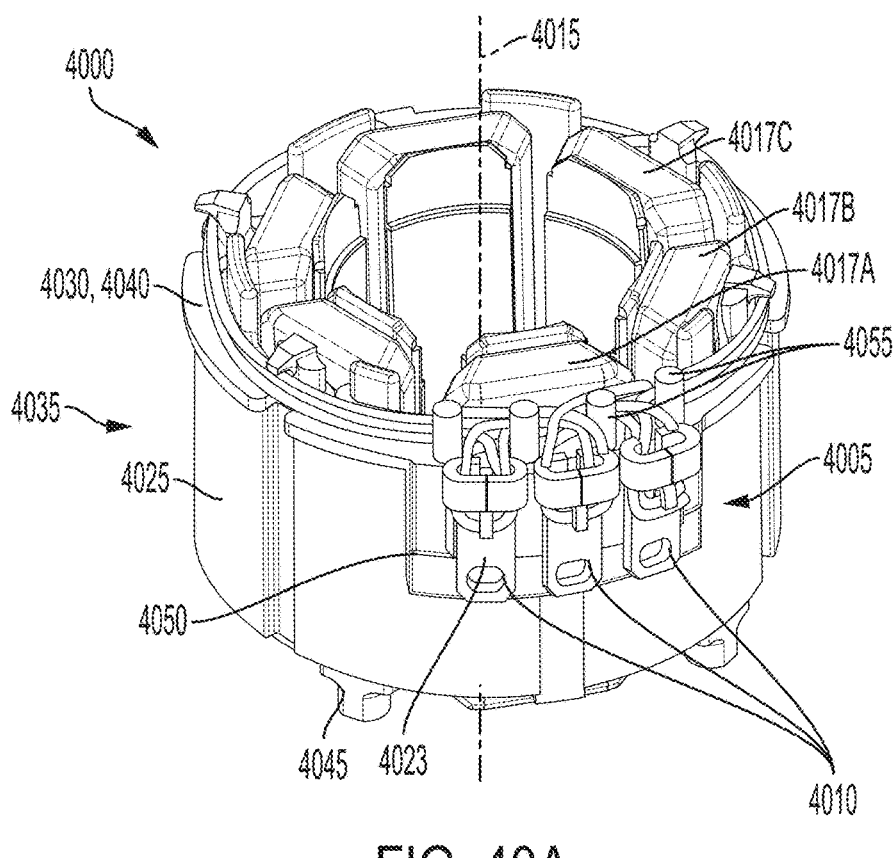
FIGS. 40A, 40B, 40C, and 40D illustrate a motor stator according to embodiments described herein.
Figure 40B:
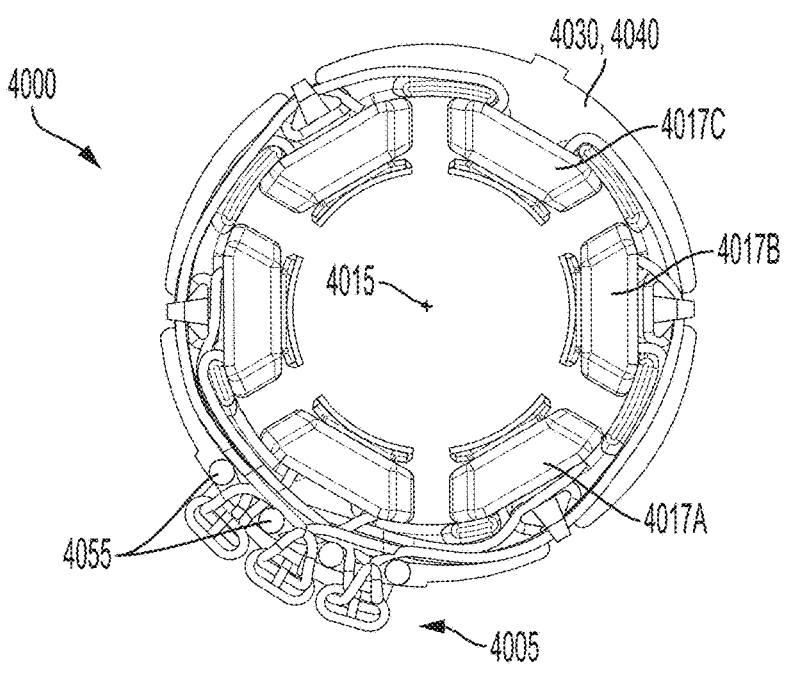
Figure 40C:
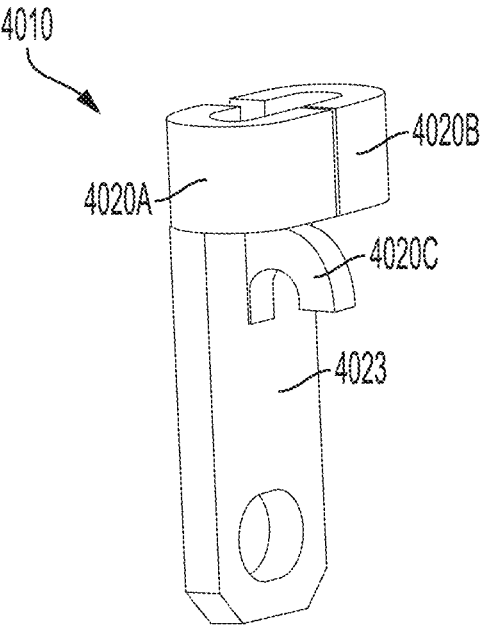
Figure 40D:
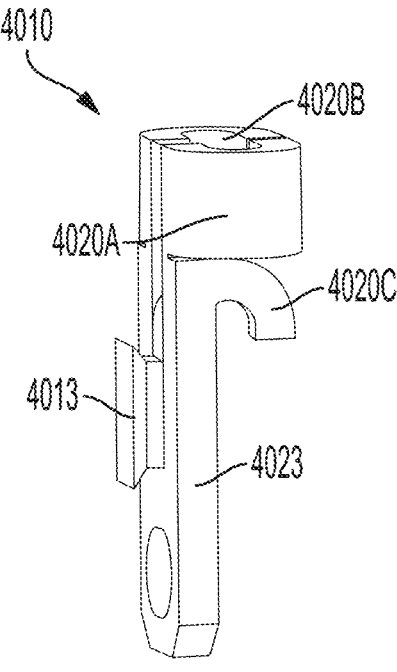

As shown in FIG. 40D, the terminals 4010 may include a mounting protrusion 4013 that protrudes from an opposite surface of the main portion 4023 than the secondary tang 4020C. In some embodiments, the mounting protrusion 4013 is configured to fit into a corresponding slot of a non-conductive terminal mount 4016 to mount the terminals 4010 to the terminal mount 4016. While not shown in other embodiments, the terminals of other embodiments may include similar mounting protrusions as the mounting protrusion 413 shown in FIG. 40D.

Figure 41:
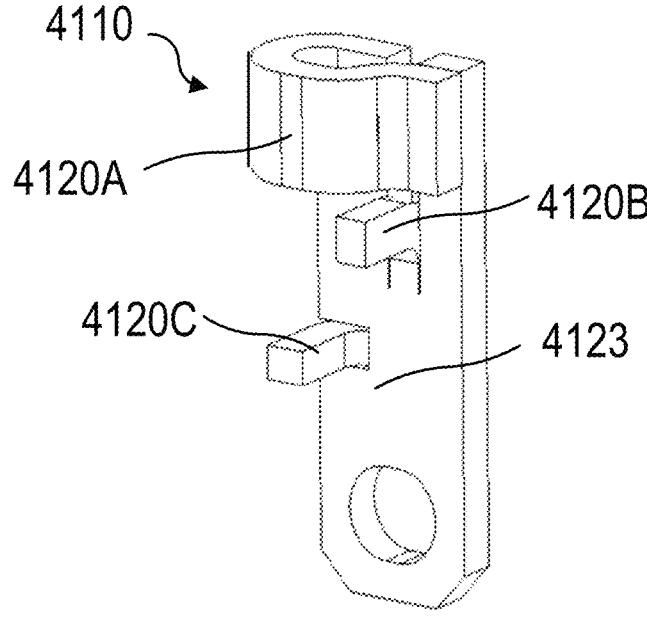
FIG. 41 illustrates a motor terminal according to embodiments described herein.

FIG. 41 illustrates a terminal 4110 that may be used on the motor 4000 of FIGS. 40A-D as an alternative to the terminals 4010 according to some embodiments. As shown in FIG. 41, the terminal 4110 includes multiple tangs 4120A, 4120B, and 4120C that are different than, for example, the tangs 4020A-C of the terminals 4010 shown in FIGS. 40A-40D. The tang 4120A folds from a side of the terminal 4110 over a main portion 4123 of the terminal 4110 in a direction that is perpendicular to the longitudinal axis of the motor (similar to tangs 4020A and 4020B of FIGS. 40A-D). However, as shown in FIG. 41, only a single perpendicularly folded tang 4120A is present on the terminal 4110. The terminal 4110 also includes a tension tang 4120C that is located closer to one side of the terminal 4110 than the other side of the terminal 4110. The tension tang 4120C may be used similarly as the tension tang 4020C explained previously herein. For example, the tension tang 4120C is used to provide tension for the motor winding wires, but the motor winding wires are not fused to the tension tang 4120C. Rather, the motor wires are wrapped around the tension tang 4120 before the tang 4120A is folded over the main portion 4123. After winding of the motor wires is complete, the tang 4120A may be folded over the main portion 4123 (as shown in FIG. 41) and fused to the motor wires that pass underneath the tang 4120A. In some embodiments, the tang 4120A is configured to be folded closer to a surface of the main portion 4123 on a side of the main portion 4123 on which the tension tang 4120C is not located (e.g., to provide space for the motor wires between the main portion 4123 and the tang 4120A on a side of the main portion 4123 on which the tension tang 4120C is located). In some embodiments, the terminal 4110 may also include a wire stopping tang 4120B configured to be used as a stop to prevent the motor wires from moving side-to-side during the winding and fusing processes. In some embodiments, the motor wires are not fused to the wire stopping tang 4120B and may only be fused to the folded tang 4120A.

In other embodiments, the tangs 4120B and 4120C may have opposite functionality than that described above. For example, the tang 4120C may alternatively act as the wire stopping tang to prevent the motor wires from moving to side-to-side during the winding and fusing process. Similarly, the tang 4120B may alternatively act as the tension tang around which motor winding wires are wound.

Thus, some embodiments provide, among other things, a brushless motor.

We claim:

1. A power tool comprising:
a housing having a motor housing portion, a handle portion, and a battery pack interface, wherein the battery pack interface is configured to removably receive and support a battery pack;

a brushless direct current (DC) motor located within the motor housing portion and having a rotor and a stator, wherein the rotor is coupled to a motor shaft arranged to produce an output outside of the housing;
a non-conductive terminal mount located on an outer peripheral surface of the stator; and
a plurality of terminals mounted on the non-conductive terminal mount;
wherein a first end of each of the terminals includes a primary tang configured to be folded over a stator coil wire;
wherein a second end of each of the terminals that is opposite the first end is electrically connected to a power source configured to provide power to the stator coil wire;
wherein each of the terminals includes a tension tang located between the first end and the second end, wherein the stator coil wire is wrapped around the tension tang and wherein the stator coil wire passes through an area of the terminal that the primary tang is configured to be folded over;
wherein the stator coil wire is not wrapped around the primary tang, and wherein the stator coil wire is not fused to the tension tang; and
wherein the primary tang is configured to be folded over a main portion of the terminal from a first side of the terminal.

2. The power tool of claim 1, wherein the primary tang is a first primary tang, and wherein each of the terminals includes a second primary tang; and
wherein the second primary tang is configured to be folded over the main portion of the terminal from an opposite side of the terminal as the first side of the terminal.

3. The power tool of claim 1, wherein each of the terminals includes a first longitudinal side and a second longitudinal side; and
wherein the tension tang is equidistant from the first longitudinal side and the second longitudinal side of the terminal.

4. The power tool of claim 1, wherein each of the terminals includes a first longitudinal side and a second longitudinal side; and
wherein the tension tang is closer to the first longitudinal side of the terminal than to the second longitudinal side of the terminal.

5. The power tool of claim 1, wherein each of the terminals includes a wire stopping tang configured to prevent the stator coil wire from moving side-to-side.

6. A power tool comprising:
a housing having a motor housing portion, a handle portion, and a battery pack interface, wherein the battery pack interface is configured to removably receive and support a battery pack;
a brushless direct current (DC) motor located within the motor housing portion and having a rotor and a stator, wherein the rotor is coupled to a motor shaft arranged to produce an output outside of the housing;
a non-conductive terminal mount located on an outer peripheral surface of the stator; and
a plurality of terminals mounted on the non-conductive terminal mount;
wherein a first end of each of the terminals includes a primary tang configured to be folded over a stator coil wire;

wherein a second end of each of the terminals that is opposite the first end is electrically connected to a power source configured to provide power to the stator coil wire; and wherein each of the terminals includes a tension tang located between the first end and the second end, wherein the stator coil wire is wrapped around the tension tang and wherein the stator coil wire passes through an area of the terminal that the primary tang is configured to be folded over.

7. The power tool of claim 6, wherein the stator coil wire is not wrapped around the primary tang, and wherein the stator coil wire is not fused to the tension tang.

8. The power tool of claim 6, wherein the primary tang is configured to be folded over a main portion of the terminal from a first side of the terminal.

9. The power tool of claim 8, wherein the primary tang is a first primary tang, and wherein each of the terminals includes a second primary tang; and wherein the second primary tang is configured to be folded over the main portion of the terminal from an opposite side of the terminal as the first side of the terminal.

10. The power tool of claim 6, wherein each of the terminals includes a first longitudinal side and a second longitudinal side; and wherein the tension tang is equidistant from the first longitudinal side and the second longitudinal side of the terminal.

11. The power tool of claim 6, wherein each of the terminals includes a first longitudinal side and a second longitudinal side; and wherein the tension tang is closer to the first longitudinal side of the terminal than to the second longitudinal side of the terminal.

12. The power tool of claim 11, wherein the primary tang is configured to be folded over a main portion of the terminal from the first longitudinal side of the terminal.

13. The power tool of claim 6, wherein each of the terminals includes a wire stopping tang configured to prevent the stator coil wire from moving side-to-side.

14. The power tool of claim 13, wherein each of the terminals includes a first longitudinal side and a second longitudinal side;

wherein the tension tang is closer to the first longitudinal side of the terminal than to the second longitudinal side of the terminal;

wherein the tension tang is equidistant from the first longitudinal side and the second longitudinal side of the terminal; and wherein the wire stopping tang is located closer to the first end of the terminal than the tension tang is located to the first end of the terminal.

15. The power tool of claim 6, wherein the tension tang and the area of the terminal that the primary tang is configured to be folded over are both located on a first surface of the terminal that faces away from the brushless DC motor.

16. A power tool comprising:

a housing having a motor housing portion, a handle portion, and a battery pack interface, wherein the battery pack interface is configured to removably receive and support a battery pack;

a brushless direct current (DC) motor located within the motor housing portion and having a rotor and a stator, wherein the rotor is coupled to a motor shaft arranged to produce an output outside of the housing, wherein the stator includes a lamination stack and a stator molding that supports the lamination stack to form a molded stator body, wherein the stator molding includes a first axial end portion and a second axial end portion opposite the first axial end portion; and a plurality of terminals located on an outer peripheral surface of the stator, each of the terminals including a surface facing away from the brushless DC motor, the surface including a plurality of slots at a first end;

wherein each of the plurality of slots is configured to receive a stator coil wire, the stator coil wire being electrically and physically coupled to the terminal within its respective slots;

wherein a second end of each of the terminals that is opposite the first end is electrically connected to a power source configured to provide power to the stator coil wire;

wherein each of the terminals is angled in a first direction about a first respective axis through each of the terminals, the first respective axis being perpendicular to a longitudinal axis of the brushless DC motor; and wherein each of the terminals is angled in a second direction different than the first direction.

17. The power tool of claim 16, wherein each of the terminals is angled in the second direction about a second respective axis through each of the terminals, the second respective axis being parallel to the longitudinal axis of the brushless DC motor.

18. The power tool of claim 16, further comprising:

a non-conductive terminal mount located on the outer peripheral surface of the stator, wherein the plurality of terminals is mounted on the non-conductive terminal mount;

wherein the stator molding includes an extending portion extending axially along the outer peripheral surface of the stator;

wherein the non-conductive terminal mount is located on the extending portion; and wherein the stator molding includes a post on the first axial end portion and extending away from the first axial end portion, the post configured to receive the stator coil wire to aid in winding the stator coil wire onto the molded stator body.

19. The power tool of claim 16, wherein the second end of each of the terminals includes a power connecting portion configured to electrically connect to the power source;

wherein the power connecting portion is substantially parallel to the surface of its respective terminal and located in a different plane than the surface of its respective terminal; and wherein the power connecting portion of each terminal protrudes through a hole in a terminal mount on which the respective terminal is mounted.

* * * * *